(12) United States Patent
Humpal et al.

(10) Patent No.: US 12,075,769 B2
(45) Date of Patent: Sep. 3, 2024

(54) AGRICULTURAL SPRAYER WITH REAL-TIME, ON-MACHINE TARGET SENSOR

(71) Applicant: Deere & Company, Moline, IL (US)

(72) Inventors: Richard A. Humpal, Ankeny, IA (US); Steven Rees, Top Camp (AU); Broughton C. Boydell, Moree (AU); Tarik Loukili, Johnston, IA (US); Travis J. Davis, Polk City, IA (US); Terence D. Pickett, Waukee, IA (US); Scott M. Buse, Adel, IA (US); Mark M. Chaney, Ankeny, IA (US)

(73) Assignee: Deere & Company, Moline, IL (US)

( * ) Notice: Subject to any disclaimer, the term of this patent is extended or adjusted under 35 U.S.C. 154(b) by 437 days.

(21) Appl. No.: 17/172,290

(22) Filed: Feb. 10, 2021

(65) Prior Publication Data
US 2022/0192174 A1 Jun. 23, 2022

Related U.S. Application Data

(60) Provisional application No. 63/128,435, filed on Dec. 21, 2020.

(51) Int. Cl.
| | | |
|---|---|---|
| *B05B 12/00* | (2018.01) | |
| *A01C 21/00* | (2006.01) | |
| *A01C 23/00* | (2006.01) | |
| *A01C 23/04* | (2006.01) | |

(Continued)

(52) U.S. Cl.
CPC ......... *A01M 7/0089* (2013.01); *A01C 21/005* (2013.01); *A01C 23/007* (2013.01); *A01C 23/047* (2013.01); *A01M 7/0042* (2013.01); *B05B 12/124* (2013.01)

(58) Field of Classification Search
CPC .............. A01M 7/0089; A01M 7/0042; A01C 21/005; A01C 23/047; A01C 23/007; B05B 12/124
See application file for complete search history.

(56) References Cited

U.S. PATENT DOCUMENTS

| | | | |
|---|---|---|---|
| 3,968,842 | A | 7/1976 | Puch et al. |
| 5,033,397 | A | 7/1991 | Colburn, Jr. |
| 5,355,815 | A | 10/1994 | Monson |

(Continued)

FOREIGN PATENT DOCUMENTS

| | | |
|---|---|---|
| CN | 102696571 A | 10/2012 |
| CN | 102968664 A | 3/2013 |

(Continued)

OTHER PUBLICATIONS

Extended European Search Report and Written Opinion issued in European Patent Application No. 21213934.9, dated May 19, 2022, in 08 pages.

(Continued)

*Primary Examiner* — Tuongminh N Pham
(74) *Attorney, Agent, or Firm* — Kelly, Holt & Christenson; Joseph R. Kelly

(57) ABSTRACT

An agricultural applicator, that applies material to an agricultural field, includes an on-board, real-time image sensor that senses targets for the material to be applied. A controller controls applicators, such as nozzles or other applicators, to apply the material to the sensed targets.

19 Claims, 53 Drawing Sheets

(51) Int. Cl.
*A01M 7/00* (2006.01)
*B05B 12/12* (2006.01)

(56) References Cited

U.S. PATENT DOCUMENTS

| | | |
|---|---|---|
| 5,606,821 A | 3/1997 | Sadjadi et al. |
| 6,160,902 A | 12/2000 | Dickson et al. |
| 6,199,000 B1 | 3/2001 | Keller et al. |
| 6,549,851 B2 | 4/2003 | Greensides |
| 6,596,996 B1 | 7/2003 | Stone et al. |
| 6,601,341 B2 | 8/2003 | Raun et al. |
| 6,608,672 B1 | 8/2003 | Shibusawa et al. |
| 6,750,898 B1 | 6/2004 | Ishida et al. |
| 6,907,319 B2 | 6/2005 | Hoelscher et al. |
| 7,610,122 B2 | 10/2009 | Anderson |
| 7,723,660 B2 | 5/2010 | Holland |
| 7,765,780 B2 | 8/2010 | Koselka et al. |
| 7,850,190 B2 | 12/2010 | Ruckle et al. |
| 8,260,507 B2 | 9/2012 | Schumann et al. |
| 8,321,365 B2 | 11/2012 | Anderson |
| 8,437,879 B2 | 5/2013 | Anderson |
| 8,488,874 B2 | 7/2013 | Zaman et al. |
| 8,504,234 B2 | 8/2013 | Anderson |
| 8,639,383 B2 | 1/2014 | Goldman et al. |
| 8,738,244 B2 | 5/2014 | Lenz et al. |
| 8,855,374 B2 | 10/2014 | Fryshman |
| 8,924,030 B2 | 12/2014 | Wendte et al. |
| 9,026,316 B2 | 5/2015 | Holland |
| 9,030,549 B2 | 5/2015 | Redden |
| 9,076,105 B2 | 7/2015 | Anderson |
| 9,144,188 B2 | 9/2015 | Bover Trobat |
| 9,265,187 B2 | 2/2016 | Cavender-Bares et al. |
| 9,288,938 B2 | 3/2016 | Cavender-Bares et al. |
| 9,392,743 B2 | 7/2016 | Camacho-Cook et al. |
| 9,516,802 B2 | 12/2016 | Zemenchik |
| 9,532,499 B2 | 1/2017 | Anderson et al. |
| 9,699,958 B2 | 7/2017 | Koch et al. |
| 9,719,973 B2 | 8/2017 | Pickett et al. |
| 9,740,208 B2 | 8/2017 | Sugumaran et al. |
| 9,924,629 B2 | 3/2018 | Batcheller et al. |
| 10,149,422 B2 | 12/2018 | Tippery et al. |
| 10,694,091 B2 | 6/2020 | Rees |
| 10,772,253 B2 | 9/2020 | Calleija et al. |
| 11,610,307 B2 | 3/2023 | Yip et al. |
| 2001/0016053 A1 | 8/2001 | Dickson et al. |
| 2002/0138201 A1 | 9/2002 | Greensides |
| 2003/0019151 A1 | 1/2003 | Raun et al. |
| 2003/0187560 A1 | 10/2003 | Keller et al. |
| 2004/0034459 A1 | 2/2004 | Hoelscher et al. |
| 2004/0065834 A1 | 4/2004 | Stone et al. |
| 2005/0126144 A1 | 6/2005 | Koselka et al. |
| 2007/0042803 A1 | 2/2007 | Anderson |
| 2008/0140431 A1 | 6/2008 | Anderson et al. |
| 2009/0007485 A1 | 1/2009 | Holland |
| 2009/0192654 A1 | 7/2009 | Wendte et al. |
| 2010/0019471 A1 | 1/2010 | Pickett et al. |
| 2010/0070072 A1 | 3/2010 | Goldman et al. |
| 2010/0179734 A1 | 7/2010 | Schumann et al. |
| 2010/0268390 A1 | 10/2010 | Anderson |
| 2010/0268679 A1 | 10/2010 | Anderson |
| 2012/0042563 A1 | 2/2012 | Anderson |
| 2012/0046837 A1 | 2/2012 | Anderson |
| 2012/0271467 A1 | 10/2012 | Grimm et al. |
| 2013/0011011 A1 | 1/2013 | Fryshman |
| 2013/0073097 A1 | 3/2013 | Vidovich |
| 2013/0112441 A1 | 5/2013 | Bover Trobat |
| 2013/0197767 A1 | 8/2013 | Lenz |
| 2013/0235183 A1 | 9/2013 | Redden |
| 2013/0325242 A1 | 12/2013 | Cavender-Bares et al. |
| 2014/0001276 A1 | 1/2014 | Joergensen et al. |
| 2014/0091199 A1 | 4/2014 | Holland |
| 2014/0168412 A1 | 6/2014 | Shulman et al. |
| 2014/0180549 A1 | 6/2014 | Siemens et al. |
| 2014/0379228 A1 | 12/2014 | Batcheller et al. |
| 2015/0027040 A1 | 1/2015 | Redden |
| 2015/0051779 A1 | 2/2015 | Camacho-Cook et al. |
| 2015/0142250 A1 | 5/2015 | Cavender-Bares et al. |
| 2015/0237795 A1 | 8/2015 | Koch et al. |
| 2015/0272105 A1 | 10/2015 | Peterson |
| 2015/0305226 A1 | 10/2015 | Zemenchik |
| 2015/0373905 A1 | 12/2015 | Anderson et al. |
| 2016/0136671 A1 | 5/2016 | Kocer |
| 2016/0195505 A1 | 7/2016 | Pickett et al. |
| 2016/0309659 A1 | 10/2016 | Guy et al. |
| 2017/0031365 A1 | 2/2017 | Sugumaran et al. |
| 2017/0049044 A1 | 2/2017 | Stoller et al. |
| 2017/0071188 A1 | 3/2017 | Rees |
| 2017/0251589 A1 | 9/2017 | Tippery et al. |
| 2017/0359943 A1 | 12/2017 | Calleija et al. |
| 2018/0168141 A1 | 6/2018 | Tanner et al. |
| 2018/0206475 A1 | 7/2018 | Carter |
| 2018/0245979 A1 | 8/2018 | Park et al. |
| 2018/0253630 A1 | 9/2018 | Tamer et al. |
| 2019/0126308 A1 | 5/2019 | Hendrickson et al. |
| 2019/0150357 A1 | 5/2019 | Wu |
| 2019/0351434 A1 | 11/2019 | Smith et al. |
| 2020/0045953 A1* | 2/2020 | Serrat ............... A01M 7/0057 |
| 2020/0230633 A1* | 7/2020 | Serrat ................. G06V 20/56 |
| 2020/0375172 A1 | 12/2020 | Elgart |
| 2021/0185886 A1 | 6/2021 | Sibley |
| 2021/0204898 A1 | 7/2021 | Liao et al. |
| 2021/0329906 A1 | 10/2021 | Taamhoj et al. |
| 2021/0386051 A1 | 12/2021 | Seitz et al. |
| 2022/0076387 A1 | 3/2022 | Rees |
| 2022/0174933 A1* | 6/2022 | Smith ............... A01M 7/0089 |
| 2022/0192084 A1 | 6/2022 | Mizushima et al. |
| 2022/0192175 A1 | 6/2022 | Humpal et al. |
| 2022/0211026 A1 | 7/2022 | McCann et al. |
| 2023/0177884 A1 | 6/2023 | Locker et al. |
| 2023/0343090 A1 | 10/2023 | Khait |

FOREIGN PATENT DOCUMENTS

| | | |
|---|---|---|
| CN | 105638613 A | 6/2016 |
| CN | 206024976 U | 3/2017 |
| CN | 106857466 A | 6/2017 |
| CN | 107150807 A | 9/2017 |
| CN | 206453057 U | 9/2017 |
| CN | 206462264 U | 9/2017 |
| CN | 206651269 U | 11/2017 |
| CN | 206713888 U | 12/2017 |
| CN | 107639640 A | 1/2018 |
| CN | 107678318 A | 2/2018 |
| CN | 107750497 A | 3/2018 |
| CN | 207070619 U | 3/2018 |
| CN | 108012623 A | 5/2018 |
| CN | 207327013 U | 5/2018 |
| CN | 108271765 A | 7/2018 |
| CN | 207665864 U | 7/2018 |
| CN | 108605918 A | 10/2018 |
| CN | 108703134 A | 10/2018 |
| CN | 108849440 A | 11/2018 |
| CN | 208084344 U | 11/2018 |
| CN | 108942933 A | 12/2018 |
| CN | 109006774 A | 12/2018 |
| CN | 109122644 A | 1/2019 |
| CN | 208338739 U | 1/2019 |
| CN | 208338745 U | 1/2019 |
| CN | 208354422 U | 1/2019 |
| DE | 4132637 A1 | 4/1993 |
| DE | 4329343 A1 | 3/1995 |
| DE | 102009028990 A1 | 10/2010 |
| DE | 102016005023 A1 | 10/2017 |
| DE | 102018217742 A1 | 4/2020 |
| EP | 0761084 A1 | 3/1997 |
| EP | 0843958 A1 | 5/1998 |
| EP | 0873677 A2 | 10/1998 |
| EP | 1000540 A1 | 5/2000 |
| EP | 1004240 B1 | 9/2003 |
| EP | 1135935 B1 | 9/2004 |
| EP | 1492356 A2 | 12/2004 |
| EP | 1493316 A1 | 1/2005 |
| EP | 2404492 A2 | 1/2012 |
| EP | 2586304 B1 | 3/2016 |

(56) References Cited

FOREIGN PATENT DOCUMENTS

| | | | |
|---|---|---|---|
| EP | 3165073 | A1 | 5/2017 |
| EP | 3165090 | A1 | 5/2017 |
| EP | 3192342 | A1 | 7/2017 |
| EP | 3308644 | A1 | 4/2018 |
| EP | 3165091 | B1 | 9/2018 |
| EP | 3482633 | A1 | 5/2019 |
| ES | 2346034 | A1 | 10/2010 |
| IN | 201641035348 | A | 10/2016 |
| IN | 201641032320 | A | 5/2017 |
| IN | 201641035347 | A | 4/2018 |
| IN | 201811033850 | A | 9/2018 |
| IN | 201721020107 | A | 12/2018 |
| JP | 2020510771 | A | 4/2020 |
| WO | 1996012401 | A1 | 5/1996 |
| WO | 1999017606 | A1 | 4/1999 |
| WO | 2000003589 | A1 | 1/2000 |
| WO | 2000030362 | A1 | 5/2000 |
| WO | 2002090908 | A1 | 11/2002 |
| WO | 2012122988 | A1 | 9/2012 |
| WO | 2014035169 | A1 | 3/2014 |
| WO | 2017181127 | A1 | 10/2017 |
| WO | 2018203337 | A1 | 11/2018 |
| WO | 2020201046 | A1 | 10/2020 |

OTHER PUBLICATIONS

U.S. Appl. No. 17/172,305 Office Action dated Nov. 17, 2022, 15 pages.
Machine vision smart sprayer for spot-application of agrochemical in wild blueberry fields—2018, 19 pages.
A method for agricultural machine guidance on row crops based on the vanishing point—2007, 6 pages.
The development of computer vision algorithm s for agricultural vehicle guidance—1987, 240 pages.
A Perception System for an Autonomous Pesticide Boom Sprayer—2019, 6 pages.
A Low Cost System to Optimize Pesticide Application based on Mobile Technologies and Computer Vision—2018, 6 pages.
Merge Fuzzy Visual Servoing and GPS-Based Planning to Obtain a Proper Navigation Behavior for a Small Crop-Inspection Robot—2016. 13 pages.
U.S. Appl. No. 17/172,305 Notice of Allowance dated Jul. 24, 2023, 9 pages.
U.S. Appl. No. 17/172,305 Notice of Allowance dated Aug. 16, 2023, 8 pages.
U.S. Appl. No. 17/172,305 Notice of Allowance dated Jul. 24, 2023, 5 pages.
U.S. Appl. No. 17/172,305 Final Office Action dated Mar. 27, 2023, 16 pages.
U.S. Appl. No. 17/172,305 Non Final Office Action dated Nov. 17, 2022, 14 pages.
U.S. Appl. No. 17/172,305 Final Office Action dated Mar. 27, 2023, 17 pages.
Extended European Search Report and Written Opinion issued in European Patent Application No. 21213930.7, dated Apr. 25, 2022, in 08 pages.
Extended European Search Report and Written Opinion issued in European Patent Application No. 21213933.1, dated Apr. 25, 2022, in 08 pages.
U.S. Appl. No. 17/172,294 Notice of Allowance dated Dec. 27, 2023, 9 pages.
U.S. Appl. No. 17/172,294 Notice of Allowance dated Feb. 9, 2024, 7 pages.

* cited by examiner

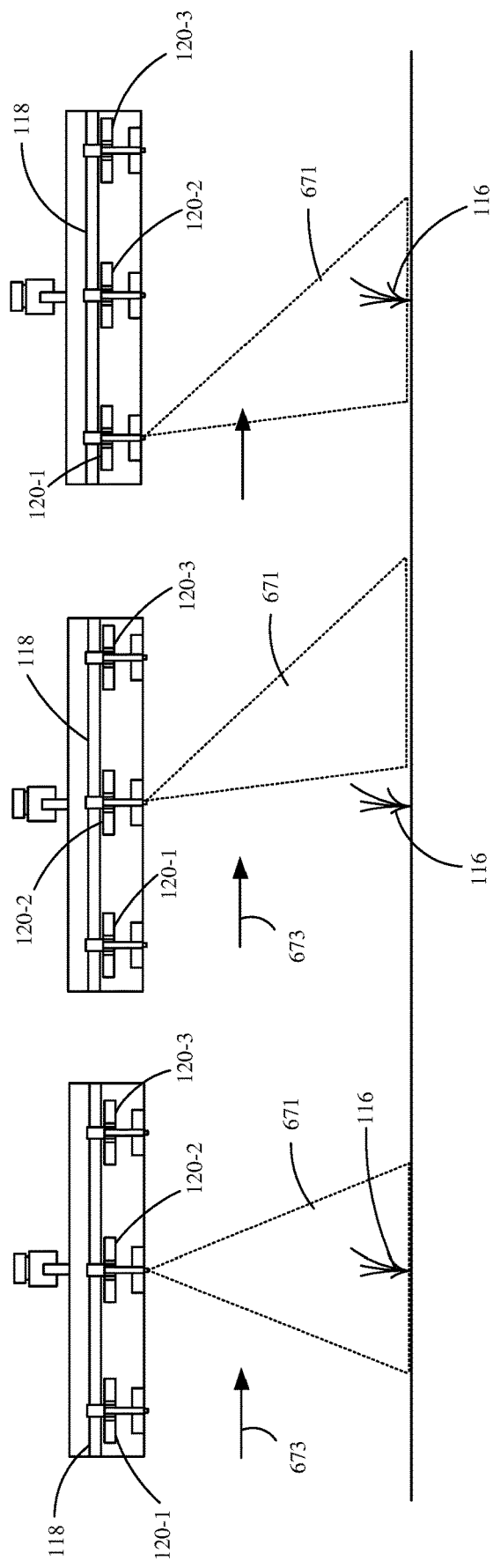

AGRICULTURAL SPRAYER WITH REAL-TIME, ON-MACHINE TARGET SENSOR

CROSS-REFERENCE TO RELATED APPLICATION

The present application is based on and claims the benefit of U.S. provisional patent application Ser. No. 63/128,435, filed Dec. 21, 2020, the content of which is hereby incorporated by reference in its entirety.

FIELD OF THE DESCRIPTION

The present description relates to the application of material to an agricultural field. More specifically, the present description relates to an agricultural machine that applies material to a field, using real-time, on-machine, target sensing.

BACKGROUND

Agricultural sprayers and other agricultural applicators apply chemicals and nutrients to agricultural fields. The chemicals and nutrients may be dry or liquid materials, and they can be applied for a number of reasons. For instance, the materials that are applied to a field may be pesticides, herbicides, fungicides, growth regulators, fertilizers, among others.

Currently, agricultural sprayers and applicators apply product uniformly across the field, regardless of specific, localized needs. This is sometimes referred to as "broadcast" application. Some current systems also generate a prescription, prior to beginning the application process, that indicates where to apply material, which material to apply, and an application rate. The prescription is then loaded onto the agricultural sprayer and the selected product is applied to the locations in the field, based upon the prescription.

The prescription is often generated based on data that is aggregated using manual scouting, or imagery taken by machines, such as drones, aircraft or satellites. The prescriptions may also be generated based on past field history.

The discussion above is merely provided for general background information and is not intended to be used as an aid in determining the scope of the claimed subject matter.

SUMMARY

An agricultural applicator, that applies material to an agricultural field, includes an on-board, real-time image sensor that senses targets for the material to be applied. A controller controls applicators, such as nozzles or other applicators, to apply the material to the sensed targets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 22C-22F are diagrammatic views showing some examples of lateral offset.

DETAILED DESCRIPTION

As described above, some current agricultural sprayers and agricultural applicators apply product uniformly across a field, regardless of any specific localized needs. This approach, sometimes referred to as a "broadcast" approach, results in the application of chemical and other materials where it is not required. This increases production costs and may have a potentially negative environmental impact. In some cases where herbicide is applied, for instance, up to 80% of the total product is applied where it is not needed.

Also, as briefly discussed above, some current systems attempt to generate prescription indicating where to apply material to the field. However, the prescription is created ahead of time (prior to the application process by which the agricultural machine applies the material to the field). The prescription is then loaded into the agricultural sprayer, or agricultural applicator, and used in applying the material to the field.

Although this process may reduce the amount of material being applied, it has significant limitations. For instance, because the data used to generate such prescriptions is obtained through manual scouting or through imagery, or through past field history, the data is subject to georeferencing and application errors. Therefore, the locations of the particular targets of the material application are not precisely defined. This, in turn, means that larger application zones around the targets are used in order to ensure that the desired targets are indeed covered by the material being applied.

A problem with data collection from aerial images is that the image quality is often not adequate to identify targets, such as pests or weeds. The image quality issues are normally attributed to the height at which the images were taken or the distance from the targets at which the images were taken, lighting conditions, cloud cover, obscurants, and other atmospheric conditions. Similarly, because these types of images and other data collection processes are performed hours or even days or weeks ahead of the application process, the targets in the field may have changed or additional targets may have appeared, so that the sprayer will not be operating on an accurate prescription.

The present description thus proceeds with respect to a system that provides a real-time, on-board target identification and control system that uses optical sensors, mounted on a sprayer or other agricultural applicator (hereinafter referred to as the agricultural machine). The target identification and control system captures an image of an area ahead of the agricultural machine, in the direction of travel, and processes that image to identify targets in time for applicator functionality on the agricultural machine to apply a material to those targets.

Figure 1A:
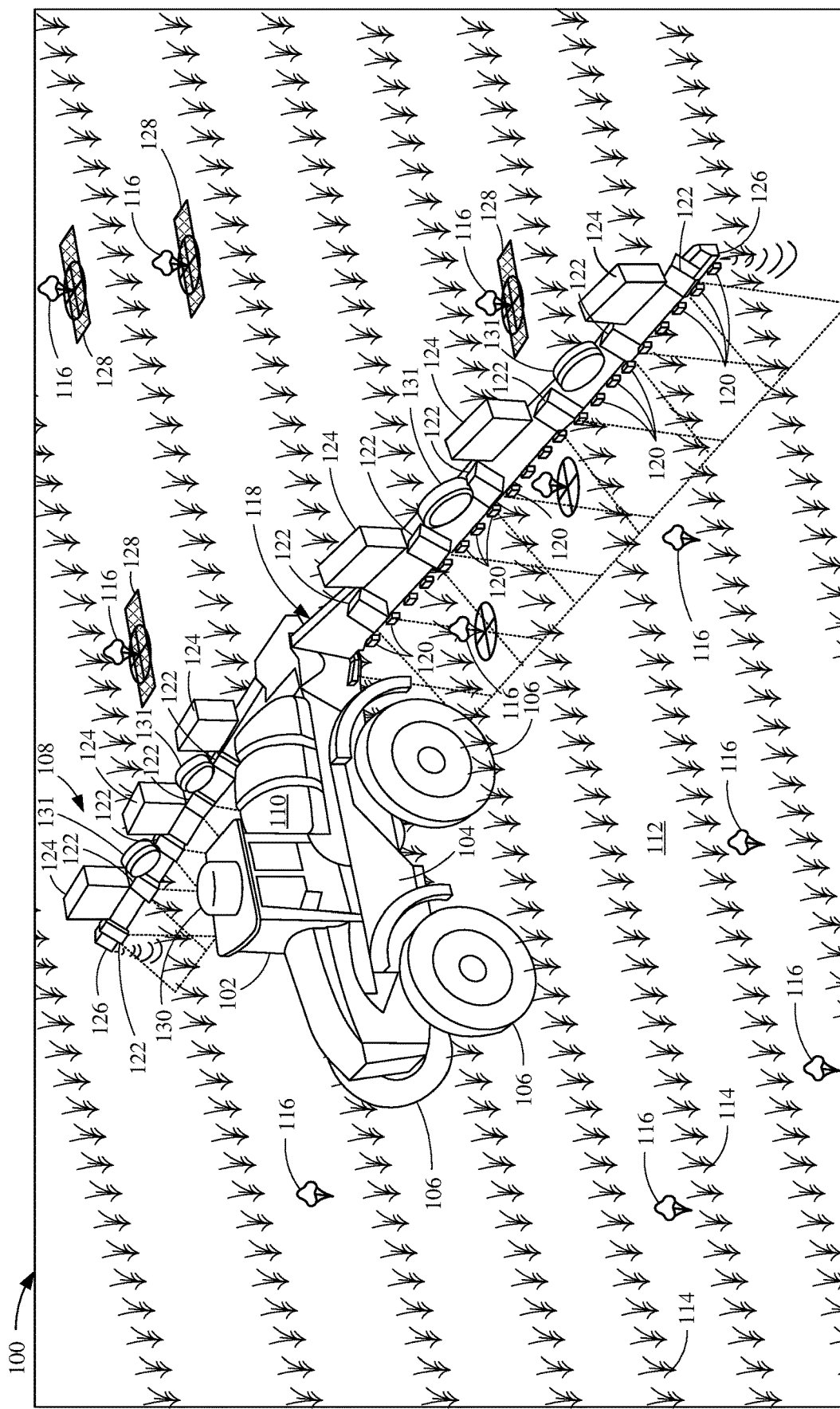
FIG. 1A is a pictorial view of an agricultural machine.

FIG. 1A shows a pictorial illustration of one example of an agricultural machine 100. Agricultural machine 100 is depicted as an agricultural sprayer that has an operator compartment 102, supported by a frame structure 104, which also supports ground engaging elements 106. In the example shown in FIG. 1A, ground engaging elements 106 are wheels, but they could be tracks or other implementations. FIG. 1A also shows that agricultural machine 100 has a spray system generally indicated by 108. Spray system 108 illustratively includes a tank or other material reservoir 110 that carries material that is to be applied to an agricultural field 112. In the example shown in FIG. 1A, agricultural field 112 has row crops, planted in rows 114, and a plurality of weeds 116 that are growing therein. While FIG. 1A shows one material reservoir 110, it will be noted that agricultural machine 100 may have more than one material reservoir 110 each carrying a different material or different concentration of material. Also, while FIG. 1A shows machine 100 in a field with rows 114 of crops, the present description can also proceed with an example in which machine 100 is treating an area without crops, such as a field after harvest and before planting, or another area without crops.

Spray system 108 also illustratively includes a boom structure 118 that supports a plurality of controllable nozzle bodies 120. Nozzle bodies 120 can include (as shown in more detail below) an electronic controller that receives commands over a network, such as a controller area network—CAN, or other data communication protocols. The nozzle body 120 can also include one or more controllable valves that can be moved between an open position and a closed position. The nozzle body 120 can also include one or more nozzle spray control tips. Material to be applied by mobile machine 100 is pumped by one or more pumps from tank 110, through hoses or other conduits, to the nozzle bodies 120. The controller in the nozzle bodies 120 controls the controllable valves to open (or the on position) so that the material moves through the nozzle body and out through the nozzle spray control tip where it is applied to the field 112. When the valve is controlled to be in the closed position (or the off position) the material does not pass through the valve. In one example, the valves are variable between the on and off positions, such as proportional values. In other examples, a variable flow rate can be achieved through the valves by controlling the pump or by controlling the valves in a pulse width modulated manner (varying the cycle time) or in other intermittent ways.

FIG. 1A also shows that agricultural machine 100 is fitted with a plurality of different optical image sensors 122 (shown as cameras in FIG. 1A). Image sensors 122 may be optical sensors which capture images by sensing radiation in the optical spectrum which, for purposes of the present discussion, includes ultraviolet, visible, and infrared frequencies. The image sensors 122 are disposed along the boom so that they have fields of view that cover the length of the ground in front of the boom 118. For instance, the image sensors 122 are disposed across boom 118 so that their fields of view cover all of the area of field 112 forward of nozzle bodies 120, as agricultural machine 100 travels through the field.

The image sensors 122 are illustratively coupled to one or more image processing modules 124. The image processing modules 124 illustratively process the images captured by image sensors 122 to identify targets (e.g., weeds 116 or rows 114) on field 112 over which agricultural machine 100 is traveling. Image sensors 122 can have an image processing system that performs some preprocessing. For instance, different cameras may be different so the on-camera image processing system may generate color correction matrices that adjust or calibrate the camera so all cameras produce images of the same color. The on-board image processing system can also perform other processing, such as lens shading correction, local tone mapping, demosaic, color correction, and distortion correction. The correction information can be captured in correction matrices or in other ways. Some or all of the pre-processing can be performed on the image processing modules 124 as well.

It will be noted that, in one example, the position of boom 118 (and in particular the position of each image sensor 122) relative to the surface of field 112, may change the field of view of the image sensors 122. For example, FIG. 1D shows an image sensor 122 and its corresponding image width at two different heights. At the first height, the field of view has an image width shown generally at 123. The area or region of interest 125 being analyzed for targets takes up most of the field of view 123. However, when image sensor 122 is moved to a greater height (further from the ground), then the width of the region on the ground that is included in the field of view of image sensor 122 is indicated by 127. Still, the area being examined for targets is represented by area 125.

Therefore, in one example, boom 118 has one or more boom sensors 126 that sense the height (in another implementation, sensor 126 can also or alternatively sense the angle and/or boom vibrations) of boom 118 relative to the surface of field 112 over which it is traveling. The boom height (and boom angle) can be used by image processing modules 124 to correct the images received from the various image sensors 122, based upon their location relative to the ground from which the images are captured. Thus, in one example, the image processing modules 124 identify weeds 116 as targets of a herbicide being applied by agricultural machine 100 and transmits information about the location of the weeds 116 to a nozzle controller so that the nozzle controller can control the valves in the nozzle bodies 120 to apply the herbicide to the weeds 116. In one example, the nozzle bodies are controlled to apply the material in a treated area 128 that has a buffer area on either side of weed 116 to increase the likelihood that the weed 116 is treated by the herbicide.

Image processing may be affected by ambient light conditions. Therefore, FIG. 1A also shows that boom 118 may have one or more supplemental light sources 131 which can be activated in low light conditions.

Also, in order to process the images in various different types of light conditions (which may change based on whether agricultural machine 100 is heading into the sun, away from the sun, or otherwise), FIG. 1A shows that agricultural machine 100 can have a white balance camera or an incidental light sensor (light sensor 130). Light sensor 130 can sense the direction of the sun relative to agricultural machine 100, the color of the sun (such as whether the sky is overcast, whether machine 100 is traveling through a shadow, or other conditions that change the color of the light), and the light intensity among other things. Similarly, light sensors 130 may be disposed at one or more locations along boom 118 instead of, or in addition to, light sensor 130 on the body of the agricultural machine 100, as shown in FIG. 1A. The ambient lighting conditions are sensed by light sensor(s) 130 and the information representing the ambient lighting conditions is sent to image processing modules 124. The data can be sent using data over power transmission, using a gigabit multimedia serial link (GMSL or GMSL2) or using another communication mechanism.

Figure 1B:
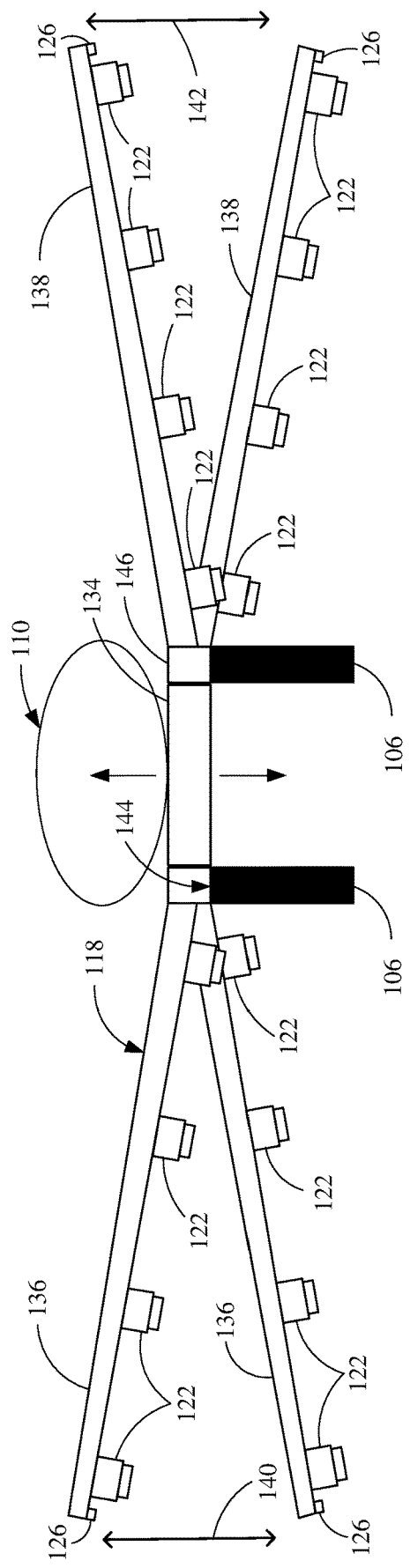
FIG. 1B is a pictorial view illustrating movement of a boom on an agricultural machine.

FIG. 1B shows a pictorial illustration of a rear view of agricultural machine 100, and items that are similar to those shown in FIG. 1A are similarly numbered. FIG. 1B shows that boom 118 can have a central boom section 134 and one or more boom arms 136 and 138 on either side of central boom section 134. In one example, central boom section 134 can be raised and lowered under force of a central boom actuator (not shown in FIG. 1B). As shown in FIG. 1B, boom arms 136 and 138 may rotate about pivot points 144 and 146, respectively. Thus, the image sensors 122 may not simply be traveling in a vertical direction when boom arms 136 and 138 are raised and lowered, but they are moving in an arc about pivot points 144 and 146. This can cause the orientation of the cameras to be focused more inwardly, toward a central axis of agricultural machine 100, or outwardly, away from agricultural machine 100. Thus, as the boom 118 moves, the perspectives of the cameras, and thus the fields of view of the image sensors 122 on the ground, will move as well. Similarly, as agricultural machine 100 travels through the field, it may encounter bumps, ruts, or other disturbances on the ground. This may cause the boom arms 136 and 138 to move upwardly or downwardly in the directions indicated by arrows 140 and 142. Therefore, in one example, the cameras or image sensors 122 are calibrated at different heights from the ground (e.g., at different boom positions). A calibration transform is generated that can be used to transform the captured images so that the area of interest (or region of interest—ROI) within the image captured by each image sensor 122 remains at a fixed location on the ground relative to the corresponding image sensor 122 (e.g., one meter in front of the image sensor in the direction of travel), regardless of the boom position.

Figure 1C:
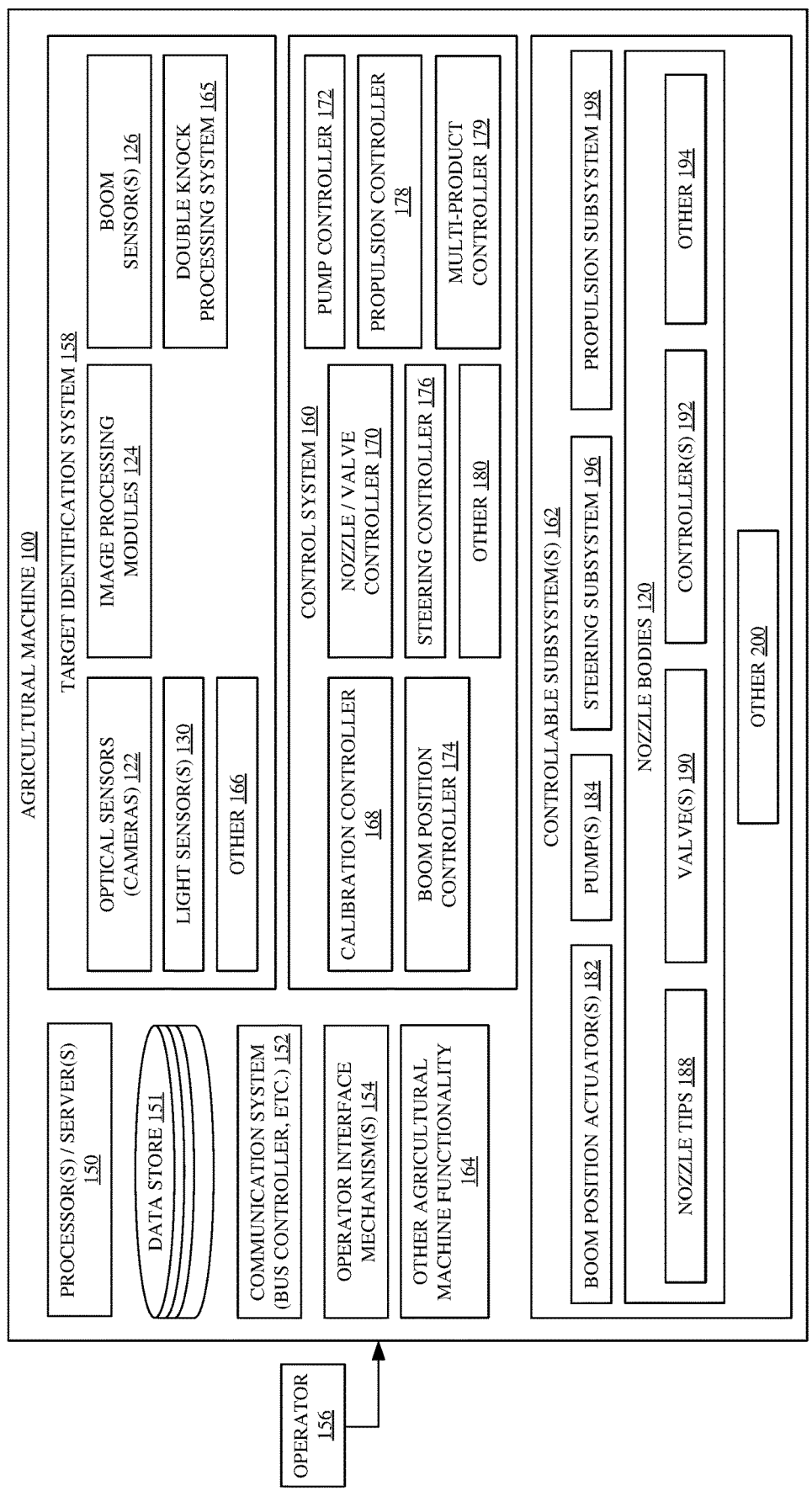
FIG. 1C is a block diagram showing one example of the agricultural machine in more detail.
Figure 1D:
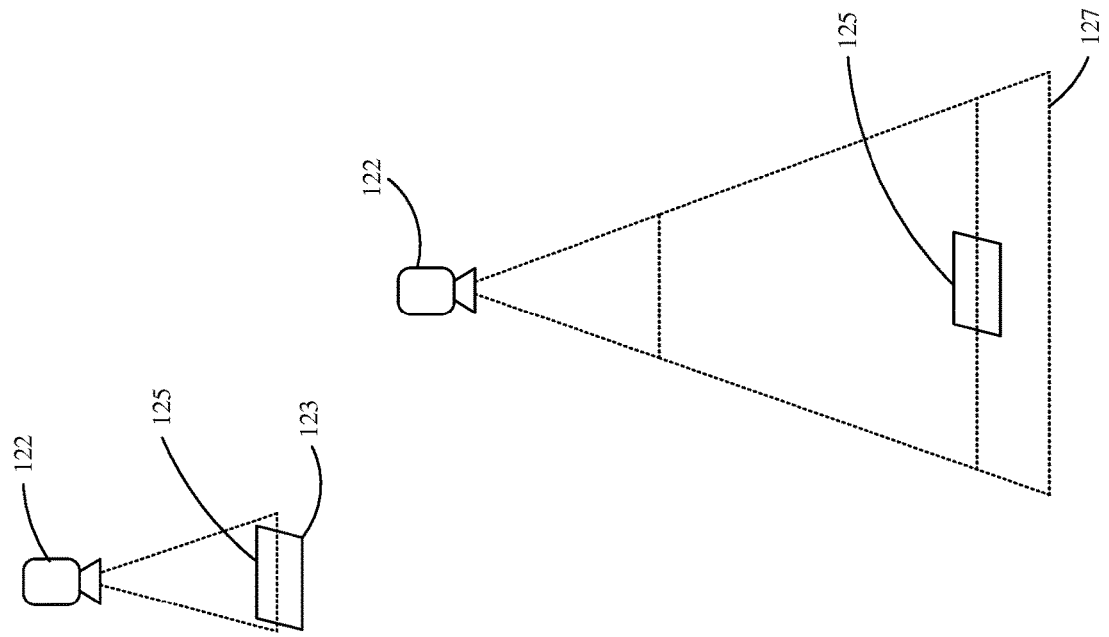
FIG. 1D shows how the region of interest of a camera changes relative to a field of view of the camera at two different camera heights above the ground.

FIG. 1C is a block diagram showing some portions of agricultural machine 100 in more detail. Some of the items shown in FIG. 1C are similar to those shown in FIGS. 1A and 1B and they are similarly numbered. FIG. 1C shows that agricultural machine 100 can also include one or more processors or servers 150, data store 151, a communication system 152, one or more operator interface mechanisms 154 that an operator 156 can interact with in order to control and manipulate agricultural machine 100, target identification system 158, control system 160, controllable subsystems 162, and agricultural machine 100 can include a wide variety of other agricultural machine functionality 164. Target identification system 158 can include optical sensors 122, image processing modules 124, light sensors 130, boom height/angle sensors 126, double knock processing system 165, and it can include other items 166. Control system 160 can include calibration controller 168, nozzle/valve controller 170, pump controller 172, boom position controller 174, steering controller 176, propulsion controller 178, and multi-product controller 179. Control system 160 can also include other items 180. Controllable subsystems 162 can include boom position actuators 182, one or more pumps 184, nozzle bodies 120 (which, themselves, can include one or more nozzle tips 188, valves 190, valve controllers 192, and other items 194), steering subsystem 196, propulsion subsystem 198, and a wide variety of other items 200.

Before describing the overall operation of agricultural machine 100, a brief description of some of the items shown in FIG. 1C, and their operation, will first be provided. Operator interface mechanisms 154 can include any of a wide variety of mechanisms that can be used to provide information to operator 156 and receive interactive inputs from operator 156. Operator interface mechanisms 154 can include audio, visual, and haptic mechanisms, among others. Examples of operator interface mechanisms 154 can include a steering wheel, joysticks, pedals, levers, buttons, microphones and speakers (such as when speech recognition functionality is provided), among other things. User interface mechanisms 154 can include display screens, touch sensitive display screens, lights, audible alert mechanisms, etc. When the user interface mechanisms 154 include a display screen, operator input mechanisms can be provided on the display screen. Such operator input mechanisms can include buttons, links, icons, or other user actuatable elements that can be actuated using a point and click device, a touch gesture, a voice input, or other interactions.

Communication system 152 can include a bus controller that controls information on one or more bus structures (such as a CAN bus, a plurality of different CAN subnetworks, or another bus) on agricultural machine 100. Communication system 152 can include wired networking components such as ethernet components that operate according to a known standard (e.g., IEEE 802.3), and other types of network and communication system components. Communication system 152 can also include other communication systems that allow agricultural machine 100 to communicate with remote devices or systems. Such communication systems can include a cellular communication system, a local area network communication system, a wide area network communication system, a near field communication system, or a wide variety of other communication systems.

Target identification system 158 illustratively identifies targets where material is to be applied by agricultural machine 100. For example, when agricultural machine 100 is to apply the material to crop plants, then target identification system 158 identifies crop plants (such as crop rows or other crop plants such as seeded crops). When agricultural machine 100 is to apply the material to a weed, for instance, then target identification system 158 identifies weeds so that the material can be applied to them. Therefore, each of the image sensors 122 captures images of a region of interest within the field of view corresponding to the image sensor 122. The captured image can be compensated or corrected based on information detected by light sensor 130. Image processing modules 124 then process the images captured by image sensors 122 to correct them and to identify targets (e.g., crop rows, weeds, etc.) in the images. The images can then be transformed based on information captured by boom sensors 126 and mapping coefficients that match pixels in the image (e.g., the pixels corresponding to a target) to actual locations on the ground. The image processing modules 124 identify which nozzles are to be actuated, and when they are to be actuated, to apply the material to the targets. That information can then be provided to control system 160 to control the nozzle bodies 120.

It may also happen that agricultural machine 100 makes multiple passes through a field, when the passes are separated by some duration of time. For instance, some weeds may need multiple applications of one or more herbicides, with one to two weeks between applications, in order to kill them. After the first application, the weeds may appear to be dead, but unless they are treated again, they may again begin actively growing. Similarly, the weeds may be resistant to the chemical that is applied during the first pass, so that the weed still appears vibrant during the second pass. Therefore, it may be desirable to have agricultural machine 100 apply an additional dose of herbicide to the weeds, or to apply a dose of different herbicide, even though they were previously treated.

In such cases, and as is described in greater detail below, target identification system 158 stores the location of the targets during the first pass through the field. Then, during the second pass through the field, even though the weeds may appear to be dead so that they are not identified as weed targets by target identification system 158, double knock processing system 165 identifies that particular geographic location (where the weed was treated during the first pass) as a target for a second application of the herbicide. Similarly, double knock processing system 165 can identify that a vibrant weed still exists where it was treated during the first pass and multi-product controller 179 can generate an output to apply a different chemical or an increased dose of the original chemical to the weed on the second pass than was applied during the first pass. Double knock processing system 165 receives the stored map of weed locations that was generated during the first pass and a geographic position sensor senses a geographic position of agricultural machine 100. The geographic position sensor may thus be a global navigation satellite system (GNSS) receiver, a dead reckoning system, a cellular triangulation system, or another position sensor. Based upon the current position of agricultural machine 100, its speed, and the dimensions of the machine, double knock processing system 165 can identify which nozzles will be passing over weed locations where another application of herbicide is to be administered. Multi-product controller 179 can determine whether the same or a different material is to be administered.

Thus, target identification system 158 (whether targets are identified based on inputs from sensors 122 or double knock processing system 165) generates an output indicating which nozzles are to be activated, when they are to be activated and a duration of time for which they are to be activated, based upon the image analysis performed by image processing modules and the processing performed by double knock target identification system 165. The outputs from target identification system 158 are provided to control system 160 which generates control signals to control controllable subsystems 162. Multi-product controller 179 determines which product is to be applied. Nozzle/valve controller 170 generates control signals to control nozzle bodies 120. The control signals are received by controller 192 which controls the on and off state of valves 190 to apply the correct material at the correct location, according to the correct timing. Controller 192 can also control nozzle tips 188 (where they are configurable) to change the area of application of the nozzle.

Pump controller 172 may generate control signals to control pumps 184 that pump the material to be applied through the conduits on boom 118 to the nozzle bodies 120. Boom position controller 174 may generate control signals to control boom position actuators 182 to move the various portions of boom 118 to different desired positions. Steering controller 176 may generate control signals to control steering subsystems 196 to control the heading of agricultural machine 100. Propulsion controller 178 may generate control signals to control propulsion system 198 (which may be an engine that drives ground engaging mechanisms 106 through a transmission, individual motors that drive the individual ground engaging mechanisms 106, or another power source that drives the propulsion of agricultural machine 100) to control the speed and forward/reverse direction of travel of agricultural machine 100.

Figure 2:
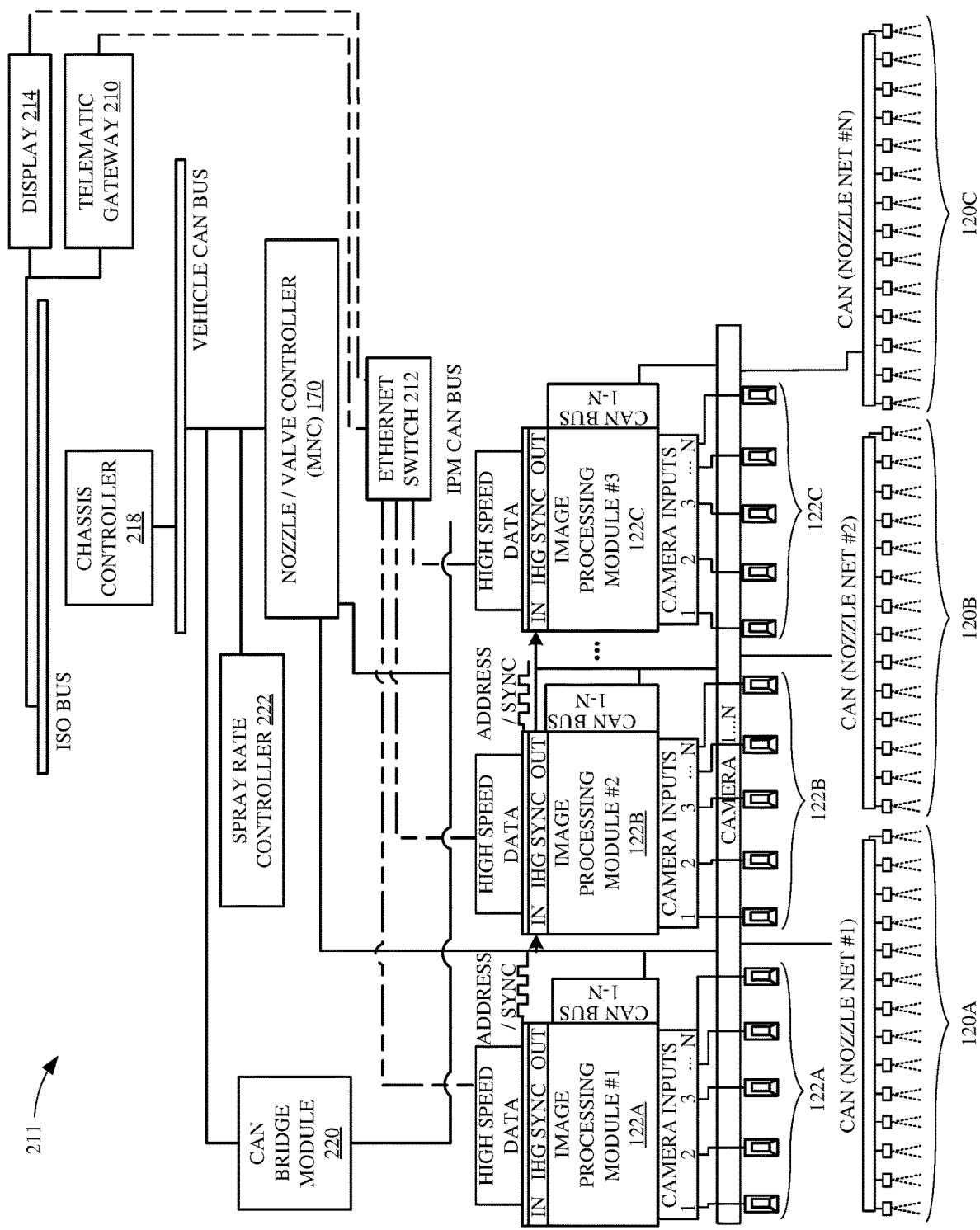
FIG. 2 is a partial block diagram, partial schematic diagram of a computing system architecture used in an agricultural machine.

FIG. 2 is a partial pictorial illustration and partial block diagram/schematic diagram, of control architecture 211 which includes different portions of agricultural machine 100. Similar items are similarly numbered to those shown in FIGS. 1A-1C. FIG. 2 shows that each image processing module 124 processes images from a corresponding set of sensors 122 for control of a corresponding set of nozzle bodies 120. For instance, image processing module 124A can receive inputs from a plurality of image sensors 122A and generate output signals that are used to control the open/close state of valves in a subset of nozzle bodies 120A. Image processing module 124B can receive inputs and process images from a different subset of image sensors 122B and generate output signals that are used to control the on/off state of valves in a second subset of nozzle bodies 120B. Image processing module 124C can receive inputs and process images from yet another subset of image sensors 122C and generate output signals to control valves in yet another subset of nozzle bodies 120C. While three image processing modules, three subsets of image sensors, and three subsets of nozzle bodies are shown in FIG. 2, it will be noted that more or fewer image processing modules, subsets of image sensors, and/or subsets of nozzle bodies can be used.

The information can be transferred from sensors 122 to their corresponding image processing modules 124 over a CAN bus. Control signals can be provided to nozzle bodies 120 over a different, or the same, CAN bus. In addition, each subset of image sensors 122 and nozzles can have their own CAN subnetwork. Further, as is described in greater detail below, the individual image processing modules 124A-124C can communicate with one another so that they each know which image sensors 122 and nozzle bodies 120 correspond to which of the various image processing modules 124. The image processing modules 124 can communicate through a telematic gateway 210 using an ethernet switch 212, with a display mechanism or display controller 214 that can be part of control system 160 and/or operator interface mechanisms 154. Nozzle/valve controller 170 can communicate with display controller 214 over a separate vehicle CAN bus 216 that may be controlled by a chassis controller 218. Communication system 152 (shown in FIG. 1C) can include CAN bridge module 220 which bridges communication across the various CAN buses and subnetworks on agricultural machine 100.

FIG. 2 also shows that agricultural machine 100 can include a spray rate controller 222. The rate of application of material across the field may vary based on a wide variety of different criteria. Spray rate controller 222 thus provides an output to nozzle/valve controller 170 indicating the rate at which material should be applied. Nozzle/valve controller 170 can then control the rate of flow of material through the nozzle bodies 120 based upon the spray rate received from spray rate controller 222.

Figure 3:
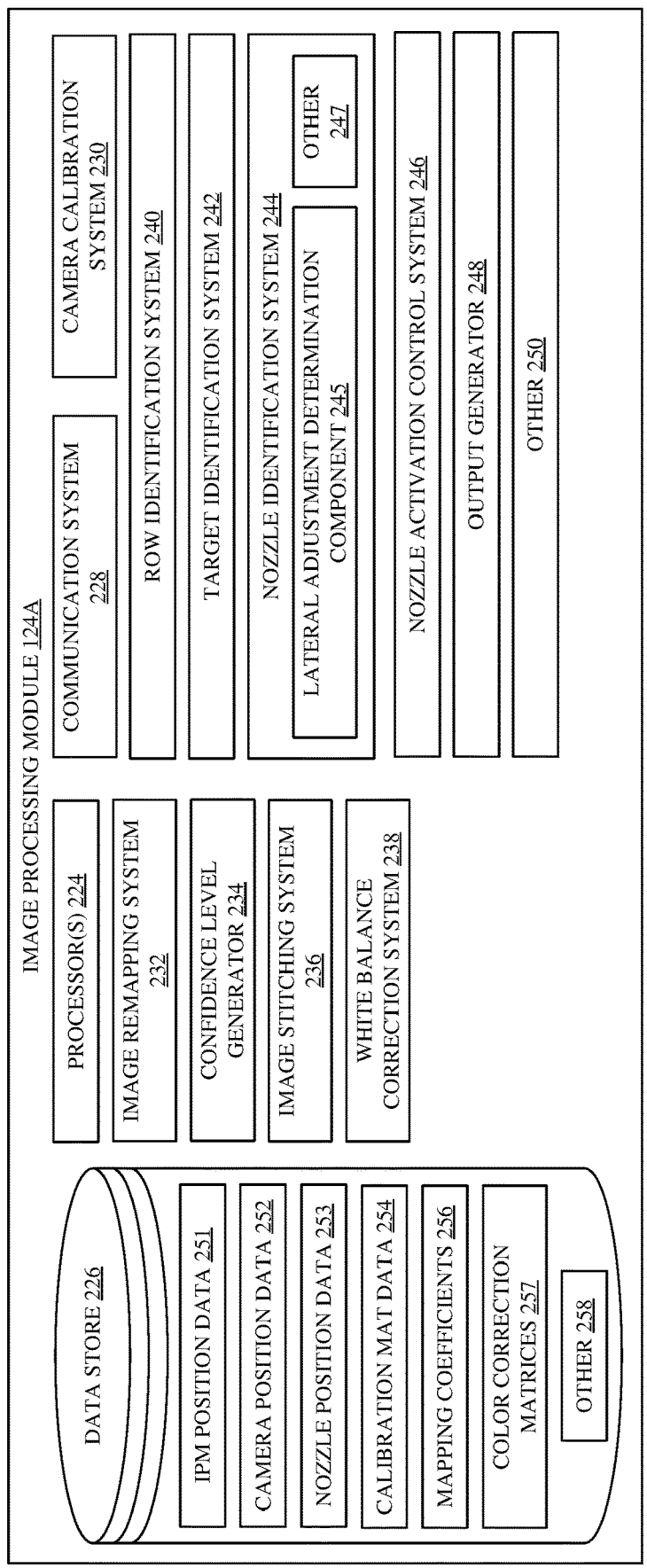
FIG. 3 is a block diagram of one example of an image processing module.

Before describing the operation of the architecture 211 illustrated in FIG. 2, the items in FIGS. 1C and 2 will now be described in greater detail with respect to FIGS. 3-11. FIG. 3 shows one example of a block diagram of an image processing module 124. The image processing modules 124A-124C can be similar or different. For purposes of the present description, it will be assumed that they are similar so that only image processing module 124A is described in FIG. 3. Each image processing module 124 can have its own set of processors 224, data store 226, communication system 228, camera calibration system 230, image remapping system 232, confidence level generator 234, image stitching system 236, white balance correction system 238, row identification system 240, target identification processor 242, nozzle identification system 244 (which can include lateral adjustment determination component 245 and other items 247), nozzle activation control system 256, and output generator 248. Image processing module 124A can also include other items 250. Data store 226, itself, can include image processing module (IPM) position data 251, camera position data 252, nozzle position data 253, calibration map data 254, mapping coefficients 256, color correction matrices 257, and it can include other items 258. Camera calibration system 230 controls agricultural machine 100 to move through a calibration process in which transforms are generated for each sensor 122, at each of a plurality of different positions relative to the ground. Image re-mapping system 232 remaps the regions of interest in each image, based upon the transforms, during runtime operation of agricultural machine 100. Confidence level generator 234 generates one or more confidence scores and/or quality scores corresponding to each image. The confidence scores and quality scores may be indicative of such things as the presence of obscurants, the ability of the system to accurately apply material based upon the image, whether the image is blurry or the image sensor 122 is damaged or blocked, among other things. Image stitching system 236 processes the images from multiple sensors 122 to aggregate them into a single continuous image of the ground in front of one or more of the sections of boom 118. White balance correction system 238 corrects the image for the location of the sun relative to the image, the color of the light (e.g., whether the image was taken in a shadow, under the clouds, etc.), the light intensity, among other things. Row identification system 240 identifies crop rows in the image. The crop rows can be used to apply material or to identify weeds or other targets. For instance, when the material is a fertilizer that is to be applied to the crop rows, then the output of row identification system 240 can be used to activate nozzle bodies 120 that are traveling over the crop rows. When the material is to be applied to weeds, the output of row identification system 240 can be used to mask off the crop rows in the image and to thus better identify weeds between the rows. Target identification processor 242 identifies targets in the images and nozzle identifications system 244 identifies which nozzles need to be activated to apply material to the targets. Nozzle activation control system 246 determines when the nozzles are to be activated, and for how long the nozzles are to be activated. Output generator 248 generates an output indicating which nozzles are to be activated, when those nozzles are to be activated, and the duration for which those nozzles are to be activated. Some of the items in image processing module 124A will now be described in greater detail.

As described above with respect to FIGS. 1B and 1D, color correction matrices 257 can be generated for each image sensor 122 and loaded into processing logic (either on image processing module 124A or on the image sensor 122) so the images can be corrected for distortion, color, lens shading, distortion, etc. Also, as agricultural machine 100 moves through the field, the position of boom 118 may change. Operator 156 may provide an input to control boom actuators 182 to raise or lower the various sections of boom 118. In another example, the agricultural machine 100 may hit a bump or a rut or other terrain that causes movement of boom 118. Also, a dip or gully or bump under the boom 118 may result in a change in the distance between the boom 118 and the ground. A change in the distance between boom 118 and the ground can change the orientation and perspective of the image sensors 122 relative to the ground and thus change the location of the images sensed by image sensors 122 relative to the nozzle bodies 120. In order to accommodate this, image processing modules 124 include camera calibration system 230 (described in greater detail below with respect to FIG. 4) that conducts a calibration process during which transforms are generated for each of the image sensors 122 at different boom positions. The transforms ensure that the ROI, within the field of view of each image sensor, corresponds to a known location on the ground, relative to the image sensors 122 and nozzle bodies 120 (e.g., the ROI always corresponds to an area on the ground 2 m ahead of the boom and 1 m×1 m in area). The calibration process, as is described in greater detail below, entails calibration controller 168 (shown in FIG. 1C) controlling boom position actuators 182 to move the boom 118 to different positions. At each position, image sensors 122 are calibrated so that the desired transform is generated for that boom position. The calibration controller 168 can then control the boom position actuators 182 to move the boom 118 to another position where the calibration transforms are generated for the image sensors at that boom position. Then, during runtime operation, the boom 118 position is sensed and the calibration transforms for that boom position are retrieved for each image sensor and used in the image processing.

Figure 4A:
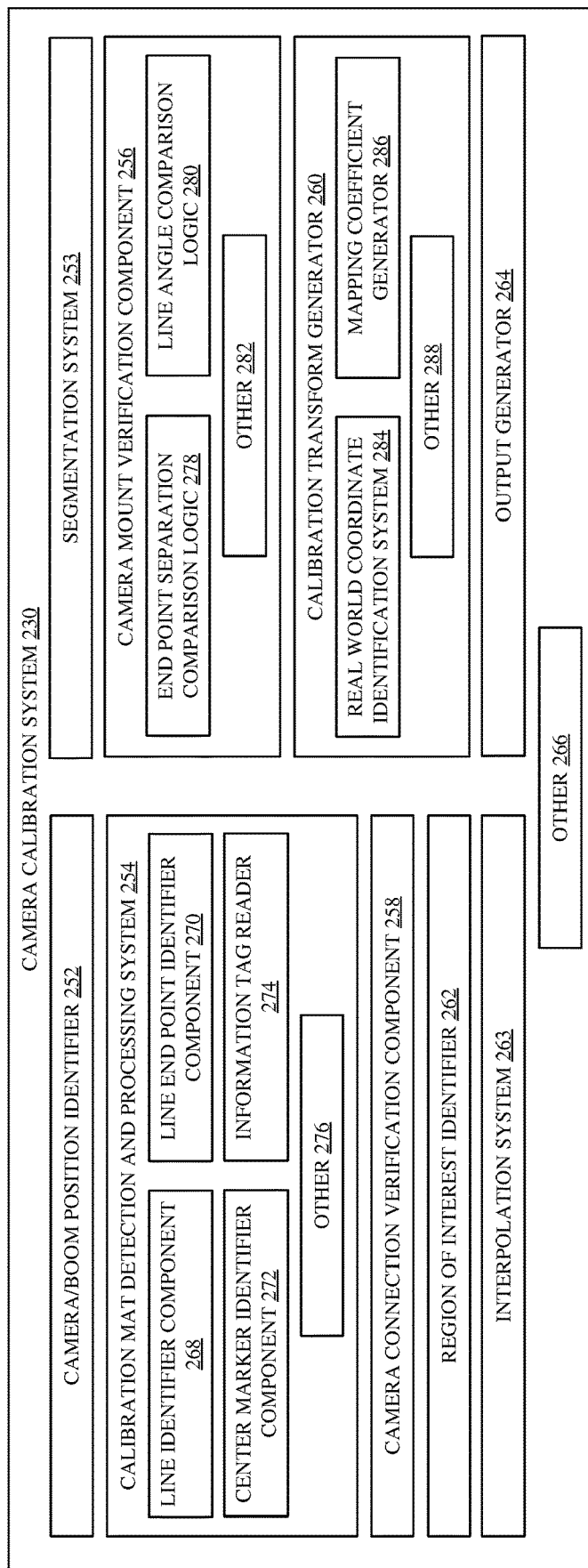
FIG. 4A is a block diagram of one example of a camera calibration system.

FIG. 4A is a block diagram showing one example of camera calibration system 230 in more detail. Camera calibration system 230 includes camera/boom position identifier 252, segmentation system 253 calibration mat detection and processing system 254, camera mount verification system 256, camera connection verification component 258, calibration transform generator 260, ROI identifier 262, interpolation system 263, output generator 264, and other items 266. Calibration mat detection and processing system 254 illustratively includes line identifier component 268, line endpoint identifier component 270, center marker identifier component 272, information tag reader 274, and other items 276. Camera mount verification component 256 may include endpoint separation comparison logic 278, line angle comparison logic 280, and other items 282. Calibration transform generator 260 may include real-world coordinate identification system 284, mapping coefficient generator 286, and other items 288 as well. A brief description of the items in camera calibration system 230, and their operation, will now be provided.

Figure 4B:
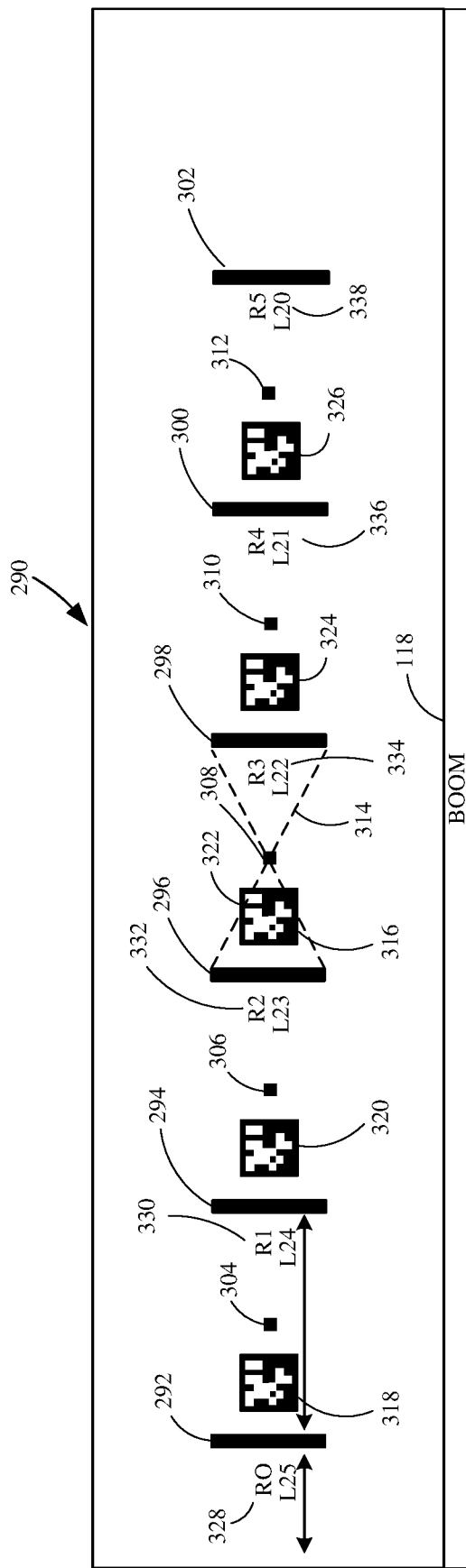
FIG. 4B shows one example of a calibration mat that can be used to perform camera calibration.

Camera/boom position identifier 252 generates an output that is indicative of a position and/or orientation of the image sensors 122 on boom 118. Thus, camera/boom position identifier 252 may include the boom sensor 126 that senses the height of boom 118 above the ground. Position identifier 252 can also include other sensors or detectors or logic elements that determine the particular position and orientation of each of the image sensors 122, at different boom positions. The position and orientation of image sensor 122 can be derived based on the location and orientation of various sensors, given the dimensions of machine 100, the spacing of the image sensors 122, the mounting angle of the image sensors, etc. In one example, in order to calibrate the image sensors 122 on boom 118, an operator moves machine 100 into position so that boom 118 is proximate a calibration mat. The calibration mat illustratively has markers on it so that the image sensors 122 can capture those markers in their field of view and the cameras can be calibrated FIG. 4B shows one example of a portion of such a calibration mat 290. In one example, calibration mat 290 may be symmetrical and can be used with booms with image sensors and nozzle bodies of any spacing. Calibration mat 290 illustratively has a set of markers (not shown) that can be used to align the boom 118 with mat 290. For instance, the calibration boom may be fitted with one or more plumb lines. When the plumb lines are aligned with markers on calibration mat 290, then boom 118 is properly aligned to the calibration mat 290. Also, calibration mat 290 may also have a repeating pattern of equally spaced vertical lines or bars 292, 294, 296, 298, 300 and 302, and a central marker (or dot) 304, 306, 308, 310, and 312. The lines are colored differently than the background color. The dots may be centrally located between adjacent lines so that, if a line is drawn from a first end of one of the adjacent lines to an opposite end of the other adjacent line, and vice versa (e.g., if lines 314 and 316 are drawn between the opposite ends of calibration lines 296 and 298), then they will form an X and a cross at a central point where central marker 308 is located. The central markers can be of the same or different color as the lines. Also, in one example, calibration mat 290 includes a plurality of informational tags 318, 320, 322, 324, and 326. In the example shown in FIG. 4B, the informational tags 318-326 are April tags which may be a bar code, a QR code, or the like. The information tags may contain information identifying a line number or other line identifier of the adjacent line. The information can also be used to identify image sensor installation failure (e.g., wrong image sensor connected to the wrong image processing unit 124 or the wrong port on the image processing module 124. Also, in one example, the calibration mat 290 can include a set of human readable codes or tags 328, 330, 332, 334, 336, and 338. In one example, the calibration lines, central markers, informational tags and human readable tags can be of a pre-defined color or different predefined colors. Therefore, the lines, markers and tags can be quickly identified by image processing modules 124).

Also, in one example, calibration mat 290 is not symmetrical vertically so the bottom of the mat can always be placed closest to boom 118. The mat can extend across the entire boom 118, across half of boom 118, or across a different amount of boom 118.

Line identifier component 268 (in FIG. 4A) identifies the lines 292-302. Line endpoint identifier component 270 identifies points on calibration mat 290 corresponding to the opposite ends of each line 292-302. Center marker identifier component 272 identifies the center markers 304-312 and information tag reader 274 may read the information tags 318-326. As is described in greater detail below with respect to FIGS. 11-13B, calibration mat detection and processing system 254 detects the information on calibration mat 290 so that that calibration process can be completed.

Camera mount verification component 256 verifies whether the various cameras (or image sensors) 122 are properly mounted on the boom 118. Endpoint separation comparison logic 278 compares the separation of the endpoints corresponding to the ends of the calibration lines 292-302, on the image of the calibration mat 290 captured by a camera or image sensor 122 that is being calibrated. Logic 278 compares the distance between the adjacent endpoints of two calibration lines to ensure that the image sensor 122 is not mounted upside down. Line angle comparison logic 280 compares the angles of the identified calibration lines 292-302 in the captured image to determine whether the image sensor 122 is mounted properly (within a threshold of a desired mounting angle) as well. Again, this is described below.

Camera connection verification component 258 determines whether the output of the image sensor 122 being calibrated is connected to the proper input port on the corresponding image processing module 124. This determination may be made using the information read from information tags 318-326.

Region of interest identifier 262 identifies a ROI within the field of view of the image sensor being calibrated, and calibration transform generator 260 generates one or more transforms that can be applied to the image to transform the portions of the captured image into real-world coordinates on the ground over which the image sensor is mounted. Real-world coordinate identification system 284 identifies real-world coordinates and mapping coefficient generator 286 generates mapping coefficients that are used to transform the pixels on an image captured by the image sensor into a location on the ground defined in terms of the real-world coordinates. Output generator 264 generates an output indicative of the real-world coordinates and mapping coefficients so that they can be used later, during runtime operation of agricultural machine 100.

Figure 5:
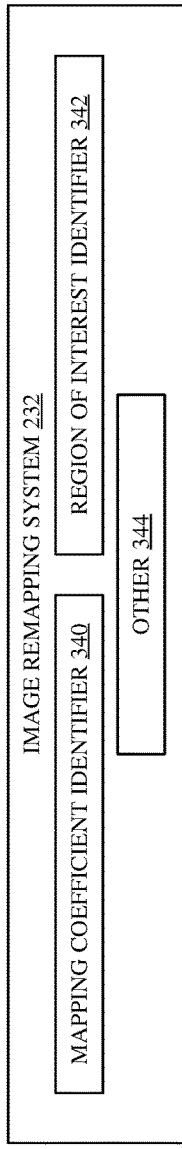
FIG. 5 is a block diagram of one example of an image remapping system.

FIG. 5 is a block diagram showing one example of image remapping system 232. In one example, the image sensors 122 will be calibrated for different positions above the ground. For instance, during calibration, boom 118 is moved to a first position, and all the image sensors are calibrated so that the corresponding mapping coefficients, for each image sensor are generated for that position. Then, the boom is moved to another position and the image sensors are again calibrated for that new position, so the corresponding mapping coefficients are generated for each image sensor at that position. This will continue for a plurality of different positions of boom 118 relative to the ground. Therefore, during runtime, image remapping system 232 illustratively includes mapping coefficient identifier 340, region of interest identifier 342, and it may include other items 344. Mapping coefficient identifier 340 receives an indication of boom position and obtains the mapping coefficients for the image sensor from which an image under analysis was received, based upon the position of the boom 118 above the ground. Region of interest identifier 342 identifies the ROI, on the ground under the machine 100, using the image captured by the image sensor under analysis, and using the mapping coefficients that map the pixels in that image to a geographic location on the ground.

Figure 6:
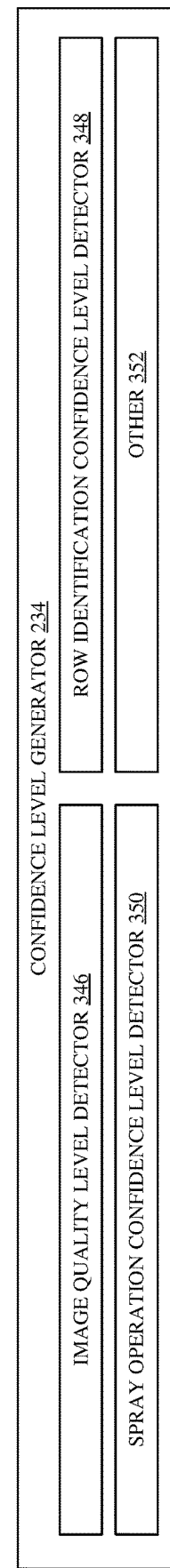
FIG. 6 is a block diagram of one example of a confidence level generator.

FIG. 6 is a block diagram showing one example of confidence level generator 234. Recall that confidence level generator 234 can generate one or more confidence level metrics or quality level metrics indicative of the quality of the image being analyzed and/or the confidence that the system has in being able to identify targets in that image and apply material to the targets. For instance, it may be that a number of obscurants (such as dust, smoke, etc.) are detected in the air. This may reduce the quality level corresponding to the image. In another example, it may be that the image sensor 122 is malfunctioning, or is blocked by mud, or other debris. This may also reduce the quality of the image or the confidence with which the system can identify and apply material to targets in the image. In addition, agricultural machine 100 may be traveling over an area of the field that has a high density of weeds. In such an area, it can be difficult to distinguish between the crop rows and the weeds, as the entire field of view of the image sensor 122 may be densely populated with vegetation. Further, it may be that the image sensor 122 is moving very quickly, such as when the agricultural machine 100 is turning and the image sensor 122 is an outboard camera on boom 118 which is traveling very quickly during the turn. When the image sensor 122 is traveling very quickly, it can be more difficult to identify targets and activate the nozzle 120 to spray targets quickly enough that the target can be covered by the material sprayed by the nozzle (because the image sensor is moving so quickly over the ground). All of these and other factors may bear on the quality of the image being processed and the confidence with which the system can identify and apply material to targets.

Therefore, confidence level generator 234 may include image quality confidence level detector 346, row identification confidence level detector 348, spray operation confidence level detector 350, and it may include other items 352. Image quality confidence level detector 346 can sense criteria that bear upon the quality of the image. Image quality confidence level detector 346 then generates an output indicative of the image quality. Row identification confidence level detector 348 may detect or consider criteria that bears upon the ability of the image processing module to identify crop rows. Row identification confidence level detector 348 generates an output indicative of the confidence with which crop rows are identified. Spray operation confidence level detector 350 detects or considers criteria that affect the confidence with which the system can accurately apply material to a target. Spray operation confidence level detector 350 generates an output indicative of such a confidence level. The image quality and the various confidence levels generated by confidence level generator 234 may be considered by other logic or components in the system in determining whether and how to apply material to the field.

Figure 7:
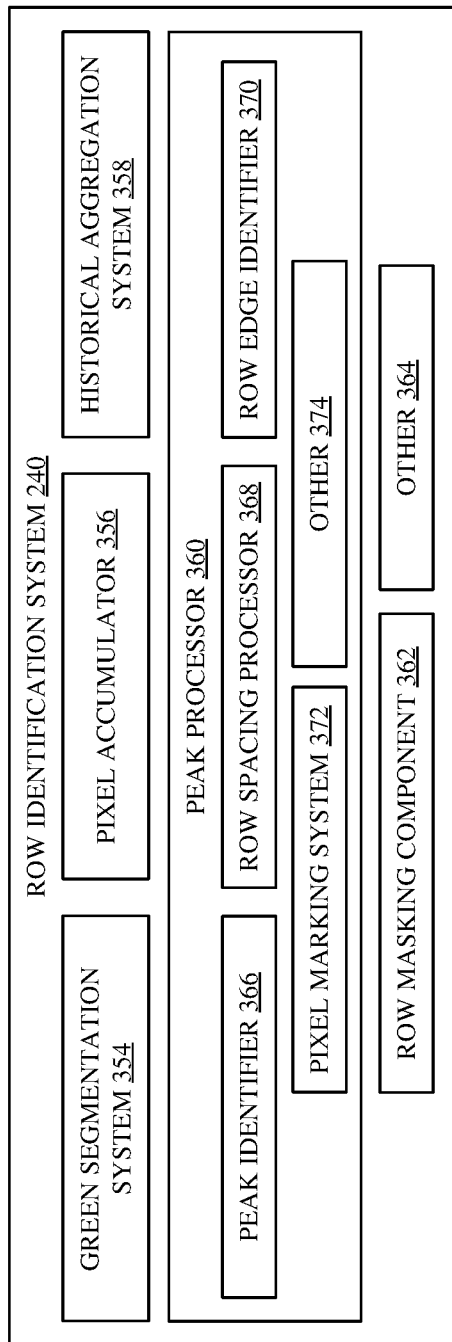
FIG. 7 is a block diagram of one example of a row identification system.

FIG. 7 is a block diagram showing one example of row identification system 240. Row identification system 240 may include green segmentation system 354, pixel accumulator 356, historical aggregation system 358, peak processor 360, row masking component 362, and other items 364. Peak processor 360 may include peak identifier 366, row spacing processor 368, row edge identifier 370, pixel marking system 372, and other items 374. The operation of row identification system 240 is described in greater detail below with respect to FIGS. 26A-31. Briefly, however, green segmentation system 354 segments the image under analysis between green pixels and non-green pixels. Pixel accumulator 356 accumulates pixels in the vertical direction on the image (the direction of travel of agricultural machine 100) and historical aggregation system 358 aggregates the accumulated pixel values with historical representation of those pixels. Peak identifier 366 identifies peaks in the accumulated and historically aggregated pixel values and row spacing processor 336 identifies row spacing (e.g., center-to-center row spacing) given the peaks identified by peak identifier 366. Row edge identifier 370 then identifies the edges of the rows in the image based upon the row spacing and the accumulated and historically aggregated pixel values. Pixel marking system 372 marks pixels within the row boundaries to identify crop row plants.

It may be in some scenarios that agricultural machine 100 is to apply material to the rows. In that case, once the rows are identified, areas other than rows can be masked by row masking component 362 and the particular nozzles that are to be activated to apply material to the rows can be activated. In other scenarios, it may be that agricultural machine 100 is applying material to plants other than crops. In that case, row masking component 362 may mask the rows in the image being processed so that targets (e.g., weeds) can be identified in areas other than the crop rows. Thus, row masking component 362 may mask the rows so that target identification can proceed in the other areas.

Figure 8:
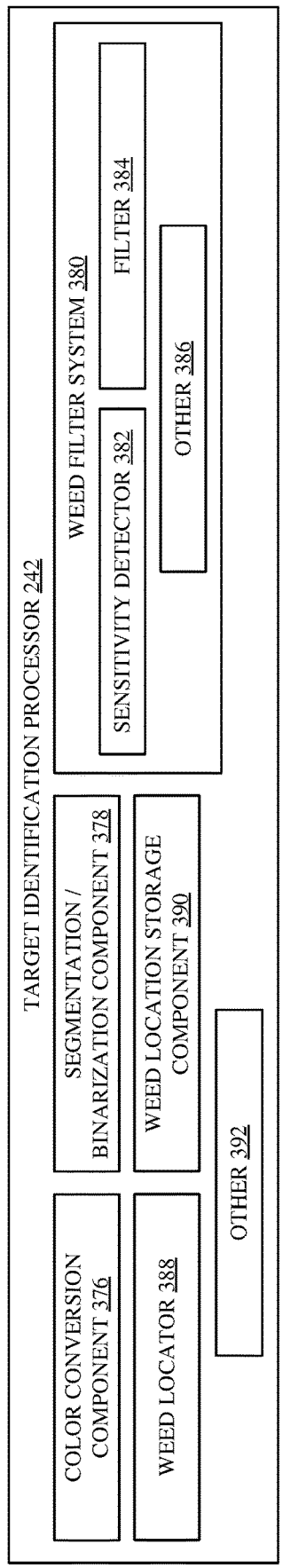
FIG. 8 is a block diagram of one example of a target identification processor.

FIG. 8 is a block diagram of one example of target identification processor 242. Target identification processor 242 may identify targets for application of material by agricultural machine 100 in the image currently being processed. Target identification processor 242 may include color conversion component 376, segmentation/binarization component 378, weed filter system 380 (which may include sensitivity detector 382, filter 384 and other items 386), weed locator 388, weed location storage component 390, and other items 392.

In one example, color conversion component 376 converts the color space of the image from a red, green blue (RGB) color space to a luma signal (Y), red difference chroma component (Cr), and blue difference chroma component (Cb), also referred to as a YCrCb color space. Segmentation/binarization component 378 then segments the green colors in the image, and binarizes the image so that those pixels in the image that are of a sufficiently green color are assigned a value of 1 and the remainder of the pixels are assigned a value of 0. Weed filter system 380 may filter the identified weeds or other targets, so that only targets of a sufficient size are identified. For instance, if the sensitivity value is increased, then weed detection mechanisms will detect weeds of a smaller size, while if the sensitivity value is reduced, then only weeds of a larger size will be detected.

Sensitivity detector 382 thus detects a sensitivity value which may be a default value, an operator input value, an automatically set or machine learned value, or another sensitivity value. Filter 384 then filters the potential targets (e.g., weeds) within the image based upon the sensitivity value detected by sensitivity detector 382. Weed locator 388 then detects or locates the weeds (or targets) within the image, based upon the output of filter 384. Weed location storage component 390 stores the geographic location of the identified weeds (or targets) for later use. For instance, where agricultural machine 100 is spraying weeds based upon real-time detection, the weeds may be sprayed, but their location may also be stored. Then, during a second pass through the field at a later time, the agricultural machine 100 may again apply material to those weed locations, even if the weeds appear to be dead. Thus, weed, location storage component 390 can include a mechanism that interacts with data store 226 (shown in FIG. 3) to store weed location, or weed location storage component 390 can include a separate data store for storing the weed locations.

Figure 9:
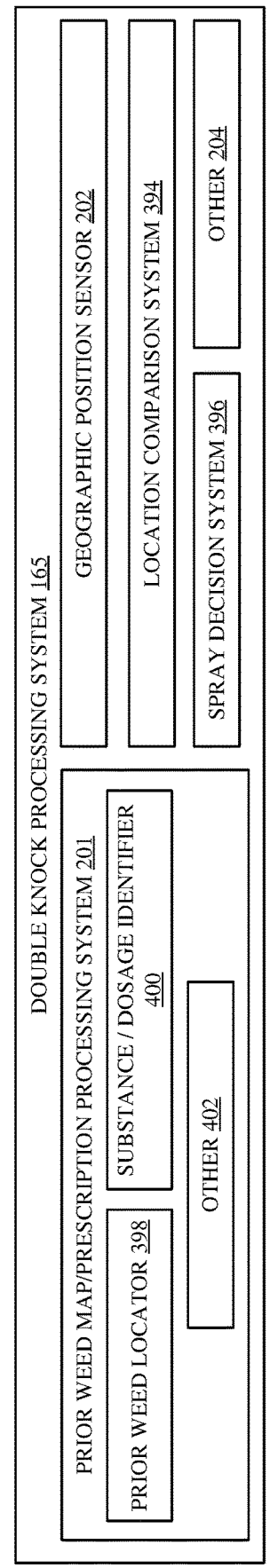
FIG. 9 is a block diagram of one example of a double knock processing system.

FIG. 9 is a block diagram of double knock processing system 165. Double knock processing system 165, as briefly mentioned above, processes the stored weed locations to determine whether locations are to be sprayed (or other material is to be administered or applied) based upon location of agricultural machine 100, and not necessarily based on whether weeds or targets are located in real time within the images being processed. For instance, though the weeds may appear dead in the image, they may still have life that will cause the weed to continue to grow. Reapplying material to a weed that has already been treated is sometimes referred to as a "double knock" application process. Double knock processing system 165 includes geographic position sensor 202, prior weed map/prescription processing system 201, location comparison system 394, spray decision system 396, and can include other items 204. Prior weed map/prescription processing system 201 may include prior weed locator 398, substance/dosage identifier 400, and can include other items 402. Geographic position sensor 202 senses the geographic position of agricultural machine 100. From the sensed geographic position, the geographic position of each of the nozzle bodies 120 on machine 100 can be derived or otherwise sensed. Prior weed map/prescription processing system 201 obtains a prior weed map such as the weed locations stored by weed location storage component 390 during a prior pass through a field. System 201 may also obtain the prior weed map from other sources. System 201 may also obtain a prescription indicating the particular material, the strength of the material, the application rate, etc., to be applied to the weeds treated on the prior weed map. Prior weed locator 398 locates the weeds on the prior weed map and substance/dosage identifier 400 identifies one or more of the substance or dosage or application rate to be applied to those weeds. Location comparison system 394 compares the location of machine 100 (or the location of the spray areas treated by the nozzle bodies 120 on machine 100) to the location of the weeds and spray decision system 396 determines whether any nozzle bodies 120 are to be activated, which nozzle bodies 120 are to be activated, and the timing of activation of those nozzle bodies 120 in order to apply a particular material to the weed locations obtained from the prior weed map.

Figure 10:
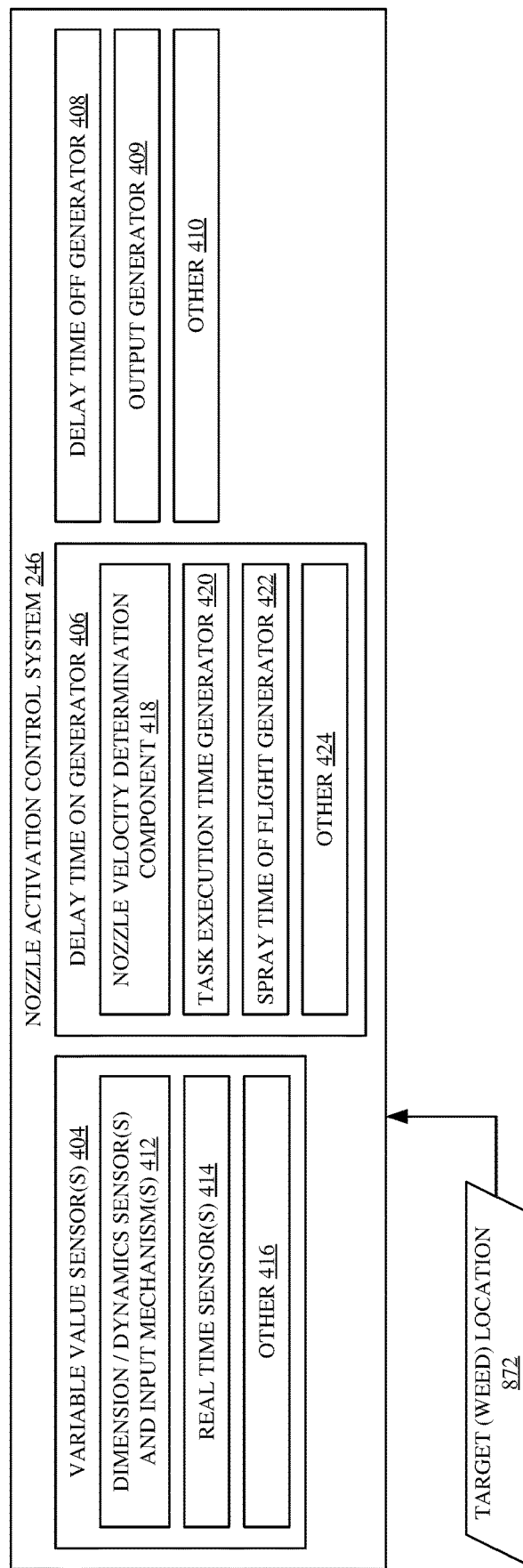
FIG. 10 is a block diagram of one example of a nozzle activation control system.

FIG. 10 is a block diagram showing one example of nozzle activation control system 246. In the example shown in FIG. 10, nozzle activation control system 246 may include variable value sensors 404, delay time on generator 406, lateral adjustment determination component 407, delay time off generator 408, output generator 409, and may include other items 410. Variable value sensor 404 may include dimension/dynamics sensors and input mechanisms 412, real-time sensors 414, and other items 416. Delay time on generator 406 may include nozzle velocity determination component 418, task execution time generator 420, spray time of flight generator 422, and may include other items 424 as well. The operation of nozzle activation control system 246 is described below with respect to FIGS. 32-36. Briefly, however, variable value sensors 404 may sense or detect the values of a wide variety of variables or criteria that are used 31 in determining which nozzles to activate, when to activate nozzles, how long to keep them on, and when to deactivate them. Dimension/dynamics sensors and input mechanisms 412 obtain machine dimensions and machine dynamics that are used in the nozzle activation calculations. The dimensions and dynamics can be sensed, or they can be default dimensions and/or dynamics. The dimensions and dynamics can be operator input dimensions and dynamics, or the dimensions and dynamics can be obtained in a wide variety of other ways as well. Real-time sensors 414 perform real-time sensing or detection of variable values that are used in the calculations for nozzle selection and activation. Examples of the dimensions, dynamics, and real-time sensed values are described in greater detail below with respect to FIGS. 32-35.

Nozzle velocity determination component 418 determines the velocity of the nozzles (nozzle velocity relative to the ground), that are to be activated. Spray time of flight generator 422 determines how much time the material will spend between when it leaves the nozzle and when it impacts the ground or target. Task execution time generator 420 identifies a time when the nozzle activation should occur. In identifying the time, task execution time generator 420 considers how far the target is from the nozzle, the speed at which the nozzle is traveling, the time required between energizing a corresponding valve so that material can flow through it and when the valve actually opens and material begins to flow, the time of flight of the material between leaving the nozzle and reaching the ground, and any buffer area around the target (for instance, it may be desirable to spray 6 inches on either side of a target to ensure that the target is adequately covered).

Delay time off generator 408 performs similar calculations to delay time on generator 406, except that delay time off generator 408 determines how long to wait (after the nozzle is activated), to turn the nozzle off (or deactivate it). Determining the deactivation time will consider the amount of time needed from actuation of the corresponding valve until the valve closes, the time of flight of the material leaving the nozzle (after the valve is closed) until it reaches the ground, the speed of the nozzle over the ground, and any desired buffer area on the ground.

Figure 11:
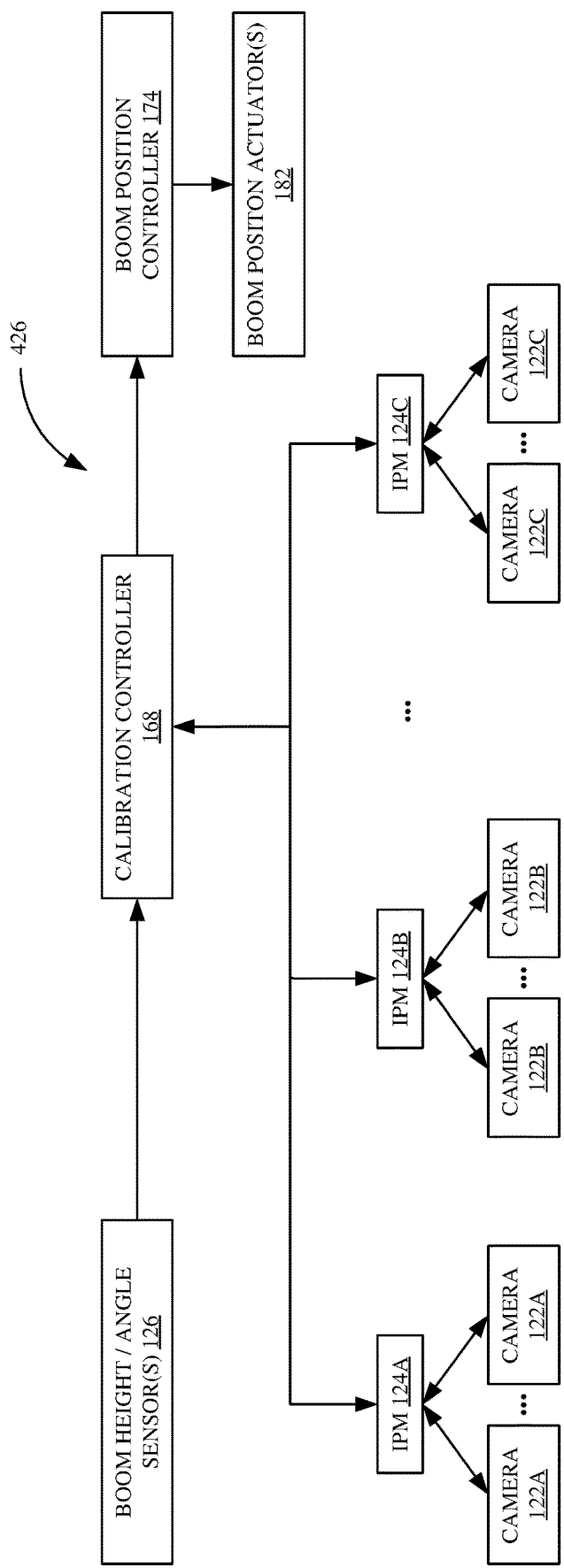
FIG. 11 is a block diagram of one example of a camera calibration architecture.

FIG. 11 is a block diagram of one example of a calibration architecture 426. The items shown in architecture 426 are also shown in previous figures, and they are similarly numbered. In operation, it is first assumed that agricultural machine 100 is positioned so that its boom 118 is in a pre-defined location relative to a calibration mat 290, one example of which is shown in FIG. 4B. Aligning the boom 118 relative to calibration mat 290 can be done, as described above, by dropping one or more plumb lines from boom 118 and aligning them with marks on calibration mat 290.

Boom sensors 126 sense the height of the boom above the ground. This can be done in a variety of different ways. The sensors can be radar, LIDAR, or other sensors. The boom sensors 126 can be sensors that sense the rotation of a boom arm about a pivot axis. The boom sensors 126 can be sensors that sense the extension or other position of a boom position actuator 182 that is used to raise and lower the different sections of the boom 118. The input from boom sensor 126 is provided to calibration controller 168. Calibration controller 168 then provides the boom height or position to the camera calibration systems 230 in each of the various image processing modules 124A-124C. For the identified boom position, each of the image processing modules 124A-124C obtains images from their corresponding image sensors 122 (image sensors in subset 122A, 122B, and 122C, respectively). The images for each image sensor 122 are processed by the camera calibration system 320 on each image processing module 124A-124C

The present description will proceed with respect to image processing module 124A processing an image from the first image sensor in subset 122A. Cameras/boom position identifier 252 (shown in FIG. 4A, which may be boom sensor 126) identifies the particular position of the image sensor 122A above the ground. For instance, at the sensed boom height, the camera may be at a pre-defined position above the ground. This predefined position may be stored in camera position data 252, for instance. In another example, the height of the image sensor above the ground can be correlated to boom height in other ways, or it can be calculated based on the boom height, or the boom height can be otherwise determined. Calibration mat detection and processing system 254 obtains calibration mat data 254 from data store 226. The calibration mat data 254 may define the configuration of the particular calibration mat 290 being used.

Calibration mat detection and processing system 254 then detects the various items on the calibration mat 290, such as lines 292-302 and markers 304-312, and camera mount verification component 256 verifies that the camera is properly mounted on the boom. Camera connection verification component 258 confirms that the image sensor 122 being calibrated is plugged into the proper port in image processing module 124A. Calibration transform generator 260 then generates the mapping coefficients for the image sensor 122 at this particular boom position. Image processing module 124A does the same for each image sensor 122A that it is connected to. The other image processing modules 124-124C calculate the mapping coefficients for each of the image sensors 122B-122C that they are connected to as well. In response to the mapping coefficients are calculated for each of the image sensors, then calibration controller 168 commands boom position controller 174 to move the boom position actuators 182 to a new position. For instance, it may be that the boom is started in its maximum lowered position and then incrementally moved through a series of target positions to its maximum raised position. At each of the incremental target positions, the image processing modules 124A-124C generate mapping coefficients for each of the image processors 122A-122C so that those mapping coefficients can be used, during runtime. There will thus be a set of mapping coefficients for each boom position.

Figure 12A:
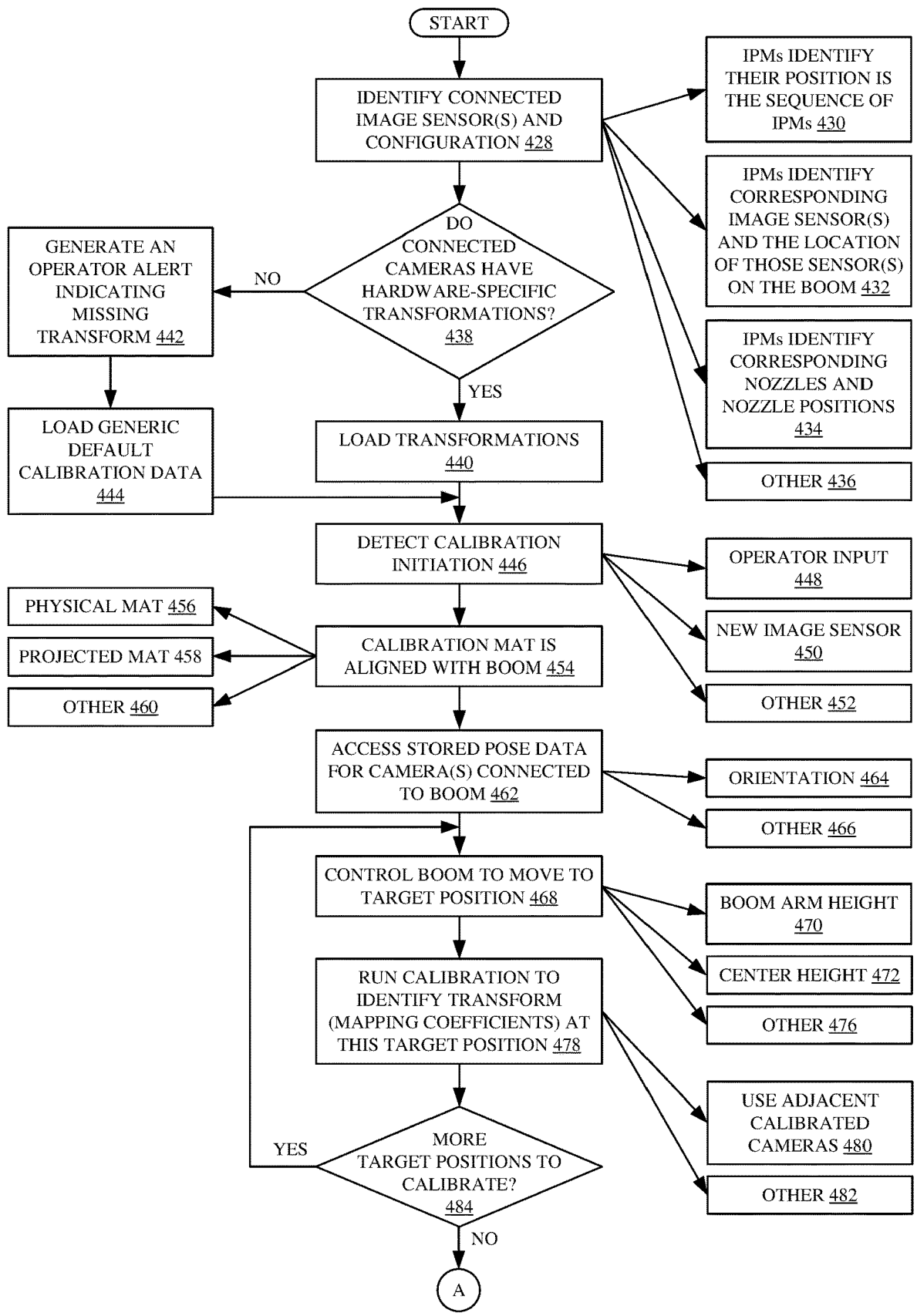
FIGS. 12A and 12B (collectively referred to herein as FIG. 12) illustrate a flow diagram showing one example of a calibration operation.
Figure 12B:
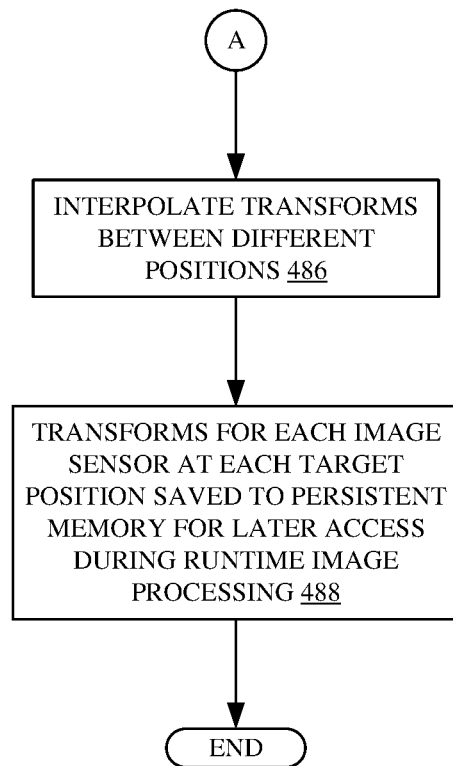

FIGS. 12A and 12B (hereinafter referred to as FIG. 12) show a flow diagram illustrating one example of the overall calibration operation used by calibration architecture 426 in generating the mapping coefficients for each image sensor, at each different target boom position. At the beginning of the calibration process, all of the image sensors 122A-122C, that are connected to calibration controller 168 through image processing modules 124A-124C are identified, and their configuration is identified as well. Identifying the image sensors 122A-122C and the configuration of those image sensors 122A-122C is indicated by block 428 in the flow diagram of FIG. 12. For instance, each of the image processing modules 124A-124C sequentially address themselves on their corresponding CAN bus. This addressing can be accomplished by passing an address/sync message (shown in FIG. 2) between the various image processing modules 124A-124C, beginning with a first image processing module in the sequence of image processing modules (e.g., beginning with image processing module 124A). Upon receiving the address/sync message, image processing module 124A accesses image processing module position data 251 (in data store 226 in FIG. 3) which identifies the position of image processing module 124A, in the sequence of image processing modules 124A-124C, based upon the signature of the address/sync message. For instance, image processing module position data 252 may be in a lookup table that correlates the address/sync messages (or an identifiable characteristic of those messages) to an image processing module position in the sequence of image processing modules 124. Having the image processing modules 124 identify their position in the sequence of image processing modules 124A-124C is indicated by block 430 in the flow diagram of FIG. 12. In response to determining its position in the sequence, image processing module 124A looks up (e.g., in another table in camera position data 252) the set of optical sensors or image sensors 122A that it is connected to. The camera position data 252 also indicates the position of each image sensor 122A on the boom structure 118. Identifying the corresponding image sensors 122A and the locations of those sensors on the boom structure 118 is indicated by block 432 in the flow diagram of FIG. 12

The position of image processing module 124A also identifies, in nozzle position data 253, the particular set of nozzle bodies 120A that this particular image processing module 124A is responsible for. Identifying the set of nozzle bodies 120A corresponding to this particular image processing module 124A, and the positions of each of those nozzles, is indicated by block 434 in the flow diagram of FIG. 12. The image sensors and their configuration, relative to image processing modules and nozzles can be identified in other ways as well, and this is indicated by block 436.

Once image processing module 124A determines its position, and the positions of its corresponding image sensors and nozzle bodies, module 124A increments the address/sync message and passes the address/sync message to the next image processing module 124B in the sequence. This continues until all image processing modules 124A-124C in the system have determined their positions, the image sensors they are responsible for, the positions of those image sensors, the nozzle bodies they are responsible for, and the positions of those nozzle bodies.

Calibration controller 168 then accesses data store 226 to determine whether the image sensors 122 already have hardware-specific transformations (or mapping coefficients) 256 and color correction matrices 257, as indicated by block 438 in the flow diagram of FIG. 12. If so, then those transformations and correction matrices are loaded into image processing module 124A so that they can be used during runtime target acquisition and treatment. Loading the hardware-specific transformations and matrices is indicated by block 440 in FIG. 12. If there are no hardware-specific transformations and matrices, then calibration controller 168 generates an operator alert indicating that at least some of the image sensors is missing the transforms and matrices, as indicated by block 442. Image processing module 124A can then load generic or default calibration data which may result in target detection and treatment that is less accurate than the hardware-specific transforms and matrices that can be generated during calibration. Loading generic or default calibration data is indicated by block 444 in the flow diagram of FIG. 12. The alert generated for the operator may indicate that the operator should calibrate the image sensors before proceeding, or at the next opportunity.

At some point, calibration controller 168 determines that a calibration process is to be initiated, as indicated by block 446 in the flow diagram of FIG. 12. The calibration process can be initiated by an operator input 448, by calibration controller 168 detecting that a new image sensor has been added to or installed on the boom as indicated by block 450, or the calibration initiation input can be detected in other ways, as indicated by block 452.

The operator then moves agricultural machine 100 or moves a calibration mat 290 so that boom 118 is aligned with the mat 290 such as shown in FIG. 4B. Aligning boom 118 with mat 290 is indicated by block 454. It should be noted that the calibration mat 290 can be a physical mat. Displaying the calibration markers on a physical mat is indicated by block 456 in the flow diagram of FIG. 12. In another example, instead of being displayed on a physical mat that is positioned out in front of boom 118, the calibration elements or markers on physical mat 290 can be projected onto the ground or another surface in front of boom 118 as well. Projecting the calibration mat onto the ground is indicated by block 458 in the flow diagram of FIG. 12. The calibration elements on calibration mat 290 can be provided in other ways as well. For instance, they can be marked on the boom or machine 100, itself, or they can be provided in other ways, as indicated by block 460.

Calibration system 230 then accesses stored pose data for the image sensors connected to boom 118, as indicated by block 462 in the flow diagram of FIG. 12. The pose data can be included in the camera position data 252 stored in data store 226. The pose data illustratively identifies the default angle at which the particular image sensor is mounted with respect to boom 118. The pose data can be orientation data that specifies an orientation of the corresponding image sensor relative to a known point (such as relative to a known point on boom 188 or elsewhere), as indicated by block 464. In one example, a fixed mark (or object) attached to boom 118 in the field of view of the image sensor 122 is identified and the position of the fixed mark in the field of view is stored. The orientation can be identified based on where, in the field of view, the mark appears. The image sensor's orientation can be compared to the pose data to determine whether the image sensor is at the proper orientation. Also, during operation, if the position of the marker in the field of view changes, (such as if the image sensor is bumped and moved), then the image processing module 124 can notify the operator that the image sensor needs calibration or other attention. This notification may result in lowering the confidence levels so that the system falls back to default spray mode (such as broadcast spraying) for the corresponding nozzles. In another example, in response to determining that the image sensor has moved, the calibration controller can adjust the ROI of the image sensor, in the field of view, to account for the movement of the image sensor. The pose data can include other information and can be accessed in other ways as well, as indicated by block 466.

Calibration controller 168 then provides a desired target position to boom position controller 174. Boom position controller 174 then generates control signals to control boom position actuators 182 to move boom 118 to the desired target position. In one example, boom position actuators 182 can be hydraulic or other actuators and the control signals may be hydraulic control signals, electronic control signals or other control signals that control the actuators. Controlling the boom 118 to move to a desired target position is indicated by block 468 in the flow diagram of FIG. 12.

As discussed above, it may be that boom 118 has a number of independently moveable elements. For instance, the boom arms 136 and 138 may be independently movable relative to one another and relative to center portion 134. Center portion 134 may also be movable. Therefore, moving the boom 118 to its target position may involve moving one or multiple boom arms to target positions, as indicated by block 470. Also, moving the boom 118 to its target position may involve moving the center portion 134 of boom 118 to a target height, as indicated by block 472. The boom 118 can be moved to a number of discreet heights where calibration can be undertaken. The boom 118 can be moved to a target position in other ways as well, as indicated by block 476.

Once the boom 118 is in the desired target position, camera calibration system 230 runs a calibration process to identify a set of transforms or mapping coefficients at the target position, for each image sensor. Running the calibration process is indicated by block 478 in the flow diagram of FIG. 12. A number of modifications to the calibration process can be performed. For instance, it may be that an image sensor was damaged or not working, or that a new image sensor was installed on boom 118 to replace an image sensor, for another reason. In such scenarios, it may not be necessary to run the entire calibration process, but the transform or mapping coefficients for the new image sensor can be derived from the mapping coefficients for the adjacent image sensors, on one or both side(s) of the new image sensor, on boom 118. Calibrating a new image sensor using calibration information for adjacent calibrated image sensors is indicated by block 480. The calibration process can be performed in other ways as well, as indicated by block 482.

Calibration process controller 168 then determines whether the boom 118 has been moved to all of its target positions where calibration is to take place. Making this determination is indicated by block 484 in the flow diagram of FIG. 12. If not, and the boom 118 is to be moved to one or more additional target positions, then processing reverts to block 468 where calibration controller 168 provides a new target position to boom position controller 174, and boom position controller 174 generates control signals to control the boom position actuators 182 to move the boom 118 to the new target position.

If, at block 484, it is determined that there are no more target positions for calibration, then the camera calibration systems 230 on the image processing modules 124 can interpolate transforms between different positions. For example, it may be that the target positions that the boom 118 is moved to are not equally spaced from one another, or are spaced irregularly, or that additional transforms (mapping coefficients) are desired, in addition to those that were generated at each target position. In that case, the mapping coefficients for additional positions (in addition to the target positions) can be generated using interpolation. Using interpolation to obtain additional transforms is indicated by block 486 in the flow diagram of FIG. 12. Interpolation is described in greater detail below.

Once all of the desired transforms are generated, then the transforms for each image sensor 122, at each target position, are saved to persistent memory (e.g., the mapping coefficients 256 can be stored in data store 226) for later access during runtime image processing. Storing the transforms for later access is indicated by block 488 in the flow diagram of FIG. 12.

Figure 13A:
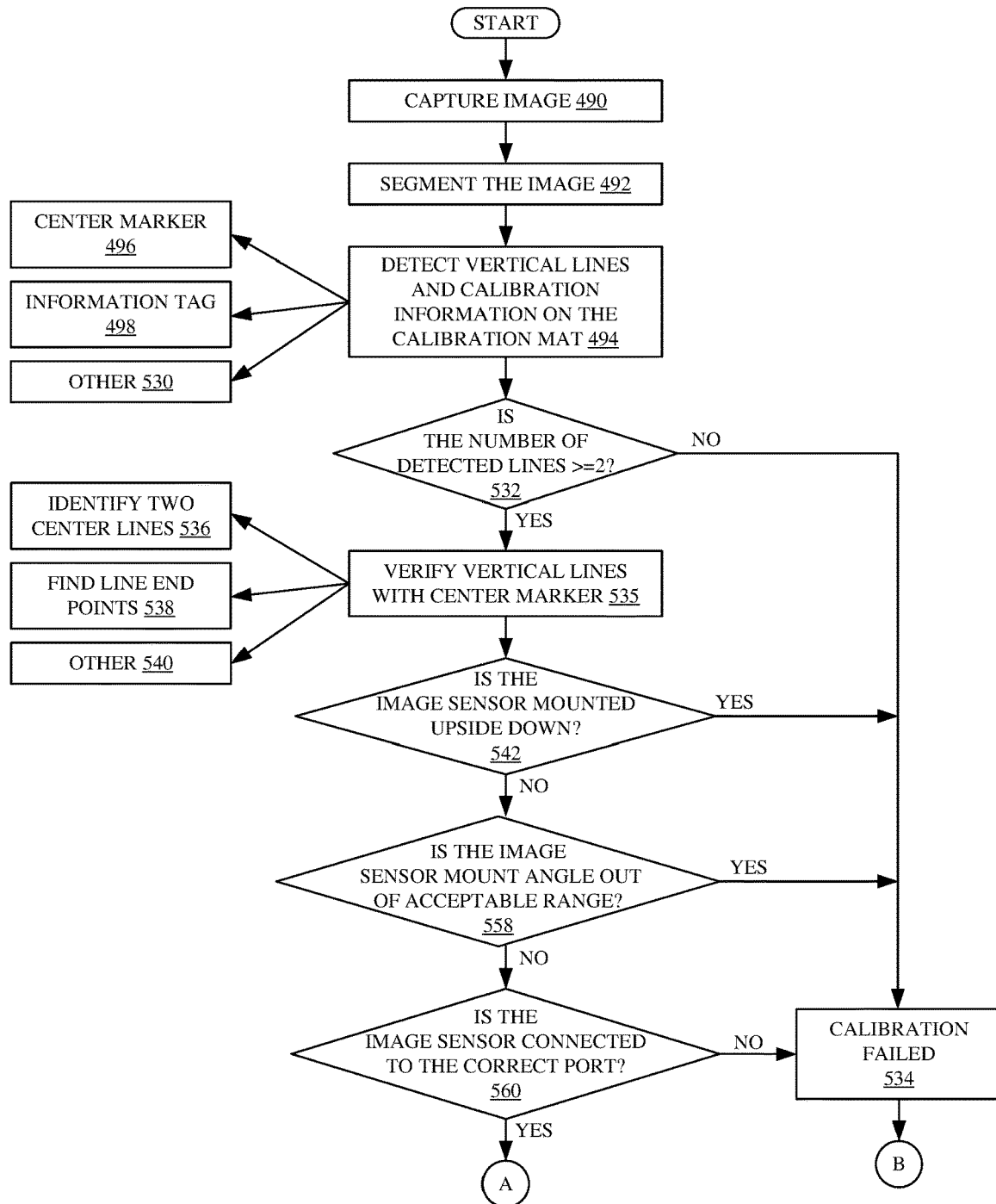
FIGS. 13A and 13B illustrate a flow diagram showing one example of a calibration operation.
Figure 13B:
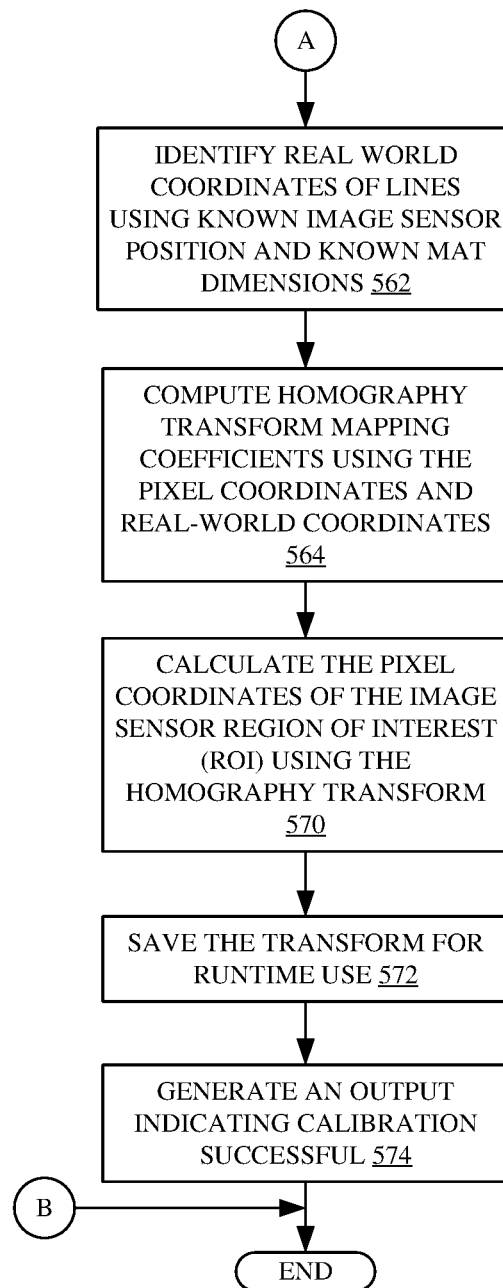

FIGS. 13A and 13B show one example of a calibration process. Therefore, FIGS. 13A and 13B show one example of how the calibration process described above with respect to block 478 in FIG. 12, may be performed. The description set out with respect to FIGS. 13A and 13B is for a single image sensor at a single target boom position. It will be noted that the same type of calibration can be performed for multiple image sensors simultaneously or sequentially, or in other ways.

It is first assumed that an image sensor 122 captures an image of the calibration mat 290. Capturing an image is indicated by block 490 in the flow diagram of FIG. 13A. Segmentation system 253 on camera calibration system 230 then segments the image. For instance, it may be that the calibration elements (e.g., the lines and center dots, etc.) may be of a single color, such as blue. In such a scenario, segmentation system 253 segments the image to identify areas that are blue and areas that are not blue. Segmenting the image is indicated by block 492 in the flow diagram of FIG. 13A. Line identifier component 268 then detects the vertical lines on the calibration mat 290, as indicated by block 494. Center marker identifier component 272 can also identify the center markers, as indicated by block 496. Information tag reader 274 may read the information tags on calibration mat 290 as well. Reading the information tags is indicated by block 498. Detecting the vertical lines and calibration information on the calibration mat 290 can be done in other ways as well, as indicated by block 530.

In one example, once the image is segmented, line identifier component 268 performs image contouring on the segmented portions (e.g., the blue portions) to find the outline of the segmented portions. When the elongate outlines are identified (as the lines on the calibration mat 290) then end point identifier component 270 identifies top and bottom centroids of the ends of the contoured portions. This identifies the center top point (centroid) at the top end of each line and the center bottom point (centroid), at the bottom end of each line. These two points on each line are then used to extract a center axis of the line in the contoured image. Center marker identifier component 272 can also identify a center point in each center marker identified in the image.

Once the lines center axes and center dots are identified, it may be that the image sensor's field of view includes more than two lines. For instance, and referring to FIG. 4B, it may be that a single image sensor has a field of view which includes lines 292, 294, 296 and 298. It may be that an adjacent image sensor has a field of view that overlaps the field of view of the first image sensor. Therefore, line identifier component 268 determines whether the image includes at least two detected lines. Identifying whether at least two lines are identified in the image is indicated by block 532. If there are not at least two lines detected, then the calibration fails, as indicated by block 534. When the calibration fails, an output can be generated to alert and operator, or other actions can be taken to indicate that the calibration operation has failed, the reason for the failure, the particular image sensor that failed, etc.

However, if, at block 532, line identifier component 268 indicates that at least two lines have been detected in the image, then the detected lines are verified using the central marker. Verifying the lines is performed to ensure that the line is properly detected, as indicated by block 535. This can be done in a number of different ways. In one example, there may be more than two lines detected in the image, in which case the two most central lines (e.g., lines 294 and 296) are identified, as indicated by block 536. Also, in one example, the centroids of the upper and lower ends of the lines can be verified using the central marker. Over the range of target positions that boom 118 can be moved to, the boom image sensors 122 have different perspectives of the calibration mat 290. In some positions, the image sensor 122 may be so close to the calibration mat 290 that the tops of the lines 294 and 296 extend beyond the field of view. The central markers 306 can be used so that creating an X between the line end points and comparing its center to the blue center marker verifies the integrity of the segmented lines. If the check fails, then the center dot and the end points closest to the boom of the image can be used to create the transformation matrix (e.g., the location of the top points can be estimated based upon the crossing point of the X and the intersection of the lines used to generate the X with the lines 294 and 296 under analysis. For example, having identified the central marker 306 (shown in FIG. 4B), line end point identifier component 270 can project extensions of intersecting lines, that begin at the lower end point centroids of lines 294 and 296 and intersect at central marker 306. The opposite ends of the dashed lines will intersect lines 294 and 296 at their top end centroids. Thus, even if the top ends of lines 294 and 296 are cut off as being outside the field of view of the image sensor 122, the location of their top end centroids can be estimated using the intersection of the dashed lines, that pass through the central marker 306. Finding the end points (possibly using the center markers) of the two center lines is indicated by block 538. The two center vertical lines can be verified in other ways as well, as indicated by block 540.

Camera mount verification component 256 then verifies that the image sensor under analysis is mounted properly. For instance, if the image sensor is mounted right side up, then, given the perspective of the image sensor relative to the calibration mat 290, the upper end centroids of lines 294 and 296 should appear to be closer together in the image than the lower end centroids of lines 294 and 296. This is because the lower end centroids will be closer to the image sensor under analysis than the upper end centroids, given the boom location shown in FIG. 4B. Therefore, end point separation comparison logic 278 compares the separation, in the image being processed, of the upper end centroids of lines 294 and 296 to the separation of the lower end centroids of lines 294 and 296. If the upper end centroids are further apart than the lower end centroids, then the image sensor is mounted upside down. Comparing the separation of the upper end centroids with the separation of the lower end centroids to determine whether the image sensor is mounted upside down is indicated by block 542 in the flow diagram of FIG. 13A. If the image sensor is mounted upside down, the processing again reverts to block 534 where the calibration fails and a message can be generated to the operator indicating the failure, and the reason for the failure (e.g., image sensor X is mounted upside down), etc.

Figure 13C:
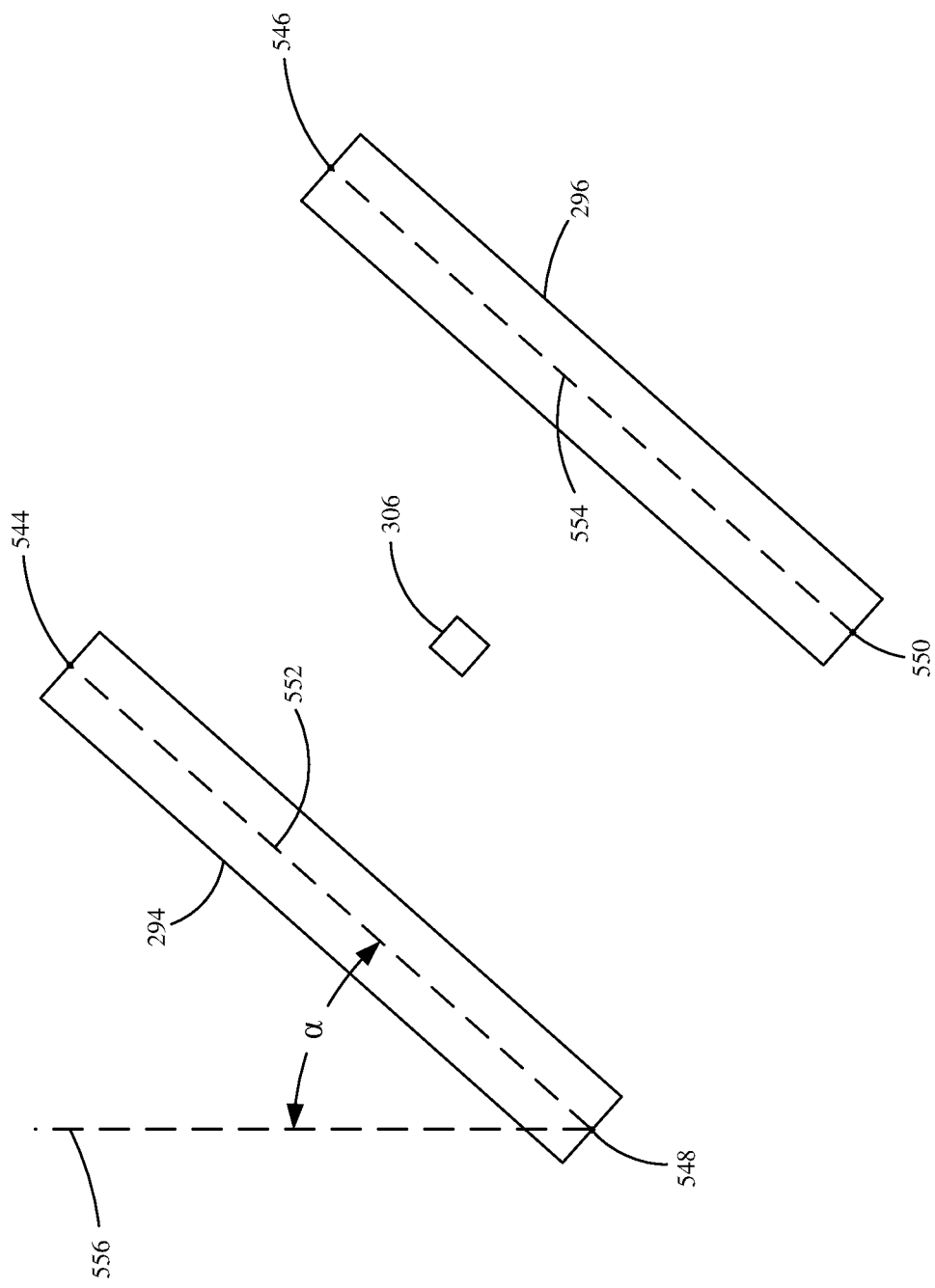
FIG. 13C shows one example of how a camera mounting angle is identified.

Line angle comparison logic 280 then determines whether the angle at which the image sensor is mounted to boom 118 is within an acceptable range of angles. Assume that line identifier component 268 has identified lines 294 and 296 as shown in FIG. 13C. The top centroid of lines 294 and 296 are identified by points 544 and 546, respectively. The bottom end centroids are identified by points 548 and 550, respectively. Thus, the center axis of line 294 extends between centroids 548 and 544 as illustrated by line 552. The center of line 296 extends between centroids 550 and 546, as indicated by line 554. The angle of the lines relative to a vertical axis 556 in the image being processed is represented by an angle $\alpha$. If the angle $\alpha$ is outside of an acceptable range, then this means that the image sensor under analysis is mounted to boom 118 at an angle that is outside of an acceptable range. Line angle comparison logic 280 compares the angle $\alpha$ for the identified lines 294 and 296 in the image under analysis to a threshold range of angles, or a pre-defined threshold value to determine whether the image sensor 122 being calibrated is mounted at an angle that is within an acceptable range. This determination is indicated by block 558 in the flow diagram of FIG. 13A. If the image sensor is mounted at an angle that is outside of an acceptable range, then calibration fails, again, as indicated by block 534, and an appropriate message or notification can be sent to the operator.

At some point during the calibration process, camera connection verification component 258 determines whether the image sensor under analysis is connected to the proper port of the image processing module 124 that it is connected to. For instance, the information tag may identify the image sensor and/or the port to which the image sensor should be connected. The port can be identified in the configuration information accessed by the image processing module 124, or in other places as well. In one example, when the image sensor 122 sends information to the image processing module 124, the image sensor identifies itself and its position on boom 118. Thus, camera connection verification component 258 can compare the identity or location of the image sensor 122, and the port it is connected to, to a desired camera/port configuration to determine whether the image sensor is indeed connected to the correct port. Making this determination is indicated by block 560 in the flow diagram of FIG. 13A. If the image sensor is not connected to the correct port, then the calibration fails at block 534 and an appropriate alert or notification can be sent to the operator.

Calibration transform generator 260 then uses real-world coordinate identification system 284 to identify real-world coordinates of the identified lines 294 and 296 using the known image sensor position and the known mat dimensions that may be obtained from camera position data 252 and calibration mat data 254 in data store 226 (shown in FIG. 3). Identifying the real-world coordinates for the lines 294 and 296 is indicated by block 562 in the flow diagram of FIG. 13B. Mapping coefficient generator 286 then generates the mapping coefficients that map the pixel values of the image to the real-world coordinates of the items displayed on the image. Generating the mapping coefficients can be done by computing homography transform mapping coefficients using the pixel coordinates and the real-world coordinates to map the pixel coordinates to the real-world coordinates. Computing the homography transform mapping coefficients is indicated by block 564 in the flow diagram of FIG. 13B.

Some sprayer boom structures have fore/aft motion as well so, instead of simply raising and lowering the boom 118 to different target locations, the boom 118 can also be moved in a fore/aft direction during the calibration process. Further, in some configurations, as boom 118 is raised, it also swings backward. This causes the actual calibration mat position and structures located on the mat 290 to be farther than the original placement for higher boom heights. Homography ensures that, regardless of the height of image sensor 122 above the ground, the ROI 125 in FIG. 1D that it is looking at on the ground is the same, even if the camera image shows more of the ground at greater heights and less of the ground at lesser heights. That is, the regions of interest 125 are exactly the same locations in real-world coordinates (e.g., 1 meter ahead of image sensor 122 and 2 meters wide and 0.5 meters long on the ground) even though they are captured from different image sensor locations based on different boom positions. Homography is used to calibrate the image sensors 122 to accommodate the fact that the image pixel points and real-world coordinates are different when image sensor position changes. The calibration parameters (homography or mapping coefficients) are tailored for each image sensor 122, at each mount location, on each boom 118, at each of the different target heights and angles to which the boom can be moved.

Homography is a transformation matrix that maps the points in one image to the corresponding points in the other image (or real-world coordinates), assuming these corresponding points are in the same plane. A direct linear transform (DLT) algorithm is an algorithm used to solve for the homography matrix H, given a sufficient set of point correspondences. Once the pixel locations of an image are converted into real-world coordinates on the ground, then the location of the detected targets in the image (e.g., the location of weeds in the image) can be translated into real-world coordinates so that the target identification system 158 on agricultural machine 100 can identify which nozzles to trigger, and when.

Figure 13D:
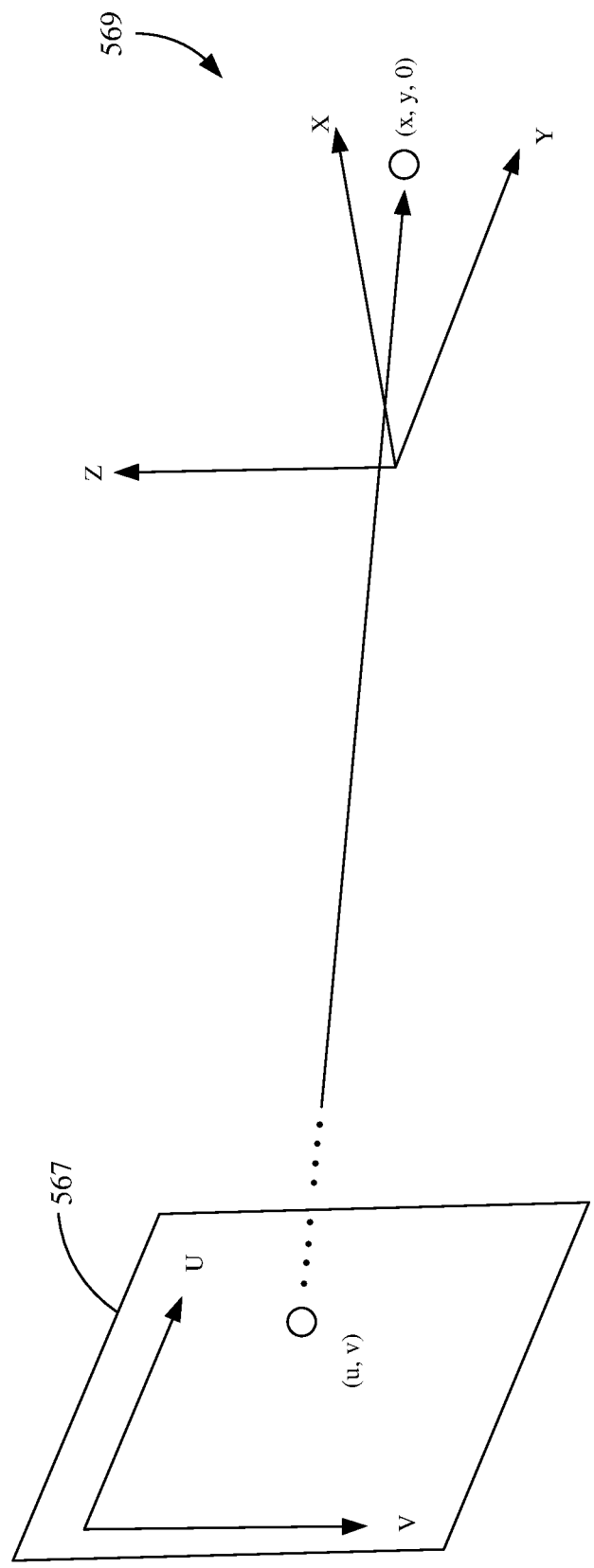
FIG. 13D illustrates how pixel points on an image map to a point defined by a real world coordinate system in a field.

FIG. 13D is used to illustrate how the mapping coefficients are generated using homography. FIG. 13D shows one example of pixel points in an image illustrated generally at 567, and real-world coordinates (on the ground) of a point shown in the image 567. The real-world coordinates are illustrated generally at 569. A mapping from a point x, y, 0 in the real-world coordinate system 569 to a pixel location u, v in the image 567 can be expressed as follows:

$$u = \frac{L_1 x + L_2 y + L_3}{L_7 x + L_8 y + 1} \quad \text{Eq. 1}$$

$$v = \frac{L_4 x + L_5 y + L_6}{L_7 x + L_8 y + 1} \quad \text{Eq. 2}$$

Coefficients $L_1$ to $L_8$ in Equations 1 and 2 are direct linear transform parameters that reflect the relationships between the real-world coordinate in x, y, 0 and the image pixel location in (u, v). Rearranging Equations 1 and 2 provides:

$$u = L_1 x + L_2 y + L_3 - L_7 u x - L_8 u y \quad \text{Eq. 3}$$

$$v = L_4 x + L_5 y + L_6 - L_7 v x - L_8 v y \quad \text{Eq. 4}$$

Equations 3 and 4 are equivalent to:

$$\begin{bmatrix} u \\ v \end{bmatrix} = \begin{bmatrix} x & y & 1 & 0 & 0 & 0 & -ux & -uy \\ 0 & 0 & 0 & x & y & 1 & -vx & -vy \end{bmatrix} \begin{bmatrix} L_1 \\ \cdot \\ \cdot \\ L_8 \end{bmatrix} \quad \text{Eq. 5}$$

Expanding Equation 5 for n different control points provides:

$$\begin{bmatrix} x_1 & y_1 & 1 & 0 & 0 & 0 & -u_1 x_1 & -u_1 y_1 \\ 0 & 0 & 0 & x_1 & y_1 & 1 & -v_1 x_1 & -v_1 y_1 \\ \vdots & \vdots & \vdots & \vdots & \vdots & \vdots & \vdots & \vdots \\ x_n & y_n & 1 & 0 & 0 & 0 & -u_n x_n & -u_n y_n \\ 0 & 0 & 0 & x_n & y_n & 1 & -v_n x_n & -v_n y_n \end{bmatrix} \begin{bmatrix} L_1 \\ \cdot \\ \cdot \\ L_8 \end{bmatrix} = \begin{bmatrix} u_1 \\ v_1 \\ \vdots \\ u_n \\ v_n \end{bmatrix} \quad \text{Eq. 6}$$

Which is in the form of:

$$X \cdot L = Y \quad \text{Eq. 7}$$

Where:

$$X = \begin{bmatrix} x_1 & y_1 & 1 & 0 & 0 & 0 & -u_1 x_1 & -u_1 y_1 \\ 0 & 0 & 0 & x_1 & y_1 & 1 & -v_1 x_1 & -v_1 y_1 \\ \vdots & \vdots & \vdots & \vdots & \vdots & \vdots & \vdots & \vdots \\ x_n & y_n & 1 & 0 & 0 & 0 & -u_n x_n & -u_n y_n \\ 0 & 0 & 0 & x_n & y_n & 1 & -v_n x_n & -v_n y_n \end{bmatrix}, L = \begin{bmatrix} L_1 \\ \cdot \\ \cdot \\ L_8 \end{bmatrix}, y = \begin{bmatrix} u_1 \\ v_1 \\ \vdots \\ u_n \\ v_n \end{bmatrix} \quad \text{Eq. 8}$$

The direct linear transform parameters can be obtained using the least squares method as follows:

$$X \cdot L = Y \quad \text{Eq. 9}$$

$$(X^T \cdot X) \cdot L = X^T \cdot Y \quad \text{Eq. 10}$$

$$(X^T \cdot X)^{-1} \cdot (X^T \cdot X) \cdot L = (X^T \cdot X)^{-1} \cdot (X^T \cdot Y) \quad \text{Eq. 11}$$

$$L = (X^T \cdot X)^{-1} \cdot (X^T \cdot Y) \quad \text{Eq. 12}$$

Since each control point provides two equations, the minimum number of control points for an inverse transformation is four. Inverse transformation equations are shown as follows:

$$x = \frac{R_1 u + R_2 v + R_3}{R_7 u + R_8 v + R_9} \quad \text{Eq. 13}$$

$$y = \frac{R_4 u + R_5 v + R_6}{R_7 u + R_8 v + R_9} \quad \text{Eq. 14}$$

Where, $$R_1 = L_5 - L_6 L_8 \quad \text{Eq. 15}$$

$$R_2 = -(L_2 - L_3 L_8) \quad \text{Eq. 16}$$

$$R_3 = L_2 L_6 - L_3 L_5 \quad \text{Eq. 17}$$

$$R_4 = -(L_4 - L_6 L_7) \quad \text{Eq. 18}$$

$$R_5 = L_1 - L_3 L_7 \quad \text{Eq. 19}$$

$$R_6 = -(L_1 L_6 - L_3 L_4) \quad \text{Eq. 20}$$

$$R_7 = L_4 L_8 - L_5 L_7 \quad \text{Eq. 21}$$

$$R_8 = -(L_1 L_8 - L_2 L_7) \quad \text{Eq. 22}$$

$$R_9 = L_1 L_5 - L_2 L_4 \quad \text{Eq. 23}$$

Since each point correspondence provides two equations, four correspondences are enough to solve for the eight degrees of freedom of L ($L_1$ to $L_8$). The restriction is that no three points can be in a line. Therefore, by identifying the ends of the two lines (centroids) in an image, the eight degrees of freedom of L (the mapping coefficients) can be solved for in Equations 15-23.

Once the mapping coefficients are generated, then region of interest identifier 262 calculates the pixel coordinates of the image sensor region of interest (ROI)—the region on the ground that will be examined by the image sensor (regardless of the image sensor height)—using the homography transform. Calculating the pixel coordinates of the ROI for this camera, at this target position, is indicated by block 570 in the flow diagram of FIG. 13B. The transform (e.g., the homography transform coefficients) are then saved for runtime use. Saving the transform is indicated by block 572. Output generator 264 then generates an output indicating that the calibration for this image sensor 122, at this particular target position, has been successful. Generating the output is indicated by block 574 in the flow diagram of FIG. 13B.

It will be noted that FIGS. 13A and 13B show some examples of how calibration information can be used but other examples can be used as well. For example, characteristics of the information tags (e.g., the four corners) can be used instead of the line end points to determine sensor orientation. This is just one example.

As discussed above with respect to FIG. 12, mapping coefficients can be generated for a variety of different target image sensor/boom positions and orientations. Additional mapping coefficients can be generated by interpolating between two boom positions. This may be done, for example, because the boom position controller 174 may not be able to precisely move or control boom position actuators 182 to move boom 118 to the desired target position. However, the regions of interest may need to be identified for each target height so that the image processing modules 124 have an accurate representation of the pixel-to-ground relationship within a range of boom heights. If a ROI is incorrect or missing from the set of target heights, then the image processing module 124 may be unable to analyze a portion on the ground that contains a weed or the sprayer may not be able to accurately target a weed because the image processing module 124 cannot accurately determine where the weed is with respect to the nozzles 120.

Figure 14:
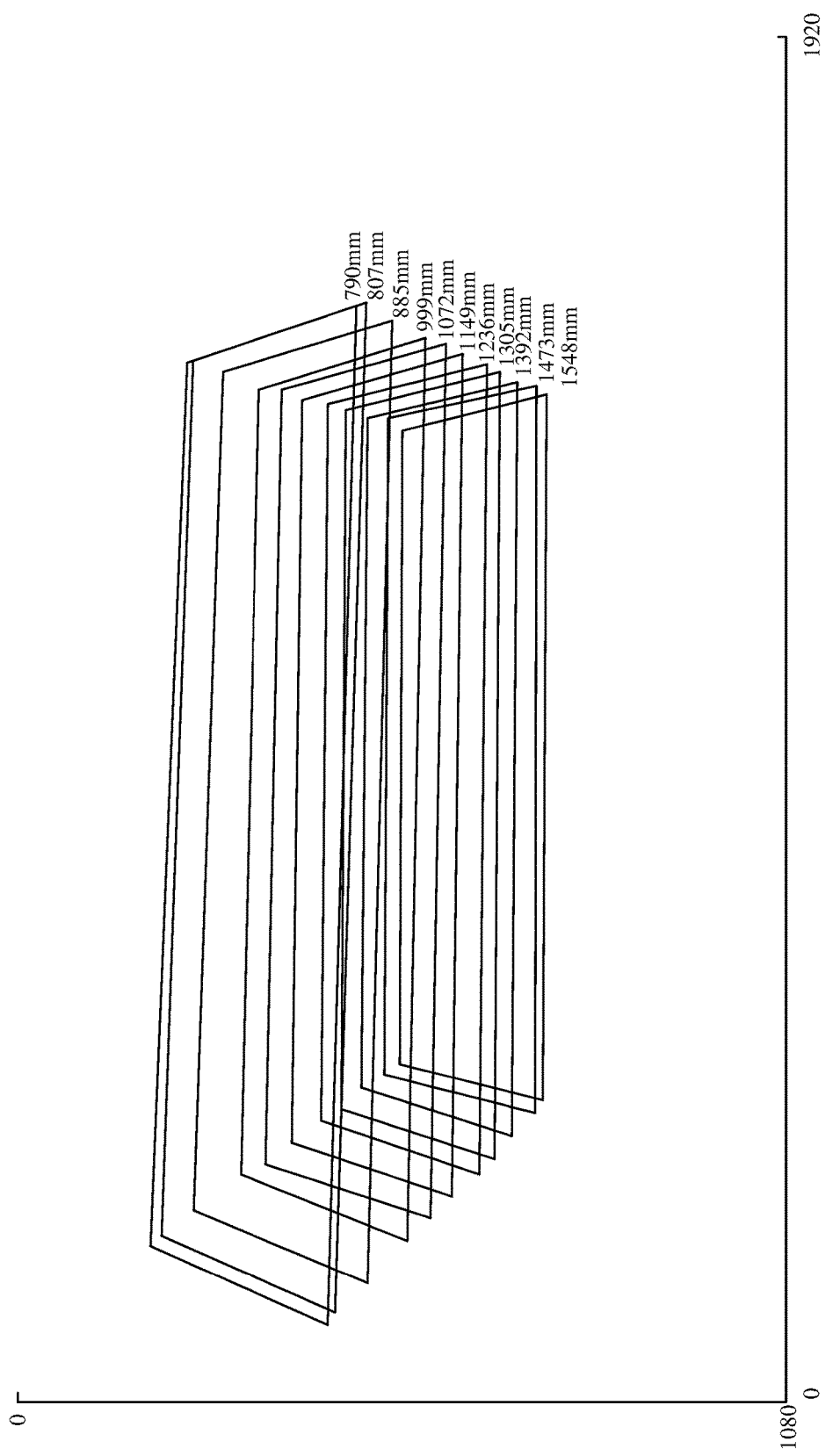
FIG. 14 shows an example set of regions of interest data collected during a camera calibration process.

One example of interpolation can be performed by interpolation system 263. Assume, for the sake of the present discussion, that the calibration process as discussed above with respect to FIGS. 12, 13A and 13B have been executed and ROI data has been collected during that calibration process, but the target positions of the boom 118, during the calibration process, were not evenly spaced and did not precisely reach every target height. FIG. 14 shows one example of a graph illustrating the ROI data collected during such a calibration process. The target heights range from 700 mm to 1700 mm in FIG. 14, but the collected ROI data only spans boom heights from 790 mm to 1548 mm. Instead of only using this original ROI data, ROI data can be interpolated for each desired target height, using the original ROI data collected and illustrated in FIG. 14. The regions of interest in FIG. 14 have a set of front lines and a set of back lines. The front and back lines are connected by side lines.

In one example, interpolation is performed on sets of lines rather than sets of ROI data. The regions of interest are split into two sets of lines before interpolating. One set of lines can be represented by the Equations 24, 25 and 26, as follows:

$$L = e^{(a_L + b_L * H)} \quad \text{Eq. 24}$$

$$\theta = a_\theta + b_\theta * L \quad \text{Eq. 25}$$

$$r = a_r + b_r * \theta \quad \text{Eq. 26}$$

Where:
H=outer boom height;
L=length of line in pixels;
θ=angle from the midpoint of the line to an intersection point of all of the lines; and
r=radius from the midpoint of the line to the intersection point.

Figure 15:
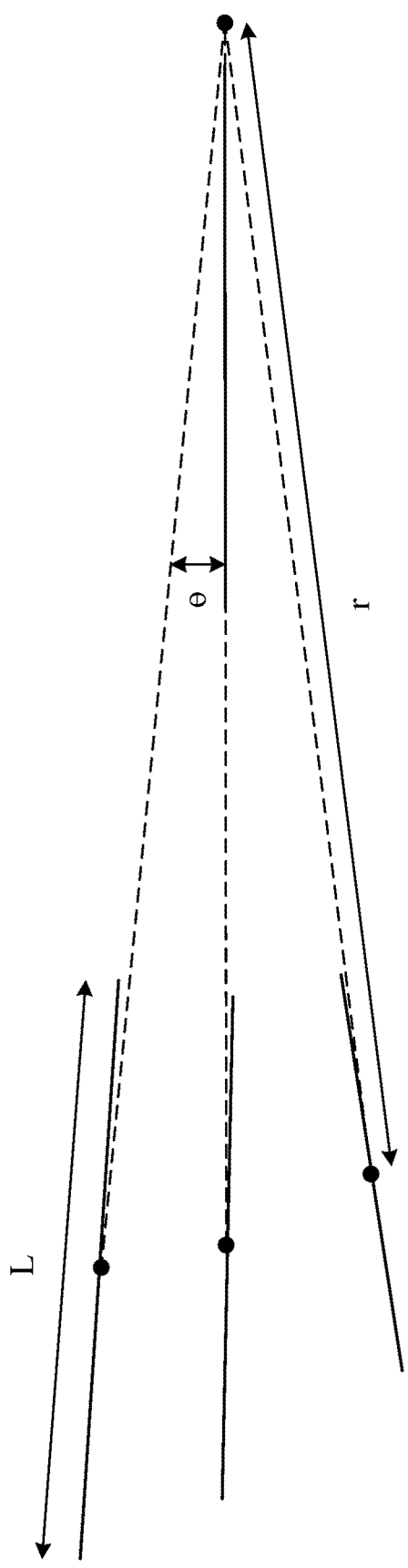
FIG. 15 shows one example of finding a best fit intersection point for lines defining edges of a camera region of interest.

FIG. 15 shows an example of identifying an intersection point of three lines. The values L, θ, and r are also illustrated in FIG. 15. The coefficients a and b for each of the equations are computed using the normal equation. The normal equation, is an analytical approach to finding the best fit line to a set of data in the least squares sense. Once the coefficients are computed for both sets of lines, the ROIs for each of the target heights can be calculated.

Figure 16A:
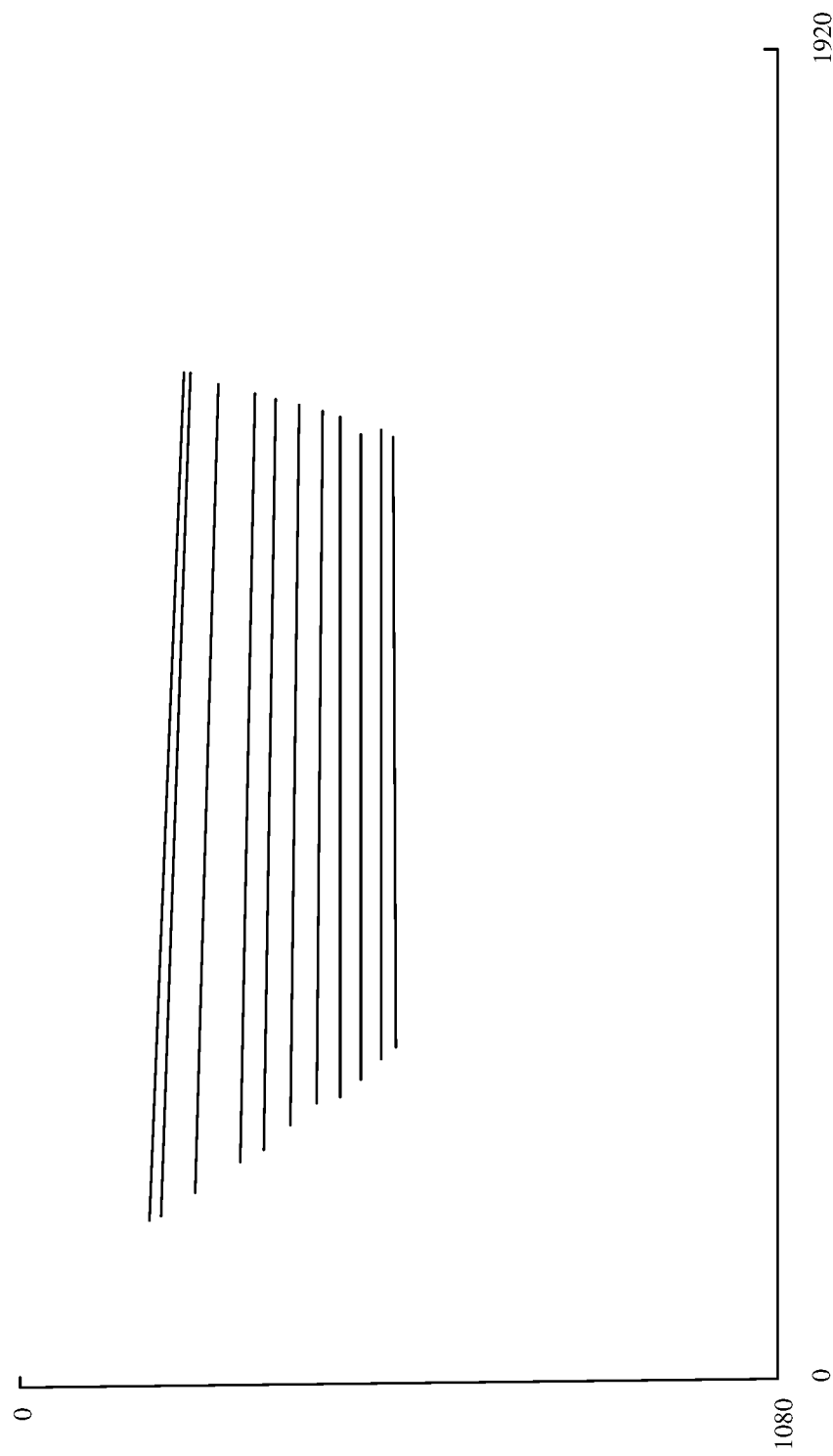
FIG. 16A is a graphical illustration of one example of the display of a set of lines defining a back of the regions of interest shown in FIG. 14, for a camera, located at different positions.
Figure 16B:
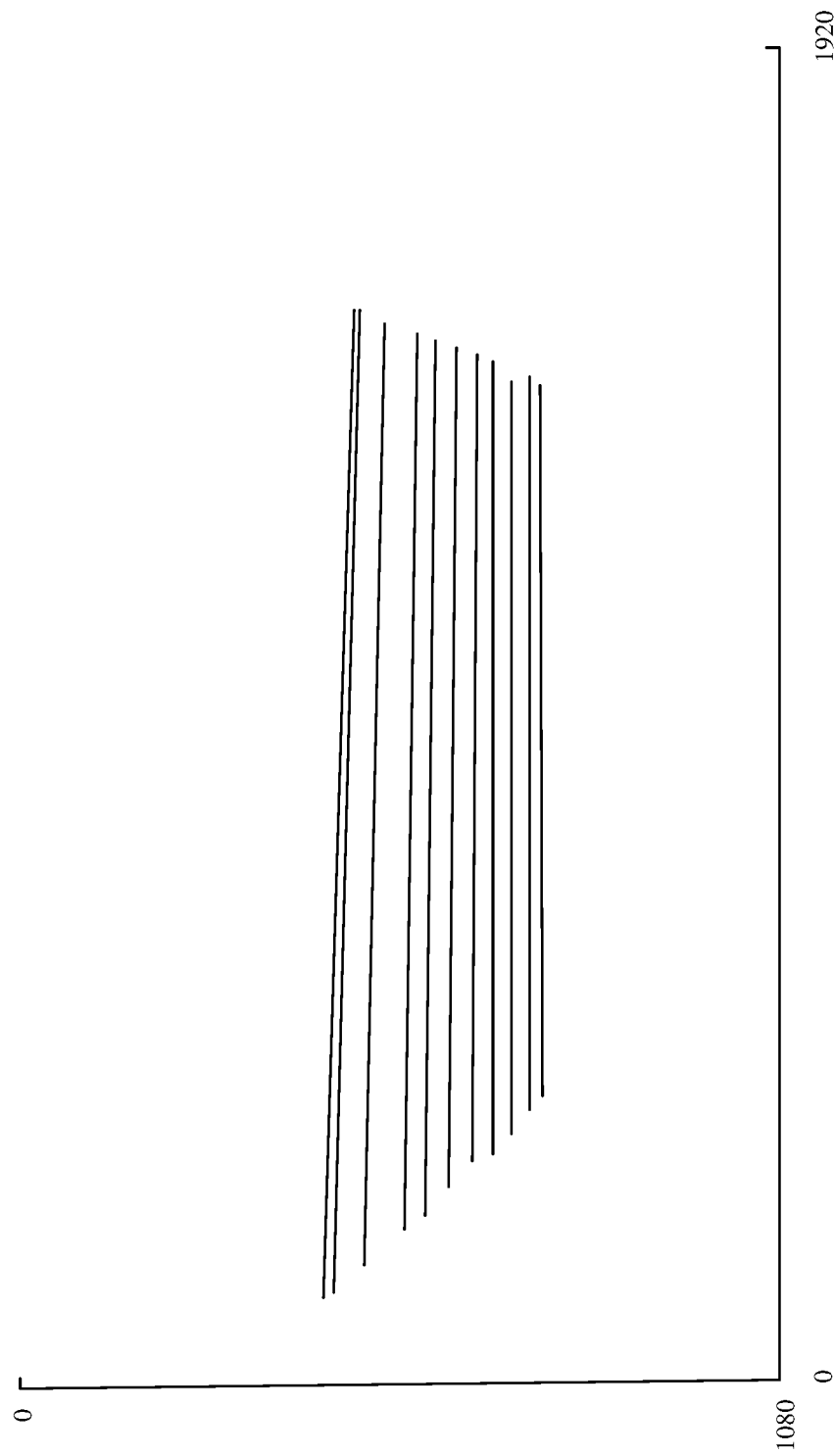
FIG. 16B is a graphical illustration of one example of the display of a set of lines defining a front of the regions of interest shown in FIG. 14, for a camera, located at different positions.

Interpolation will be performed on two different sets of lines, the back lines and the front lines of the regions of interest illustrated in FIG. 14. FIG. 16A shows the back set of lines of the regions of interest shown in FIG. 14, and FIG. 16B shows the front set of lines of the regions of interest illustrated in FIG. 14. Because the line length should never be negative, an exponential equation is used to fit the line length with respect to boom height. The line length should, in fact, approach 0 as the zoom height goes to infinity. The higher the boom, the smaller the line will appear in the ROI. To use the normal equation to find the best fit line, the equation for line length is in the form of a system of linear equations. Taking the logs of both sides of equation 24 is illustrated below:

$$L = e^{(a_L + b_L * H)} \rightarrow \log(L) = a_L + b_L * H \quad \text{Eq. 27}$$

For n given data points, the coefficients $a_L$ and $b_L$ can be calculated using the normal equation as follows:

$$X = \begin{bmatrix} 1 & H_1 \\ \vdots & \vdots \\ 1 & H_n \end{bmatrix} \quad \text{Eq. 28}$$

$$y = \begin{bmatrix} \log(L_1) \\ \vdots \\ \log(L_n) \end{bmatrix} \quad \text{Eq. 29}$$

$$\begin{bmatrix} a_L \\ b_L \end{bmatrix} = (X^T X)^{-1}(X^T y) \quad \text{Eq. 30}$$

Figure 17:
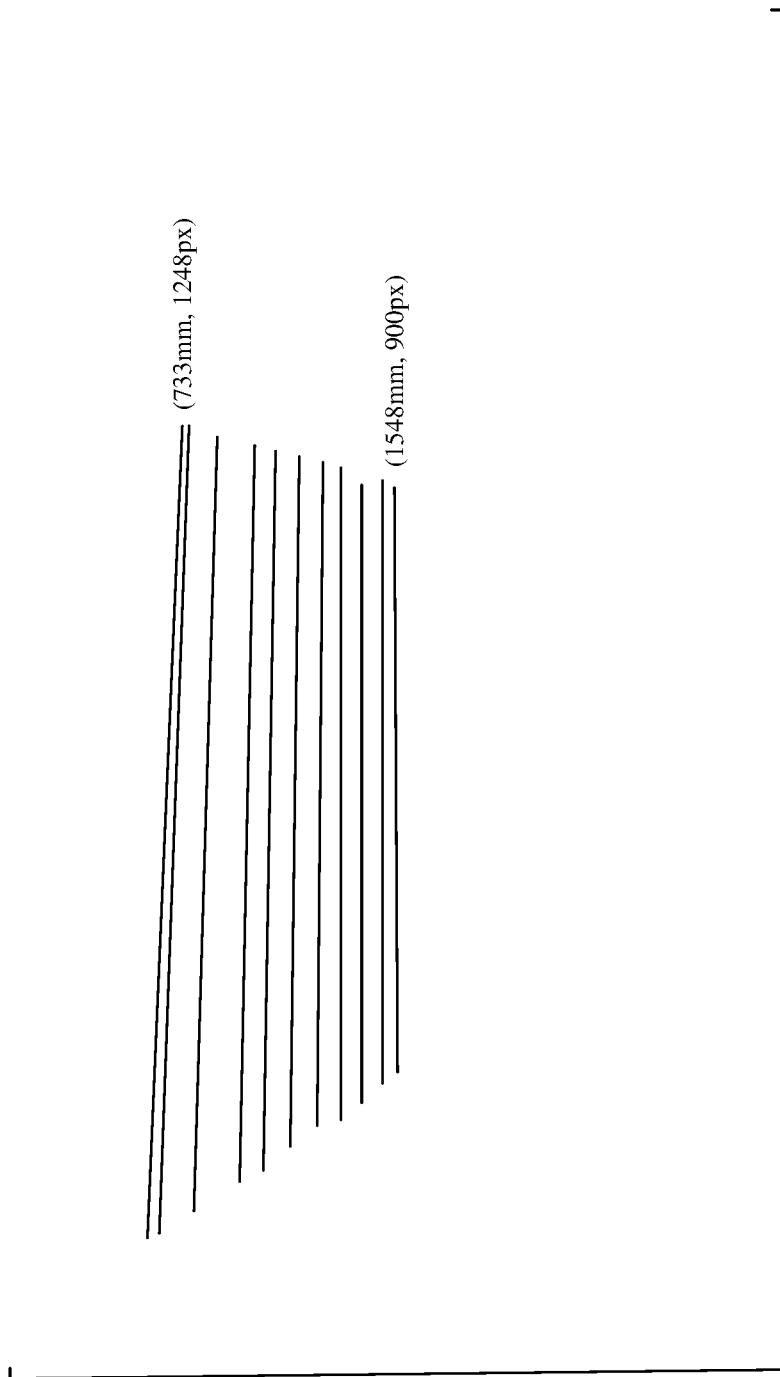
FIG. 17 is similar to FIG. 16A, with pixel values illustrated.
Figure 18:
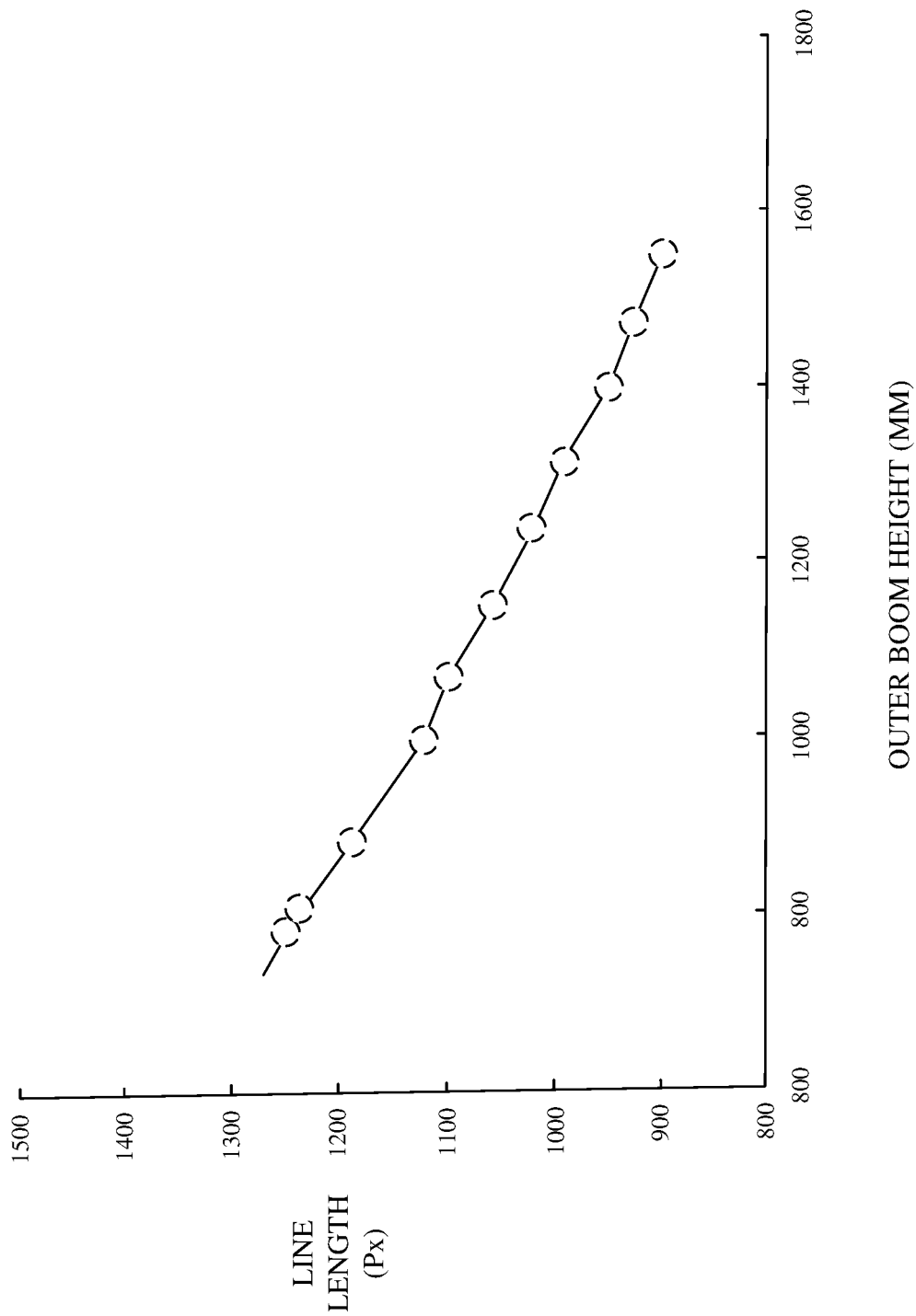
FIG. 18 is a graph showing outer boom height graphed against pixel line length.

FIG. 17 illustrates the back set of lines in the ROIs (also illustrated in FIG. 16A) and FIG. 18 illustrates a graph of line length vs outer boom height. The interpolated function is shown plotted along the collected data points.

It may be more complicated to find the best fit intersection point where more than two lines are considered. This is because it is unlikely that all the lines will intersect at the exact same point. Therefore, a best fit intersection point is used instead. Given the points a and b, each line can be represented by the starting point a and it's unit vector:

$$\hat{u} = \frac{b - a}{\|b - a\|} \quad \text{Eq. 31}$$

The best fit point P will be the point that minimizes the sum of the square distance to all lines. P can be found for n different lines using the following equations:

$$S = \Sigma_{i=0}^{n}(\hat{u}_i \hat{u}_i^T - I) \quad \text{Eq. 32}$$

$$C = \Sigma_{i=0}^{n}((\hat{u}_i \hat{u}_i^T - I) * a_i) \quad \text{Eq. 33}$$

$$P = S^{-1} C \quad \text{Eq. 34}$$

Figure 19:
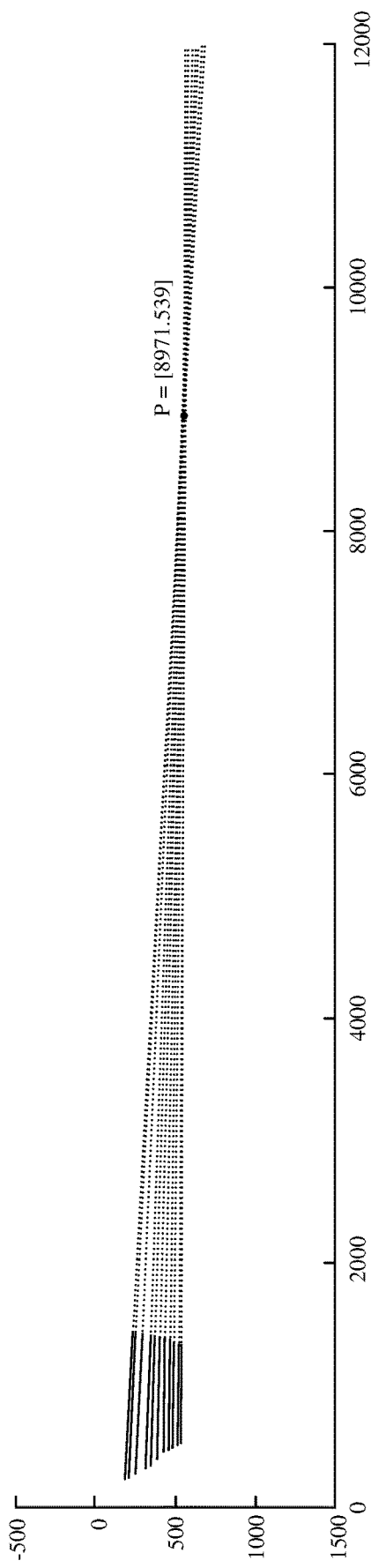
FIG. 19 is a graphical illustration showing a best fit intersection point for the lines illustrated in FIGS. 16A and 17.

FIG. 19 shows one example of a best fit intersection point for the set of lines illustrated in FIG. 17. Interpolation system 263 fits a linear equation to the angle with respect to line length. Line angle, in the present example, is the angle of the line that goes from the best fit intersection point to the midpoint of the line. The line angle has a linear relationship to the length of the line, which is represented as follows:

$$\theta = a_\theta + b_\theta * L \quad \text{Eq. 35}$$

For n given data points, the coefficients $a_\theta$ and $b_\theta$ can be calculated using the following equation:

$$X = \begin{bmatrix} 1 & L_1 \\ \vdots & \vdots \\ 1 & L_n \end{bmatrix} \quad \text{Eq. 36}$$

$$y = \begin{bmatrix} \theta_1 \\ \vdots \\ \theta_n \end{bmatrix} \quad \text{Eq. 37}$$

$$\begin{bmatrix} a_\theta \\ b_\theta \end{bmatrix} = (X^T X)^{-1}(X^T y) \quad \text{Eq. 38}$$

For purposes of the present discussion, the radius is the distance from the best fit intersection point to the midpoint of each of the lines. Interpolation system 263 fits a linear equation to the radius with respect to the line angle. The radius has a linear relationship to the angle which is represented as follows:

$$r = a_r + b_r * \theta \qquad \text{Eq. 39}$$

For n given data points, the coefficients $a_r$ and $b_r$ can be calculated using the normal equation as follows:

$$X = \begin{bmatrix} 1 & \theta_1 \\ \vdots & \vdots \\ 1 & \theta_n \end{bmatrix} \qquad \text{Eq. 40}$$

$$y = \begin{bmatrix} r_1 \\ \vdots \\ r_n \end{bmatrix} \qquad \text{Eq. 41}$$

$$\begin{bmatrix} a_r \\ b_r \end{bmatrix} = (X^T X)^{-1} (X^T y) \qquad \text{Eq. 42}$$

After obtaining the equations for L, θ, and r, and the intersection point P for the back set of lines for the ROIs (shown in FIG. 17) this process is repeated for the front set of lines illustrated in FIG. 16B. All 6 equations, and the two intersection points, are used to compute the final interpolated ROI. For a given height, the front and back lines of the ROI are calculated and then these two lines are connected to create the entire ROI for that target height.

Figure 20:
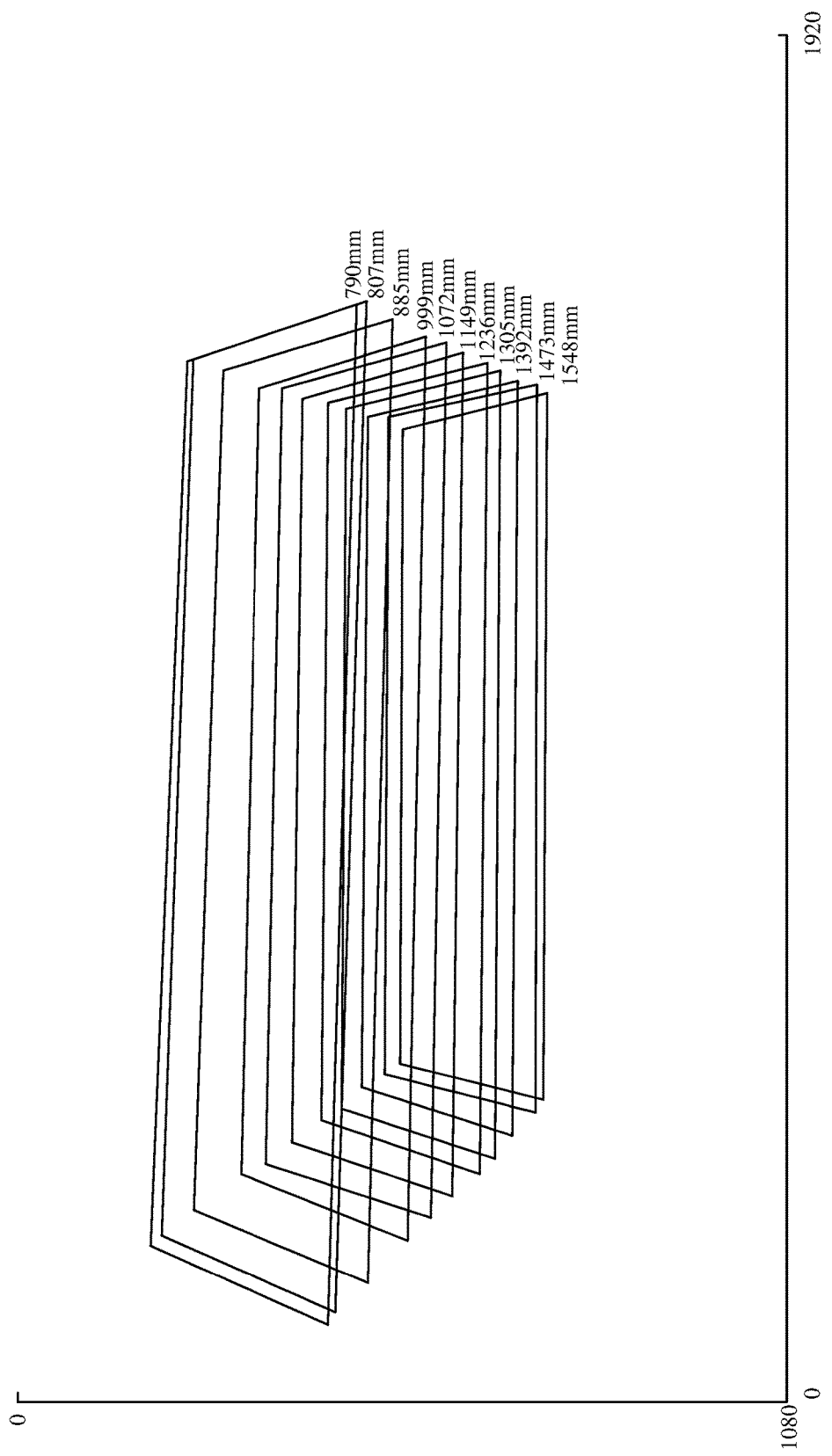
FIG. 20 is a graphical illustration indicating how a camera's region of interest changes at different boom positions.
Figure 21:
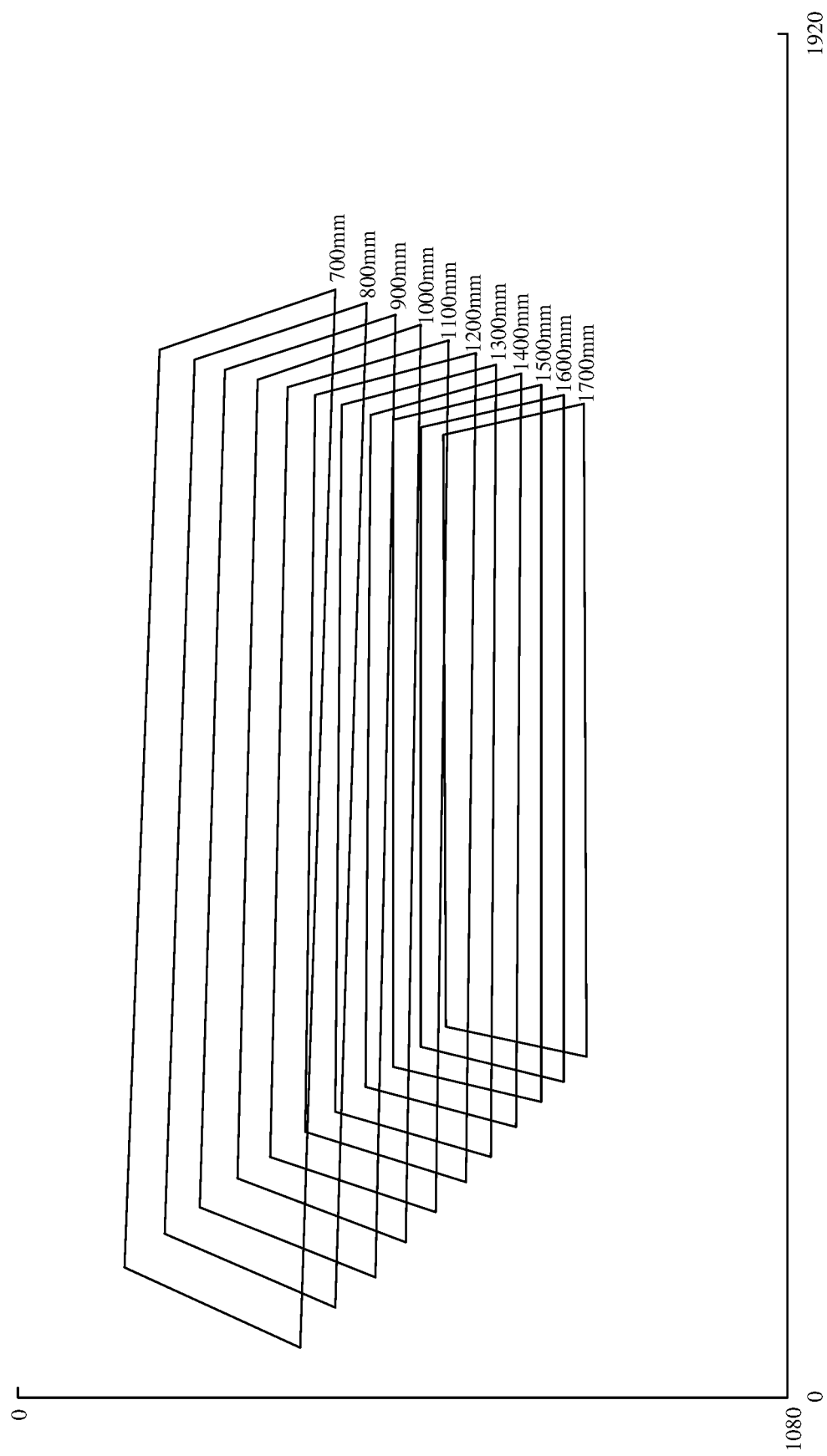
FIG. 21 is similar to FIG. 20, except that the regions of interest are illustrated after interpolation has been performed.

In one example, the center portion 134 of boom 188 is at a height of 1200 mm. The target outer heights range from 700 mm to 1700 mm in 100 mm increments. FIG. 20 shows original ROIs, where the target heights were not precisely hit in controlling the boom. FIG. 21 shows the interpolated ROIs which provide a cleaner set of evenly spaced ROIs and mitigates noise and removes outliers.

Figure 22A:
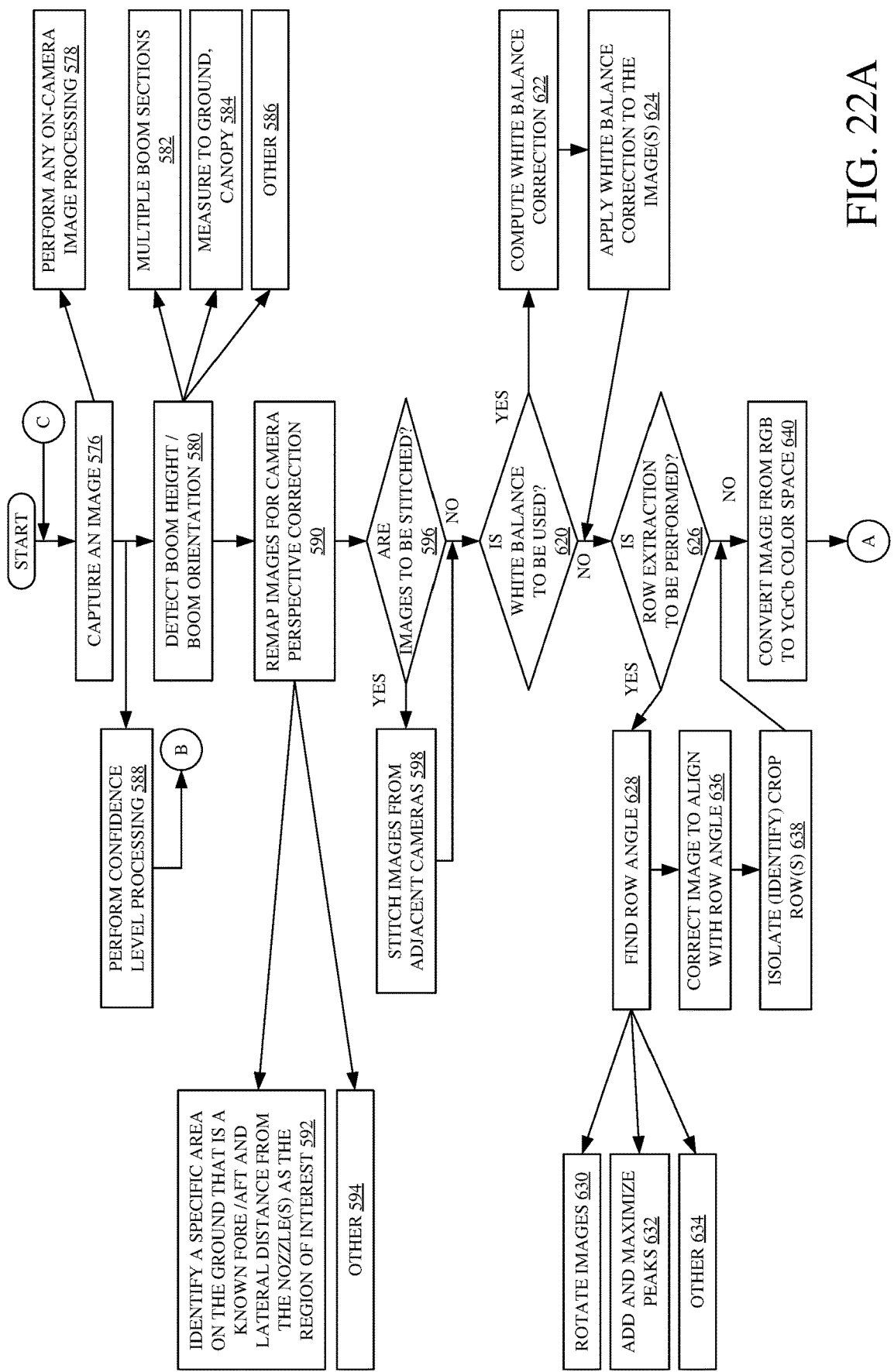
FIGS. 22A and 22B (collectively referred to herein as FIG. 22) show a flow diagram illustrating one example of the overall operation of the agricultural machine shown in FIG. 1 in identifying targets and applying material to the targets.
Figure 22B:
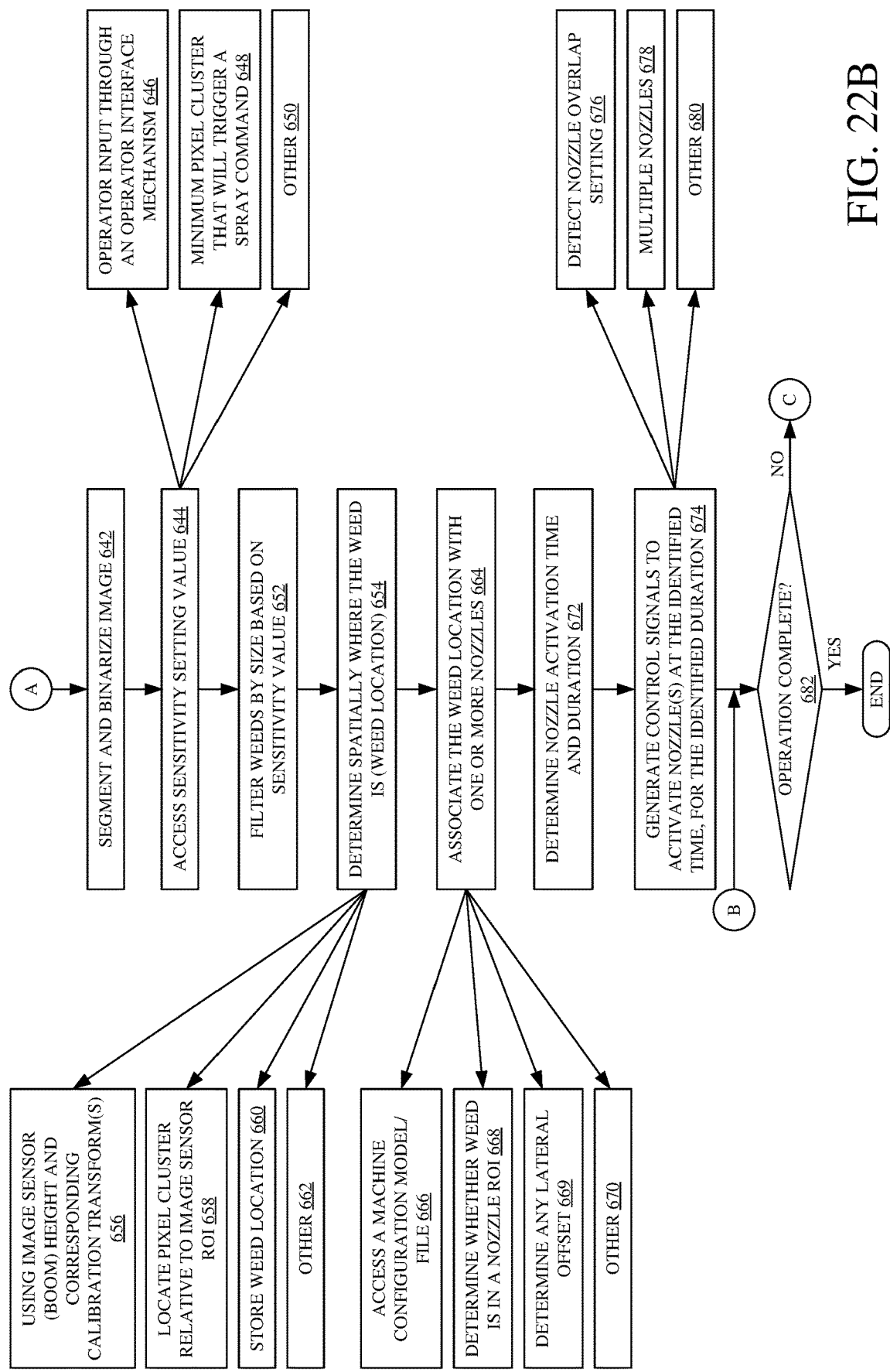

FIGS. 22A and 22B show a flow diagram illustrating one example of the operation of target identification system 158 in identifying targets and control system 160 in controlling nozzle bodies 120.

One or more of the image sensors 122 first capture images of the ground ahead of the boom 118. This is indicated by block 576. It will be noted that image sensors 122 may be red green blue (RGB), near infra-red green (NRG) or near infra-red (NIR) cameras. The sensors 122 can be mono or stereo cameras. Sensors 122 can be multi-spectral or hyper-spectral sensors attached to boom structure 118. Any image signal processing that is provided on image sensor can then be performed. This is indicated by block 578 in the flow diagram of FIG. 22. For example, the image may be corrected, on the image sensor 122, using the color correction matrices 257 and using other information, for lens distortion, for tone or color distortion, etc. The corrected image is then transferred to its corresponding image processing module 124. This transfer of the corrected image can be made using a data-over power, gigabit multi-media serial line (GMSL/GMSL2) or another link. If the image sensor 122 does not contain image processing functionality, the image may be transferred in a raw format to the image processing module 124, where the image is corrected for lens distortion, tones and color distortion, etc. Boom sensor 126 senses the boom height corresponding to the image (e.g., the boom height when the image is captured by image sensor 122). Detecting the boom height or boom orientation is indicated by block 580 in the flow diagram of FIG. 22A. There may be multiple boom sections for boom 118, and, if so, the height of each of the different boom sections may be sensed or detected. This is indicated by block 582. The boom height may be measured by boom sensor 126 to the ground, and/or to the height of the crop canopy above the ground. Measuring to the ground and to the canopy is indicated by block 584. The boom sensors 126 may be an ultrasonic sensor or other types of sensors such as RADAR, LIDAR, etc. The boom height sensor data can be communicated from boom sensor 126 to image processing module 124 via CAN directly or indirectly through another controller. The boom height and/or orientation can be detected in other ways as well, as indicated by block 586.

After the images are received by image processing module 124, confidence level generator 234 generates one or more confidence or quality metrics corresponding to the image. Performing confidence level processing is indicated by block 588 in the flow diagram of FIG. 22A. Based upon the confidence level or quality metrics, various different processing steps can be performed. This is discussed in greater detail below with respect to FIG. 23.

Based upon the boom height, the captured image is remapped for camera perspective. For instance, the mapping coefficients are retrieved from memory. Mapping coefficient identifier in image remapping system 232 identifies the mapping coefficients corresponding to this particular image sensor at this particular boom height. Region of interest identifier 342 then identifies the ROI by applying the mapping coefficients to the image. The mapping coefficients may be stored in a lookup table, for this image processor, indexed by boom height or in other ways. The boom height can be used to access the correct set of mapping coefficients that are then applied to the image to correct the ROI in the image, based upon the perspective of the image sensor, as determined by boom height. Remapping the images using the mapping coefficients is indicated by block 590. After the mapping coefficients are applied, the outputs, from the image sensor field of view, is a top-down perspective view of the ROI on the ground that is a known fore/aft and lateral distance from the nozzle bodies 120 on boom 118. Identifying the specific area on the ground corresponding to the ROI is indicated by block 592 in the flow diagram of FIG. 22A. Remapping the images can be performed in other ways as well, as indicated by block 594.

Because the image sensors are mounted side by side with fields of view and regions of interest that overlap one another, the images may be stitched together to generate a single visual representation of the area in front of boom 118. Determining whether the images are to be stitched together is indicated by block 596 in the flow diagram of FIG. 22A. If so, then image stitching system 236 performs a stitching operation to stitch the images from adjacent image sensors, together with one another. Stitching the images is indicated by block 598, and it is described in greater detail below with respect to FIG. 24.

Image processing may also be affected by ambient light conditions. For instance, the image processing may be affected depending on whether the machine 100 is facing into the sun or away from the sun, or whether the sun is shining in from one side of the image sensor. Similarly, the image processing may be affected based on the position of the sun in the sky (such as whether it is morning, midday or afternoon), based on whether the sky is overcast, or the image sensor 122 is capturing an image that is in the shade, or in a shadow, or based on other variations in ambient light. Therefore, white balance correction system 238 can be used to capture images from light sensors 130 (there may be one or more light sensors disposed at different locations on agricultural machine 100) and use the information from light sensors 130 to correct the images before they are processed.

The ambient lighting condition information may be transmitted to the image processing module 124 and may be used to correct for daylight color, light direction and position and light intensity. The white balance sensors may include incident light sensors or other sensors. This can be referred to as white balance correction. At block 620, white balance correction system 238 determines whether the images are to be corrected for white balance. If so, then processing proceeds at block 622 where white balance correction system computes white balance correction information and at block 624 where the white balance correction system 238 applies the white balance correction to the images.

Also, in some scenarios, row identification is to be performed on the images to identify crop rows within the images. Thus, at block 626 in the flow diagram of FIG. 22A, row identification system 240 determines whether row identification is to be performed on the image. If so, then row identification system 240 performs row identification on the image. This is described in greater detail below with respect to FIGS. 26A-31. Briefly, however, row identification system 240 identifies the row angle within the image and then rotates the image to align it with the row angle. In order to find the row angle, row identification system 230 may rotate the images to identify values that indicate crop rows and maximize those values to obtain an image rotation position that identifies the crop rows. Finding the row angle is indicated by block 628 in FIG. 22A. Rotating the images and maximizing the variables indicative of crop rows is indicated by blocks 630 and 632, respectively. The row angles can be identified in other ways as well, as indicated by block 634.

Once the row angles are identified, row identification system 240 corrects the images to align with the row angle and isolates (or otherwise identifies) the crop rows in the images. Correcting the images to align with the row angle is indicated by block 636, and isolating or otherwise identifying the crop rows in the images is indicated by block 638.

In one example, in order to further process the images, color conversion component 376 in target identification processor 244 (shown in FIG. 8) converts the color space of the images from an RGB color space to YCrCb color space. This conversion is indicated by block 640 in the flow diagram of FIG. 22A. Segmentation/binarization component 378 then segments the image and binarizes the segmented image. For example, excess green can be calculated for each pixel. If the excess green exceeds a threshold, then the pixel can be assigned a value of 1 while other pixels are assigned a value of 0. Segmenting and binarizing the image is indicated by block 642 in the flow diagram of FIG. 22B.

Weed filter system 380 then uses sensitivity detector 382 to detect or access a sensitivity setting value. This is indicated by block 644. For instance, the operator may have an option to adjust the sensitivity value on an operator interface display. Adjusting the sensitivity value through an operator interface mechanism is indicated by block 646. The sensitivity value corresponds to a minimum pixel cluster size (or pixel cluster) that will qualify as a target identification and will thus trigger a spray command. Providing the sensitivity level to correspond to a minimum pixel cluster size is indicated by block 648. Accessing the sensitivity setting value can be performed in other ways as well, as indicated by block 650.

Filter 384 then filters targets (e.g., weeds) detected in the image by size, based upon the sensitivity value. This type of filtering is indicated by block 652 in the flow diagram of FIG. 22B. The weeds (or other targets) are identified by finding green (or segmented) blobs (pixel clusters) in the image of the sufficient size that they meet the sensitivity valve.

Weed locator 388 then determines, spatially, where the weed is, geographically, in the field. Determining the weed location (or other target location) is indicated by block 654 in the flow diagram of FIG. 22B. Identifying the weed location locates the pixel coordinates of the center of the pixel clusters (that represent the weeds) in relation to the ROI for the image sensor. In one example, weed locator 388 applies the mapping coefficients (or calibration transforms) corresponding to this particular image sensor at this particular boom height or boom location, identified by mapping coefficient identifier 340 (FIG. 5). Using the image sensor and boom height and obtaining the corresponding mapping coefficients is indicated by block 656. Identifying the location of the target relative to the ROI is indicated by block 658. Weed location storage component 390 then stores the weed locations for later use (such as in performing a double knock operation). Storing the weed locations is indicated by block 660 in FIG. 22B. The weed or target location can be determined in other ways as well, as indicated by block 662.

Nozzle identification system 244 then associates the weed (or other target) location with one or more nozzles on boom 118. Associating the target location with the nozzles is indicated by block 664. In one example, nozzle identification system 244 may access a configuration model or a configuration file stored in data store 226 that associates nozzles with image sensor regions of interest as indicated by block 666. Using the configuration file, the nozzle identification system 244 determines whether the weed is within an area that can be treated by a nozzle, as indicated by block 668. Also, real time sensors can sense a wide variety of things such as wind speed and wind direction. The wind speed and wind direction can be obtained in other ways as well. The wind can influence the direction of the material after it leaves the nozzle. The material may drift so that the nozzle directly aligned with a target may not be able to hit the target. Thus, lateral adjustment determination component 245 can determine whether a lateral adjustment is needed based on wind speed and direction or based on other criteria. Determining any lateral offset is indicated by block 669 in FIG. 22B. Associating the weed location with one or more nozzles can be done in other ways as well, as indicated by block 670.

Figure 22F:
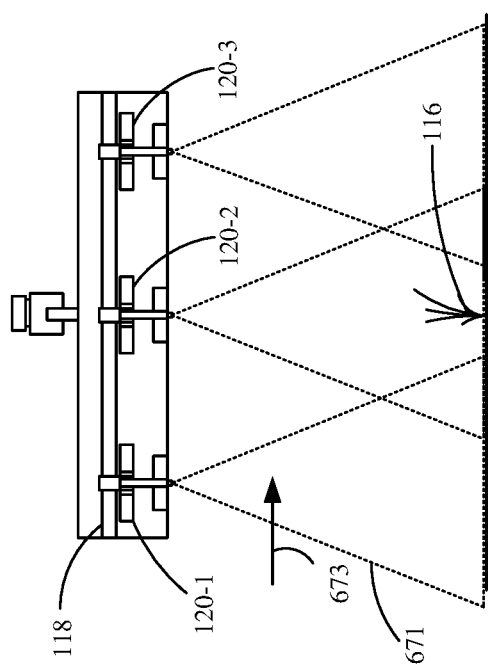

FIG. 22C-22F show examples of lateral offset. FIG. 22C shows a set of nozzle bodies 120-1, 120-2 and 120-3 on a boom 118, with nozzle 120-2 spraying material 671 on a weed 116. However, with a strong wind in the direction indicated by arrows 673, the spray pattern from nozzle 120-2 can shift laterally, relative to boom 118, as shown in FIG. 22D. In FIG. 22D, the material 671 misses weed 116. Therefore, in one example, lateral adjustment determination component 245 can identify a lateral adjustment based on the wind speed and direction, characteristics of the material 671, characteristics of the nozzles 120 (such as the material density, spray velocity, etc.), and boom 118 (e.g., boom height) and identifies nozzle 120-1 for activation instead of nozzle 120-2. Thus, as shown in FIG. 22E, the material 671 is applied to weed 116, even under the windy conditions. In another example, nozzle identification system 244 can identify one or more adjacent nozzles 120-1 and 120-3 to ensure that weed 116 is covered by material 671. Activating multiple nozzles is indicated in FIG. 22F.

Nozzle activation control system 246 then determines nozzle activation time and duration for the particular nozzles identified by nozzle identification system 244. Determining the nozzle activation time and duration is indicated by block 672 in the flow diagram of FIG. 22B. Determining the nozzle activation time and duration is described in greater detail below with respect to FIGS. 32-36.

Output generator 248 then provides an output indicative of the nozzle activation time and duration, for a particular set of nozzles, to nozzle/valve controller 170 in control system 160. Nozzle/valve controller 170 then generates control signals to control nozzle bodies 120 based upon the nozzle activation time and duration for the identified nozzles. Generating the control signals to activate the nozzles at the identified time, for the identified duration, is indicated by block 674.

The nozzles may be configured so that adjacent nozzles have spray areas that overlap with one another. Thus, the operator may enable a nozzle overlap feature which will trigger adjacent nozzles to provide overlapping areas of spray on identified targets. If the overlap feature is enabled, the adjacent nozzles are actuated to ensure an overlapping spray reaches the target. Detecting a nozzle overlap setting is indicated by block 676. Triggering multiple nozzles is indicted by block 678. Generating control signals to activate the nozzles can be done in other ways as well, as indicated by block 680. Until the spraying or application operation is complete, as indicated by block 682, processing reverts to block 576 where additional images are captured.

Figure 23:
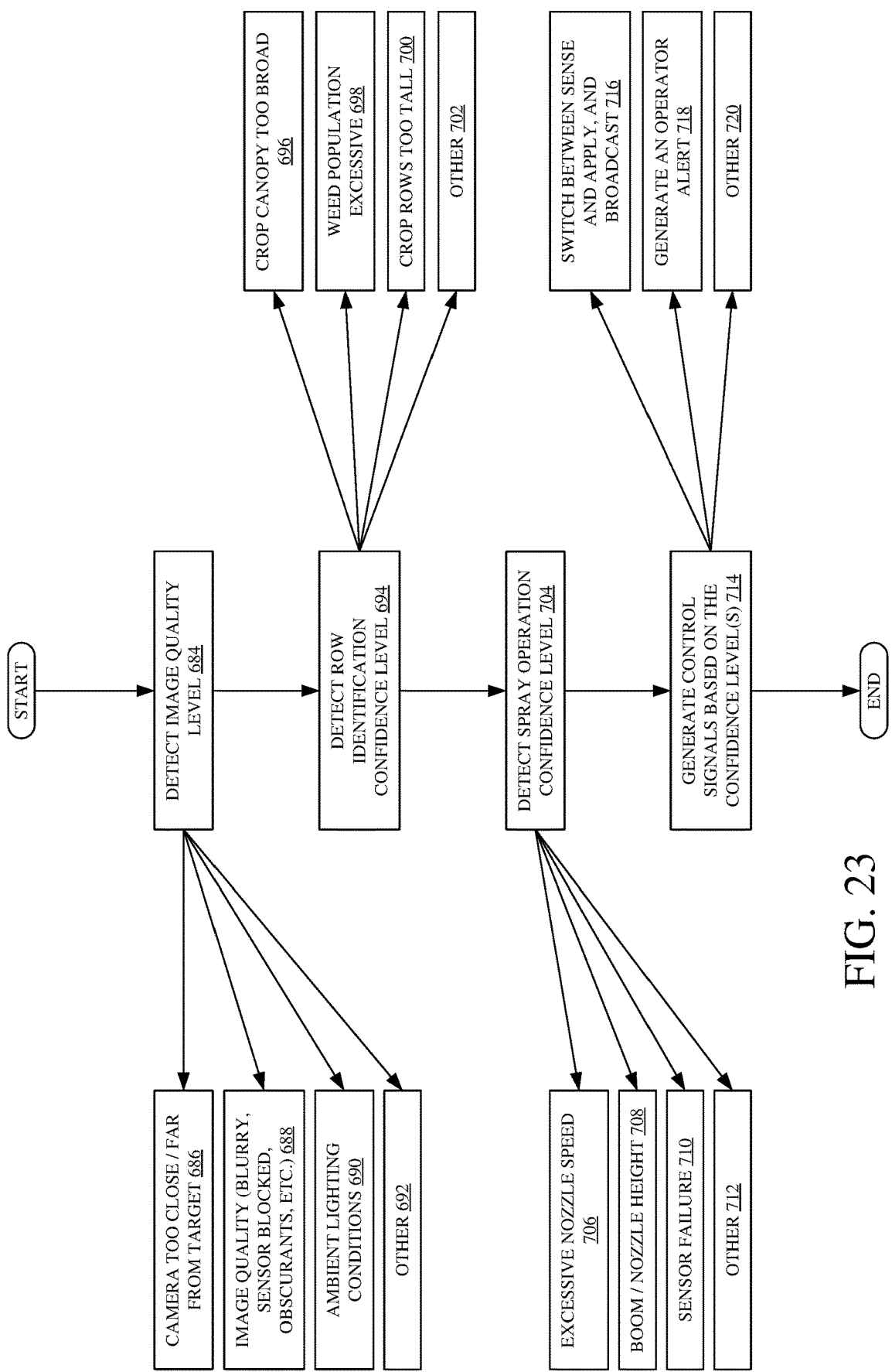
FIG. 23 is a flow diagram illustrating one example of how a metric corresponding to image quality, a confidence level, or set of confidence levels, is generated for a captured image.

FIG. 23 is a flow diagram illustrating one example of the operation of confidence level generator 234, in generating image quality metrics and confidence metrics corresponding to the image and the ability of the system to accurately apply material to a target. Image quality level detector 346 first detects an image quality level. This is indicated by block 684 in FIG. 23. For instance, detector 346 can determine whether the image sensor is too close or too far from the target to obtain a high quality image, as indicated by block 686. Detector 346 can also detect image quality, such as whether the image is blurry, whether the image sensor is blocked, whether the image sensor is obstructed by obscurants, or otherwise. Detecting image quality is indicated by block 688. Detector 346 can also generate an image quality level based upon ambient light conditions, as indicted by block 690. The image quality level can be generated in other ways as well, as indicated by block 692.

A number of different quality level determinations will now be described. In order to evaluate the level of obscurants, such as dust, a camera or other image sensor can be deployed ahead of the boom (on a forward portion of machine 100) to detect targets. The results of detecting targets with the forward camera can be compared to the results of detecting targets from image sensors 122. If the target identified by the forward camera and image sensors 122 are different by a threshold amount, this may mean that there is dust or other obscurant and the confidence level corresponding to the image can be reduced. Also, one or more image sensors 122 may process images of a marker on the vehicle structure (e.g., a green dot on a tire fender or mud flap). If the marker is no longer detectable due to dust or other obscurants, the confidence level is reduced. Nozzle speed can also be used to calculate or infer image blur or other poor image quality. Further, boom height can affect image quality as well. If the boom is too high, image resolution may suffer. If the boom is too low, the ROI may not be sufficiently large.

Row identification confidence level detector 348 generates a confidence level indicative of how confident the system is that it has adequately identified crop rows in the image. Detecting a row identification confidence level is indicated by block 694. For instance, in some circumstances, the crop canopy may be too broad to adequately distinguish between crop rows. Identifying whether the crop canopy is too broad is indicated by block 696. In other examples, the weed population in an area may be so excessive that it makes it difficult to distinguish between crop rows because the inter-row spaces in the image are filled with vegetation. Determining whether the weed population is excessive can be done by determining that the green level in the image is excessive and is indicated by block 698. In still other examples, crop rows may be too tall so that the canopy is too close to the camera to accurately identify crop rows. Detecting crop rows that are too tall is indicated by block 700. Detecting and generating a row identification confidence level can be done in other ways as well, as indicated by block 702.

Spray operation confidence level detector 350 generates a confidence level indicative of how confident the system is that it can adequately deliver material to an identified target. Detecting spray operation confidence level is indicated by block 704 in the flow diagram of FIG. 23. Generating the spray operation confidence level can be based on a variety of different criteria. In one example, it may be that the nozzle is moving at an excessive rate of speed. In such an example, the image processing module 124 may not have sufficient time to identify targets in the image, and identify and activate the nozzles, to adequately apply material to the target. Identifying excessive nozzle speed is indicated by block 706. In another example, the boom or nozzle height may be too high so that the time required for the material to travel from the nozzle to the target is too long. Using this information to identify a spray operation confidence level is indicated by block 708. In yet another example, there may be a sensor failure which makes it difficult to have a high level of confidence that the system will accurately apply the material to the target. Identifying a sensor failure and using that information to generate a spray operation confidence level is indicated by block 710. Detecting spray operation confidence level can be performed in other ways and based on other criteria as well, as indicated by block 712.

Once the confidence levels and quality metrics are generated by confidence level generator 234, nozzle/valve controller 170 can control the valves and nozzles to activate or not to activate, if the confidence level is not high enough. In another example, nozzle/valve controller 170 can change application modes (such as switching to a full broadcast mode in which nozzles are turned on full time), until the quality and confidence levels return to a desired level. Generating control signals based on the confidence and image quality levels is indicated by block 714. Switching between real time target identification (sense and apply) and broadcast modes is indicated by block 716. Generating an operator alert indicative of the low confidence or image quality levels is indicated by block 718. The control signals can be generated in other ways as well, as indicated by block 720.

Figure 24:
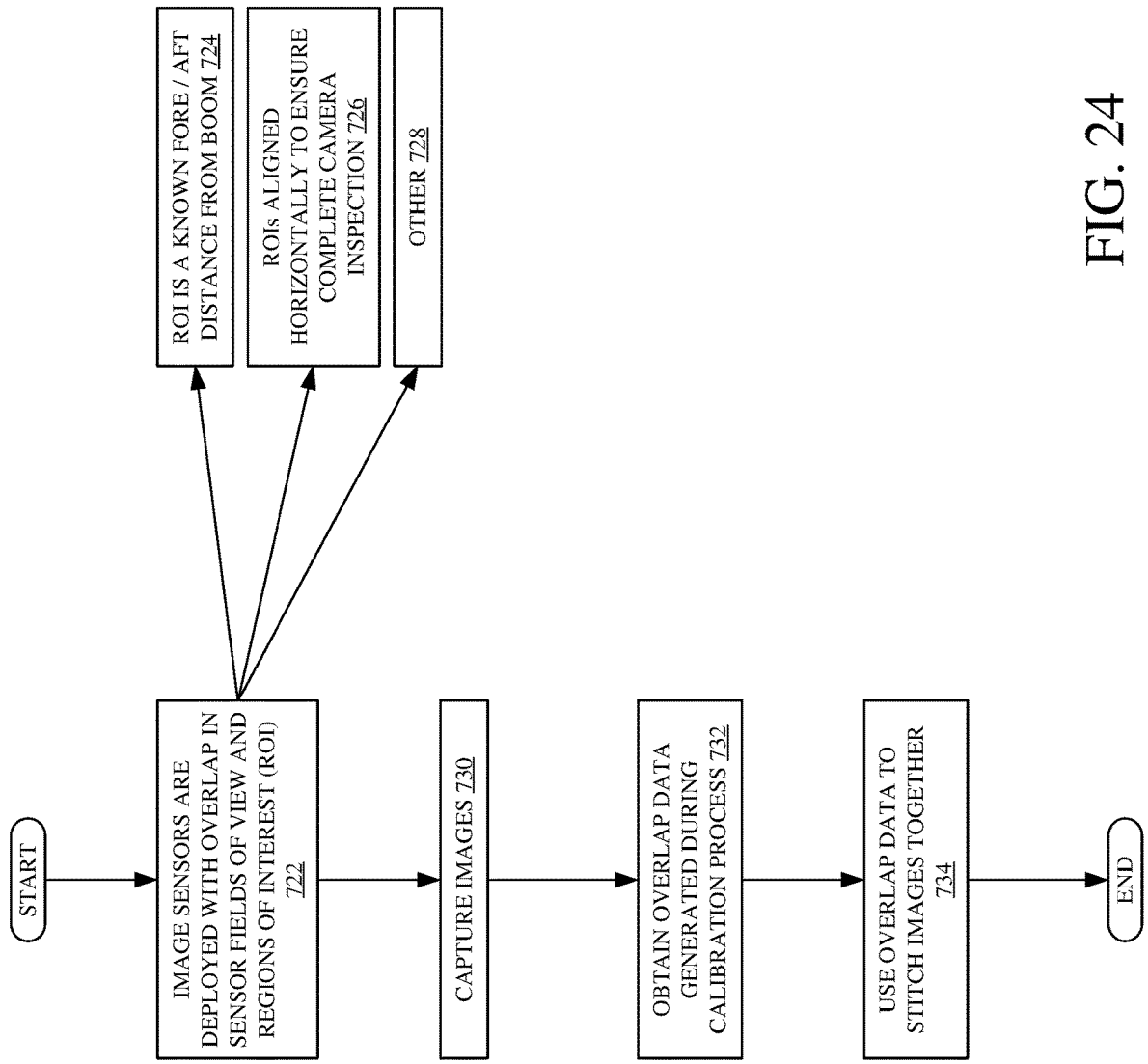
FIG. 24 is a flow diagram illustrating how images from a plurality of different cameras are stitched together.

FIG. 24 is a flow diagram illustrating one example of the operation of image stitching system 236 in stitching images. It is assumed that the image sensors 122 are deployed so that their fields of view overlap with one another, and the regions of interest, within those fields of view, overlap with one another as well. Image sensors 122 arranged in this way is indicated by block 722 in the flow diagram of FIG. 24. The ROI is located at a known fore/aft and lateral distance relative to the image sensor and boom, as indicated by block 724. The regions of interest are illustratively aligned horizontally to ensure complete image sensor inspection of the area of the ground along the front of the boom, as indicated by block 726. Deploying image sensors can be performed in other ways as well, as indicated by block 728.

The image sensors 122 then capture images, as indicated by block 730, and image stitching system 236 then obtains overlap data generated during the calibration process. The overlap data may be stored in data store 226 or elsewhere, and indicate how and to what extent, the regions of interest in the different image sensors overlap with one another. For instance, when the image sensors 122 are calibrated, the coordinates of the fields of view aid regions of interest of adjacent image sensors can be compared to identify the extent to which the fields of view and regions of interest overlap. This information can be stored for access by image stitching system 236. Obtaining the overlap data is indicated by block 732. Using the overlap data to stitch images together is indicated by block 734. The stitching function stitches adjacent images together to generate a single ROI comprised of the regions of interest of many image sensors stitched together.

Figure 25:
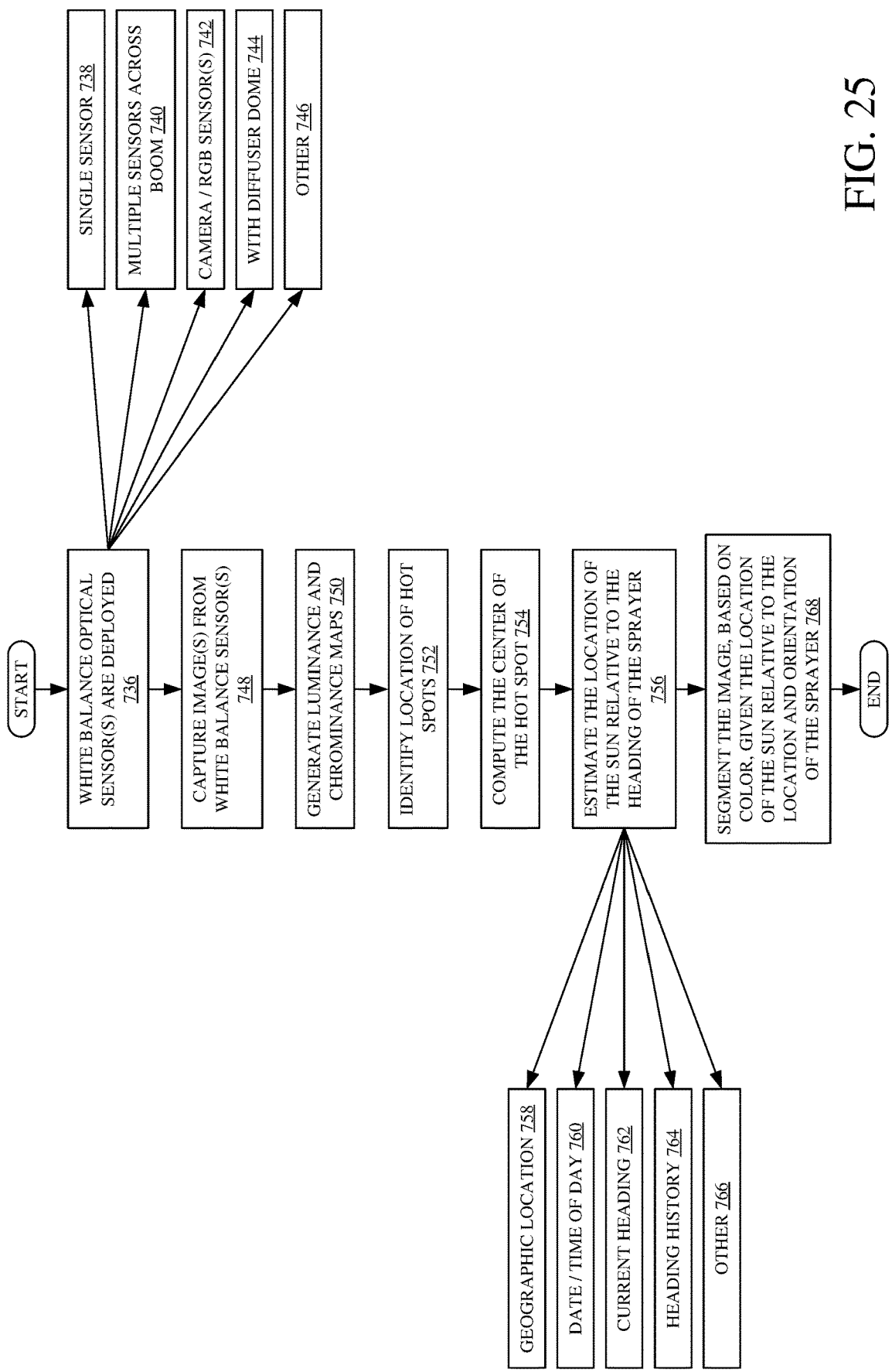
FIG. 25 is a flow diagram showing one example of how images are corrected for white balance information.

FIG. 25 is a flow diagram illustrating one example of the operation of white balance correction system 238 in generating white balance information that can be used in the image processing system for processing the images captured by image sensors 122. It is first assumed that one or more white balance sensors 130 are deployed on work machine 100, as indicated by block 736. This can be a single white balance sensor as indicated by block 738, or multiple white balance optical sensors deployed across the boom 118, as indicated by block 740. The white balance sensor may be a camera or RGB sensor 742 and it may have a diffuser dome disposed thereon, as indicated by block 744. The white balance optical sensor may be a different type of sensor or deployed in other ways as well, as indicated by block 746.

White balance correction system 238 captures images from the white balance sensors, as indicated by block 748. Luminance and chrominance maps of the diffuser dome are generated, as indicated by block 750, and the location of hot spots in luminance and chrominance maps is also identified, as indicated by block 752. Once the hot spots are identified, the center of each of the hot spots in each image is also computed, as indicated by block 754. A location of the sun is estimated, relative to the heading of agricultural machine 100, based upon the location of the center of the hot spots in the luminance and chrominance maps. Estimating the location of the sun is indicated by block 756. In one example, the geographic location 758 of agricultural machine 100, the time of day 760, the current heading 762 of machine 100, and the heading history 764 of machine 100 can be used in estimating the location of sun relative to the heading of agricultural machine 100. Other information 766 can also be used.

Once the color of the light and the intensity of the light sensed by the white balance optical sensors, and the location of the sun relative to the location and orientation and heading of agricultural machine 100 is known, then the images captured by the image sensors 122 can be segmented based upon the white balance information (the light color, the intensity, the location of the sun, etc.). Segmenting the image based upon the white balance information is indicated by block 768 in the flow diagram of FIG. 25. Segmentation can be performed in a wide variety of different ways.

Figure 26A:
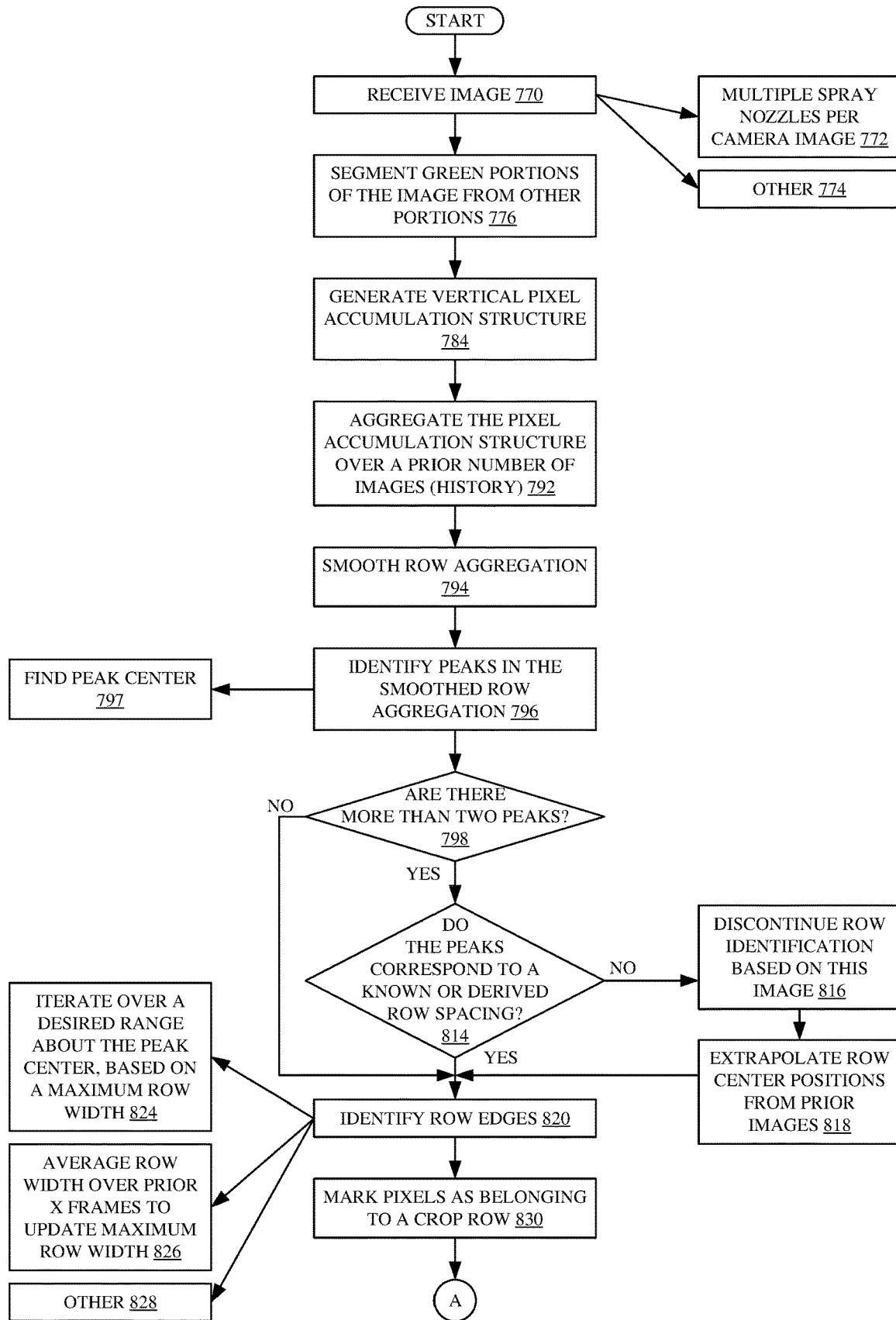
FIGS. 26A and 26B (collectively referred to herein as FIG. 26) show one example of a flow diagram illustrating how rows of crops are identified in an image.
Figure 26B:
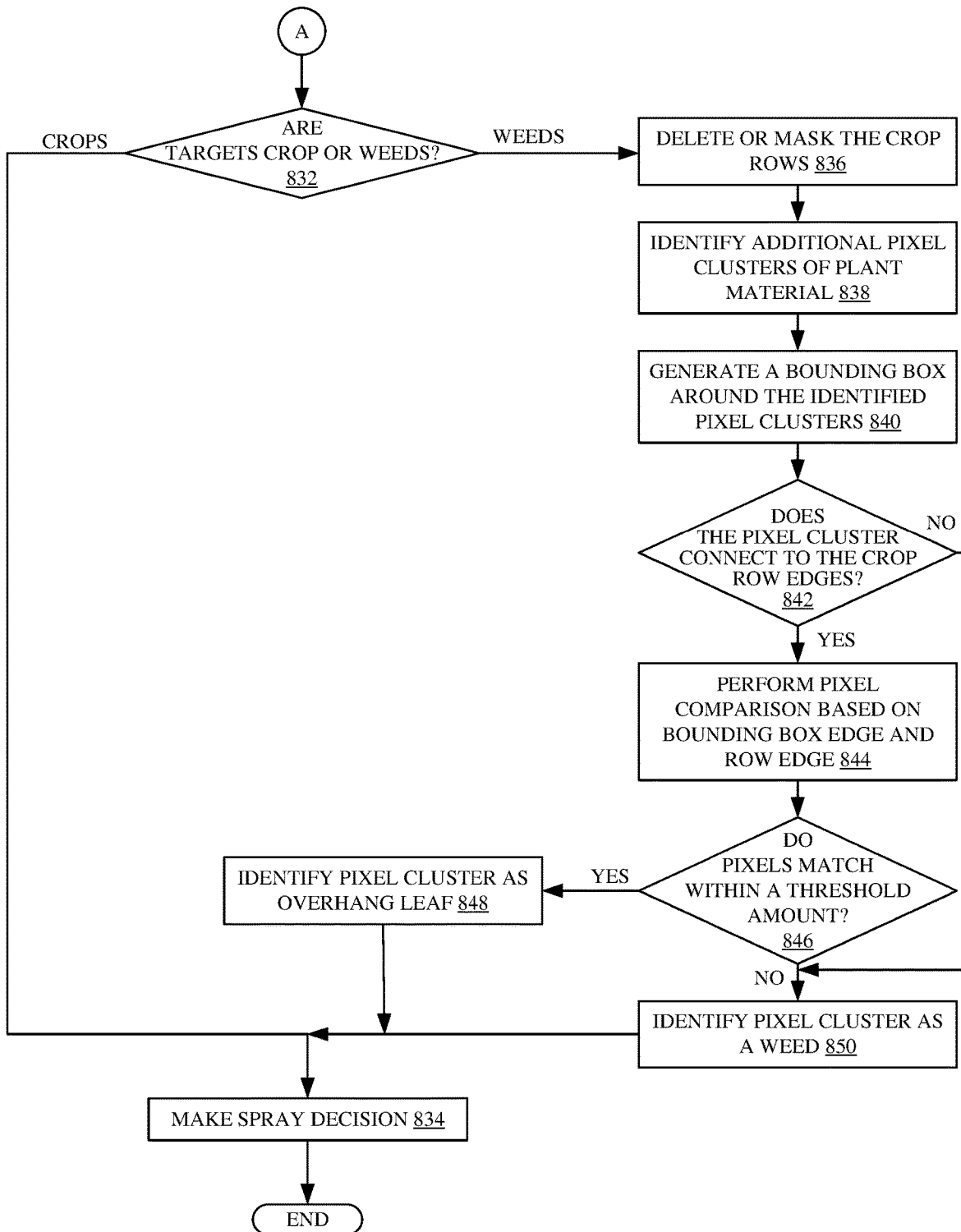

FIGS. 26A and 26B (hereinafter referred to as FIG. 26) illustrate a flow diagram showing one example of the operation of row identification system 240 (shown in FIG. 7) in more detail. FIGS. 26A-31 will now be described in conjunction with one another.

An image from an image sensor 122 is received. Receiving the image is indicated by block 770 in the flow diagram of FIG. 26. In the example discussed herein, multiple spray nozzles are mounted to spray the region of interest for a single image sensor. Having multiple spray nozzles per image is indicated by block 772. The image can be received and configured relative to the nozzles in other ways as well, as indicated by block 774.

Figure 27:
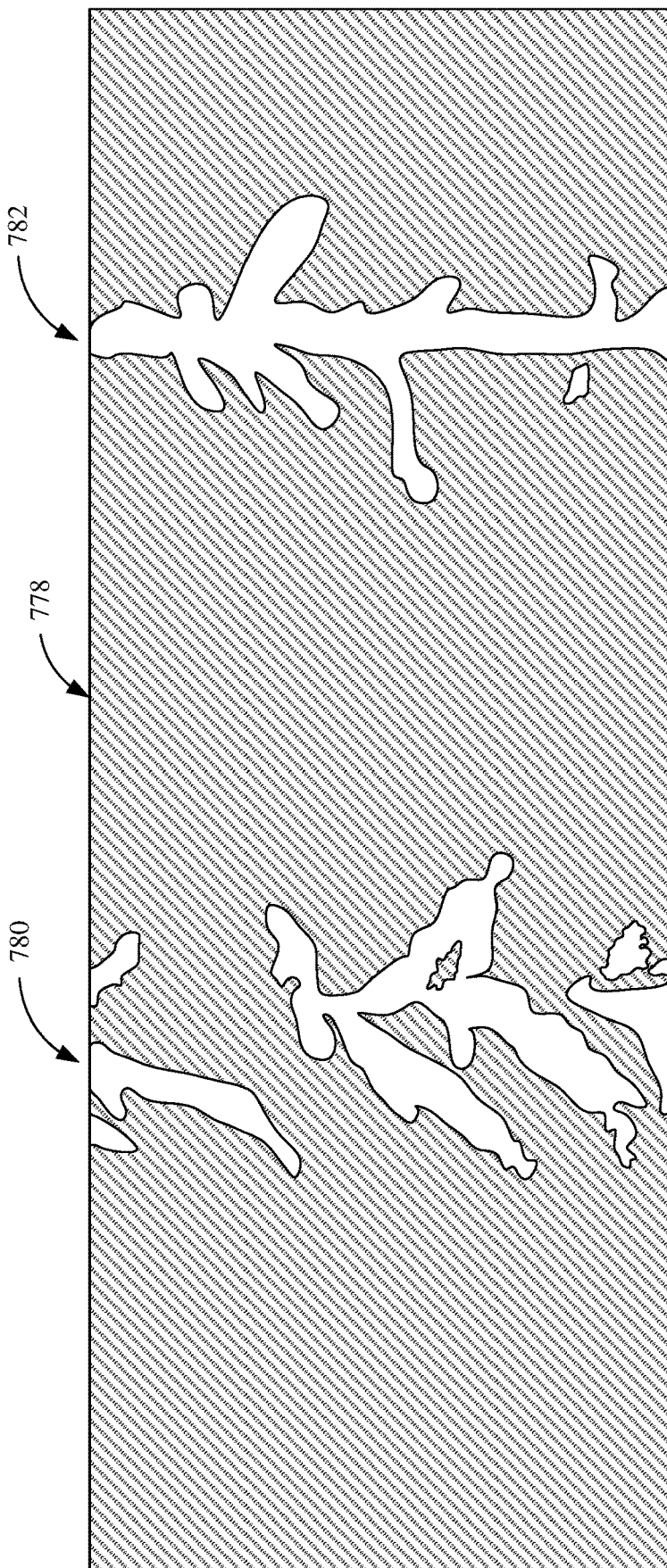
FIG. 27 illustrates segmented, binarized pixels.

Green segmentation system 354 then segments green portions of the images from the other portions. Segmenting the green portions of the image is indicated by block 776. The pixels in the segmented image can also be binarized so that green pixels are assigned a value of 1 (or white) while the other portions are assigned a value of 0 (or black). FIG. 27 shows one example of a segmented image 778. Image 778 includes two rows that have green pixels which have been assigned a white value, while the remainder of the image is assigned a black value (the black values are shown with cross hatching in FIG. 27). The two rows of green, which have been assigned a white value, are indicated generally at 780 and 782 in FIG. 27.

Figure 28:
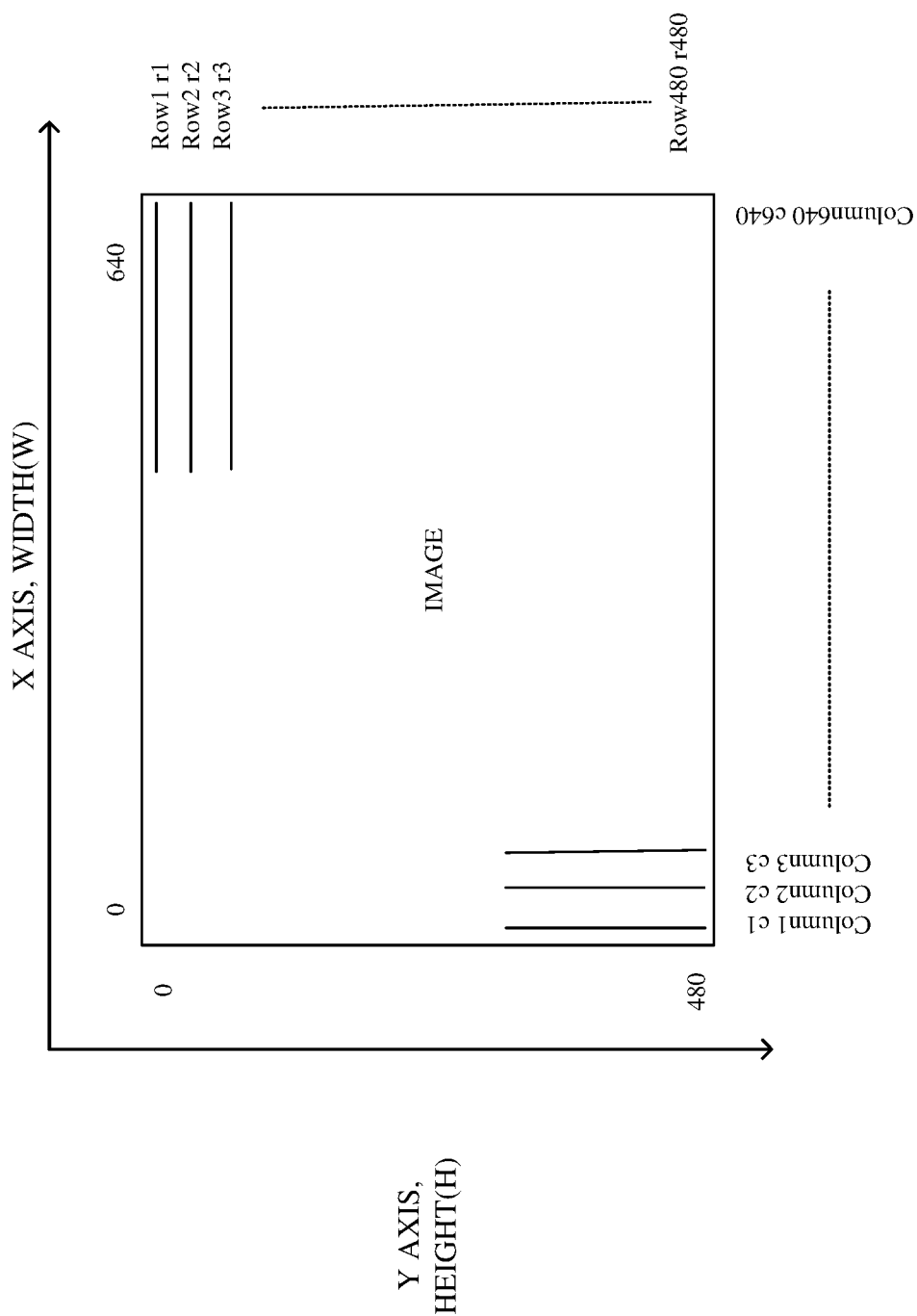
FIG. 28 illustrates a representation showing one example of a display screen.

Pixel accumulator 356 generates a vertical pixel accumulation structure that accumulates the white pixel values across image 778. FIG. 28 shows an example in which the image is displayed on a 640×480 pixel display mechanism. FIG. 28 shows an image that has pixels along an X axis labeled 0-640, and along a Y axis labeled 0-480. The vertical pixel accumulation structure is obtained by summing the white pixels across all vertical rows in each given column. The totals of each column then become the values of each bin in the pixel accumulation structure. Thus, in one example, the number of bins in the vertical pixel accumulation structure corresponds to the number of columns in the image. However, in another example, bins can also be combined to reduce the amount of data at the cost of lower resolution in the pixel accumulation structure. Generating the vertical pixel accumulation structure is indicated by block 784 in FIG. 26.

Figure 29:
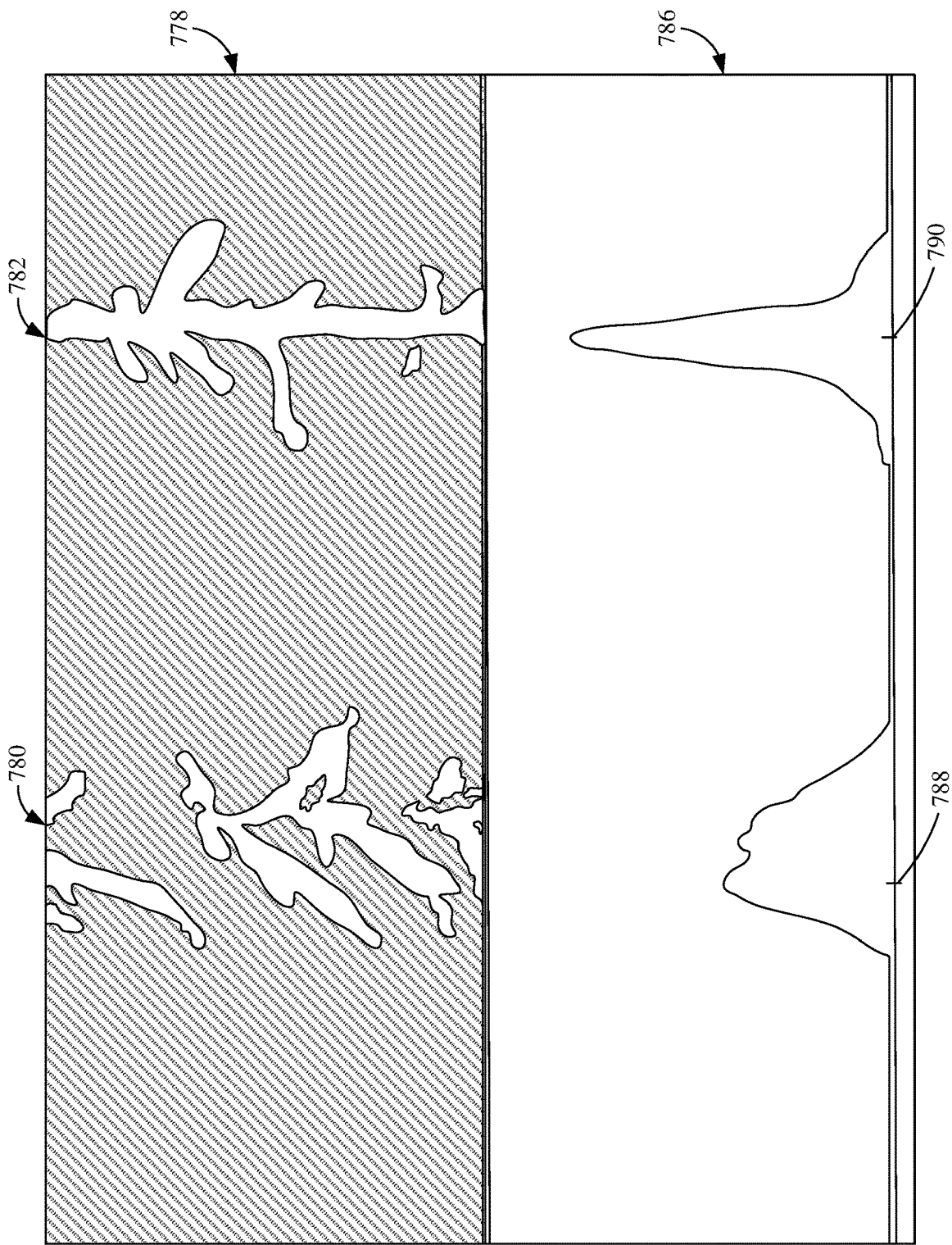
FIG. 29 illustrates the accumulation of pixel information, in columns, based on a segmented image.

FIG. 29 shows one example of a representation 786 of a plurality of vertical pixel accumulation structures 788 and 790 juxtaposed relative to image 778. Structure 786 accumulates the white value pixels in each column and thus corresponds to the row identified at 780 in image 778. Structure 790 accumulates the white value pixels in each column and thus corresponds to the row identified generally at 782.

Historical aggregation system 358 then generates a historical aggregation of the pixel accumulation structures so that the pixel accumulation structures can be smoothed. The row accumulation historical aggregation structure is generated by aggregating the pixel accumulation structures over a prior number of images (or frames). Generating the historical aggregation structure is indicated by block 792 in the flow diagram of FIG. 26. The historical aggregation structure is then smoothed by historical aggregation system 358 as well, as indicated by block 794. In one example, the historical aggregation structure is generated by averaging each bin over a previous number A of frames. In one example, A is 10. (The total number of bins is the number of bins which is the same as the number of columns in the image width). The historical aggregation structure is the vertical pixel accumulation structure with each bin averaged over A number of frames, and the vertical pixel accumulation structure is the structure from the current image. The historical aggregation structure is thus generated as shown below in Table 1, where the historical aggregation of the pixel accumulation structure is represented by rowAccumHistory, the previous number of frames is represented by A, and the pixel accumulation structure is represented by PAS:

TABLE 1

```
for(intx = 0; x < totalNumberBins; x++)
rowAccumHistory[x] = (rowAccumHistory[x] * (A -1) + PAS[x]) / A;
```

Smoothing the historical aggregation structure is achieved by averaging each bin with a number of bins before and after it (e.g., with a number of adjacent columns). In one example, each column is averaged over +/−7 columns.

Figure 30:
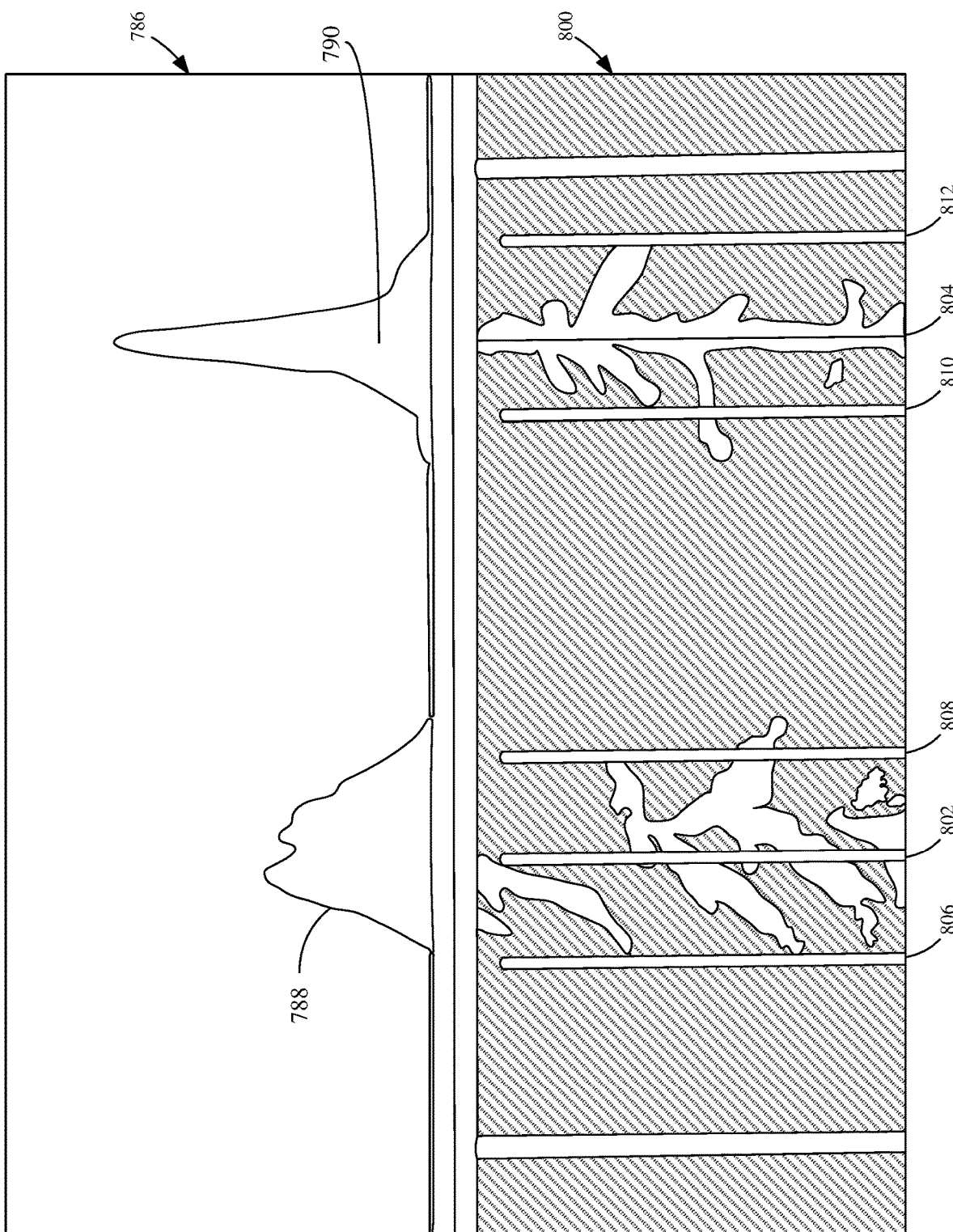
FIG. 30 illustrates the identification of crop row edges based upon the accumulated pixel information.

Row identification system 240 then identifies the rows in the image. Peak identifier 366 first identifies peaks in the smoothed historical aggregation structures. FIG. 30 shows one example of the pixel accumulation structures after they have been incorporated into a historical structure (using A prior frames), and smoothed (by averaging each column over the values in a given number of adjacent columns). Peak identifier 366 identifies peaks in the smoothed historical aggregation structures 788 and 790. Identifying peaks in the smoothed historical aggregation structures 788 and 790 is indicated by block 796 in the flow diagram of FIG. 26. In one example, peak identifier 366 identifies where the value in the historical aggregation structure exceeds a pre-defined value (or a predefined height), which may be user-defined or defined in other ways. Peak identifier 366 also identifies where the historical aggregation structure drops below the predefined height. A peak is identified as lying between these two points. The pre-defined height is chosen to ensure that there is enough data to obtain a desired confidence in the peak identification. The pre-defined height may depend on the growth stage of the crop. The center of the peaks may be identified as the center of these two points. Finding the peak center is indicated by block 797. Where multiple peaks are identified in a single historical aggregation structure (e.g., structure 788 in FIG. 30), the peak having the maximum height is also identified and may be considered to have the highest confidence in indicating row position.

Processing then depends on the number of peaks identified. For example, if no peaks are identified, then this indicates that no rows are identified in the image. Also, row identification system 240 may process the row detection differently depending on whether there are two or more peaks, or only one peak, identified in the image.

FIG. 30 also shows one example of the smoothed historical aggregation structures 788 and 790 juxtaposed to an image 800 where the center of each peak in structures 788 and 790 are identified generally at 802 and 804. Similarly, the row edges are defined generally at 806, 808, 810 and 812.

If there are more than two peaks identified in the image where the different peaks are found in different historical aggregation structures, as indicated at block 798 in FIG. 26, then row spacing processor 368 determines whether the two peaks are separated by a known or derived, expected row spacing. This is indicated by block 814 in FIG. 26. For example, if the rows are not separated by an expected row spacing, then row identification system 240 discontinues row identification based on this particular image. Discontinuing row identification based on this image is indicated by block 816 in the flow diagram of FIG. 26. Instead, the location of the rows can be extrapolated based on the row center positions from prior images. Extrapolating row position in this way is indicated by block 818 in the flow diagram of FIG. 26. Once the possible peak positions are determined, along with their height, then the row edges are found by finding the width of the peak at a user-defined height (e.g., ¾ of the peak's height). Row edge identifier 370 scans over a desired range about the peak center based on a maximum expected row width. If the width of the peak is wider than the pre-defined maximum expected width, then the peak may be disregarded as being outside of a threshold width. Row edge identifier 370 identifies the edges of the row based upon the width of the peak.

Identifying row edges is indicated at block 820 in the flow diagram of FIG. 26. Iterating over a desired range about the center of the peaks, based upon the maximum row width expected, is indicated by block 824. For example, to identify the location of the edges of the row, processing begins at the center of the peak position and iterates over the peak position in each direction by a horizontal distance corresponding to half of the expected maximum row width. The row widths can be averaged over a previous pre-defined number of frames so that the maximum expected row width is updated. Averaging the width over a number X of prior frames to update the maximum row width is indicated by block 826. The row edges can be found in other ways as well, as indicated by block 828.

Pixel marking system 372 then marks pixels between the two row edges, that correspond to the binarized values of the segmented green color, as belonging to a crop row. Marking the pixels within the row edges as belonging to a crop row is indicated by block 830 in the flow diagram of FIG. 26.

Then, before finding targets to which material is to be applied, row masking component 362 determines whether the targets are going to be the crop rows or weeds. Determining whether the targets are crop rows or weeds is indicated by block 832 in the flow diagram of FIG. 26.

If the targets are crop rows, then row identification system 240 provides an output indicating the location of the crop rows to nozzle identification system 244 where nozzles can be identified and their identity can be provided to nozzle activation control system 246 so the spray decision can be made with respect to the identified nozzles to apply material to the crop rows. In one example, row identification system 240 can mask all areas in the image, other than the identified rows. In another example, the identified row boundaries can be used to identify nozzles for activation. Making this spray decision is indicated by block 834 in the flow diagram of FIG. 26.

If, at block 832, row masking component 362 determines that the material is to be applied to weeds (so that the crop rows are not targets, but instead weeds are targets), then row masking component 362 deletes or masks the crop rows from the images being processed. Deleting or masking the crop rows is indicated by block 836 in the flow diagram of FIG. 26.

After the rows are deleted or masked, then target identification processor 242 identifies additional pixel clusters of segments (e.g., segmented and binarized based on green detection) plant material in areas other than where the rows have been masked off. This is indicated by block 838 in the flow diagram of FIG. 26. Weed filter system 380 generates a bounding box around the identified pixel clusters. Generating a bounding box around the identified pixel clusters is indicated by block 840 in the flow diagram of FIG. 26.

Figure 31:
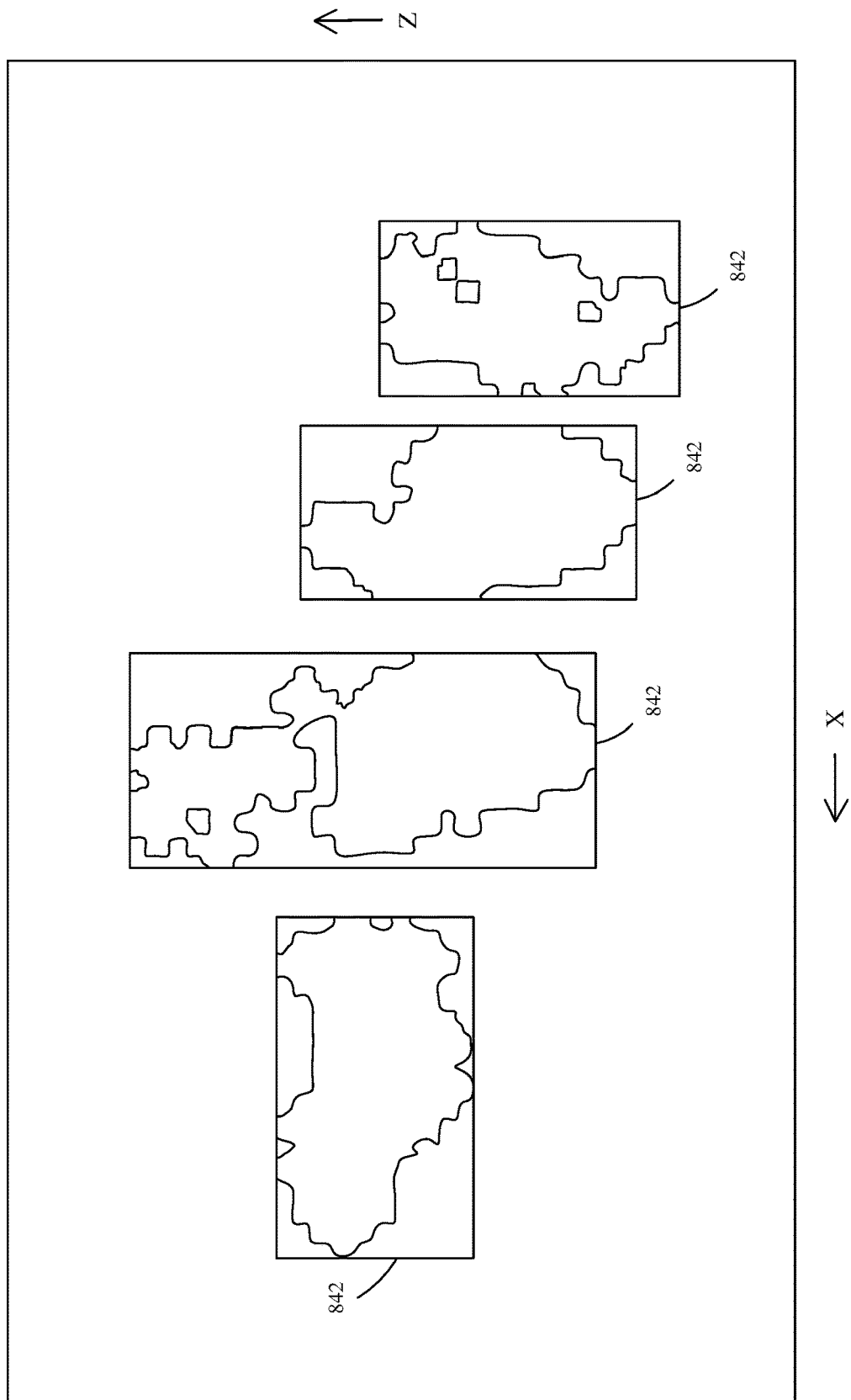
FIG. 31 illustrates the isolation of weeds in an image.

FIG. 31 shows one example in which a plurality of bounding boxes 842 are generated around pixel clusters that are not co-located with the crop rows. For example, the pixel clusters are still present in the image after the crop rows are masked.

It may be that some of the pixel clusters identified are actually overhangs of the plant material from the crop rows, instead of separate weeds. For example, referring again to FIG. 30, there are portions of the row crop material that extend past the row edges 808 and 810, respectively. Thus, even if rows 802 and 804 are masked off, that overhanging plant material may be identified as a pixel cluster. In order to ensure that row crop material is not sprayed, weed locator 388 determines whether the plant material in an identified pixel cluster is connected to the edge of the crop row. Determining whether the pixel cluster is connected to the crop row is indicated by block 842 in the flow diagram of FIG. 26. If the pixel cluster is connected to the edge of the crop row, then pixel accumulation structures corresponding to the crop row are analyzed along with the pixel values within the pixel cluster that are adjacent the crop rows. The pixel values within the pixel cluster will align with the pixel values on the crop row edge, if the plant is likely to be an overhang of the crop material. Performing a pixel comparison based upon the bounding box edge and the row edge is indicated by block 844 in the flow diagram of FIG. 26. If the number of matching pixels on the bounding box edge and the crop row edge meets a threshold number of pixels, as indicated by block 846, then the pixel cluster is identified as an overhanging leaf from the crop material, as indicated by block 848. However, if the number of matching pixels does not meet the threshold number, then the pixel cluster is identified as a weed, as indicated by block 850. Again, the spray decision 834 is made based on whether the pixel cluster is identified as a weed or a crop overhang.

Figure 32:
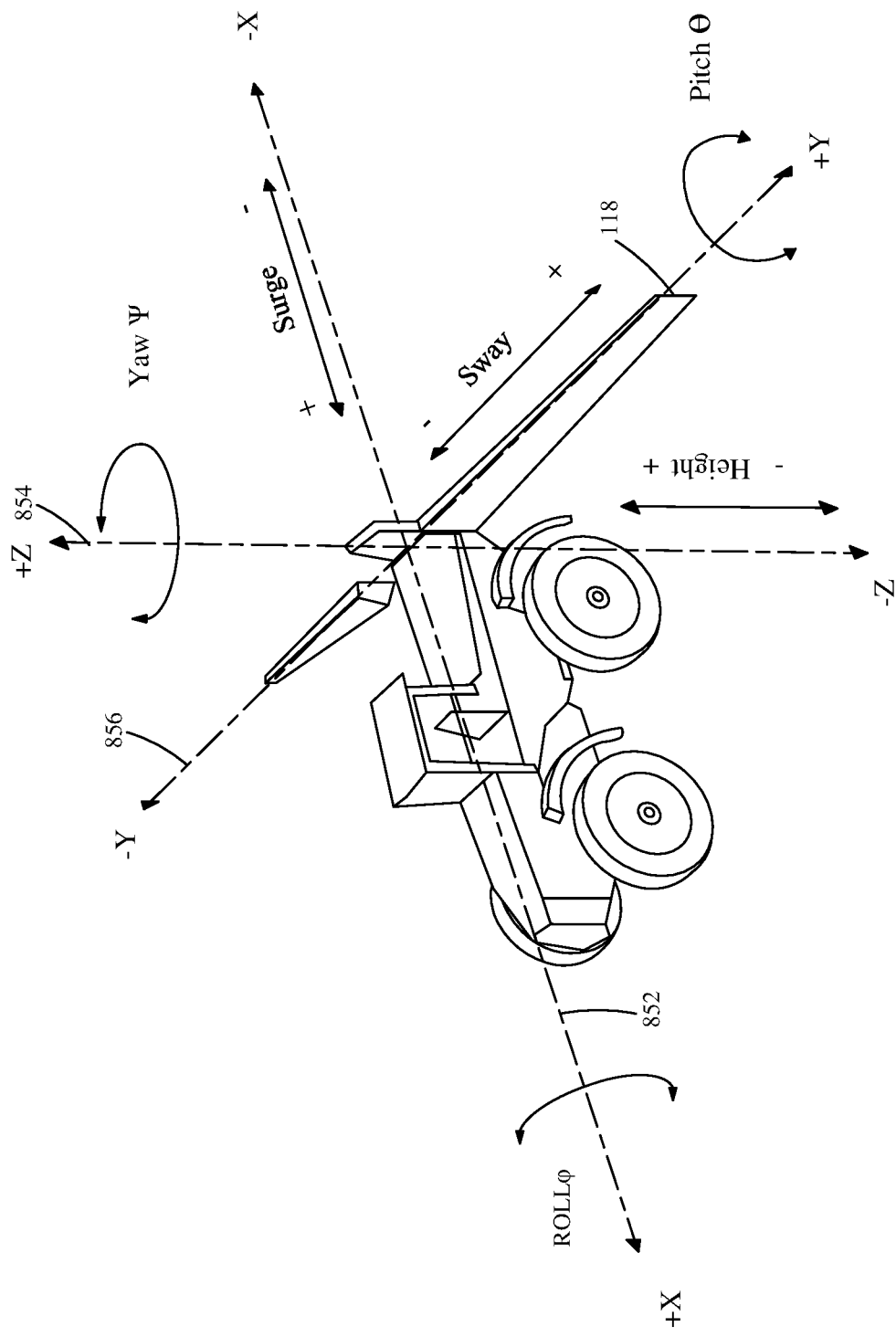
FIG. 32 shows one example of the agricultural machine illustrated in FIG. 1, with dynamics information labeled thereon.
Figure 33:
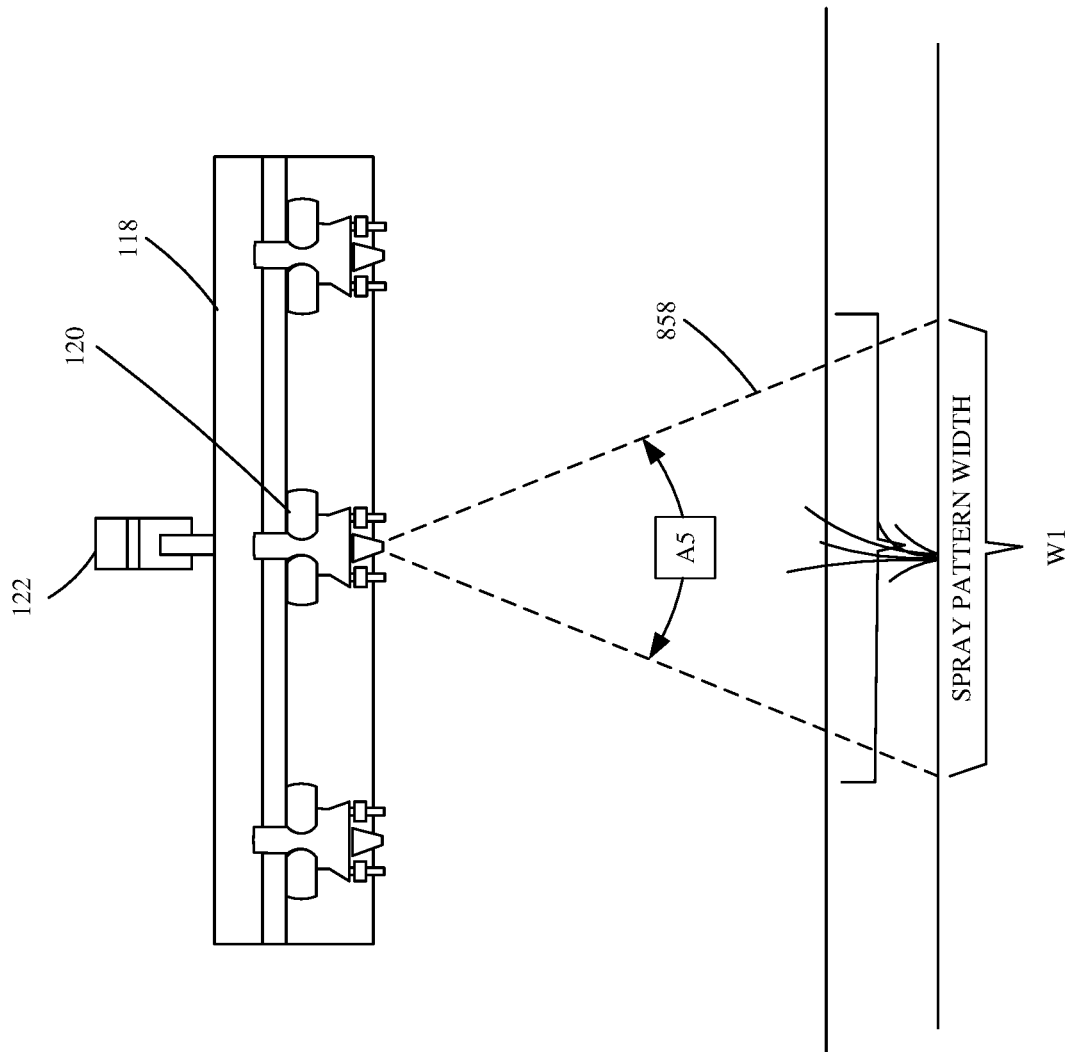
FIG. 33 is a partial pictorial illustration defining nozzle spray pattern dimension information.
Figure 34:
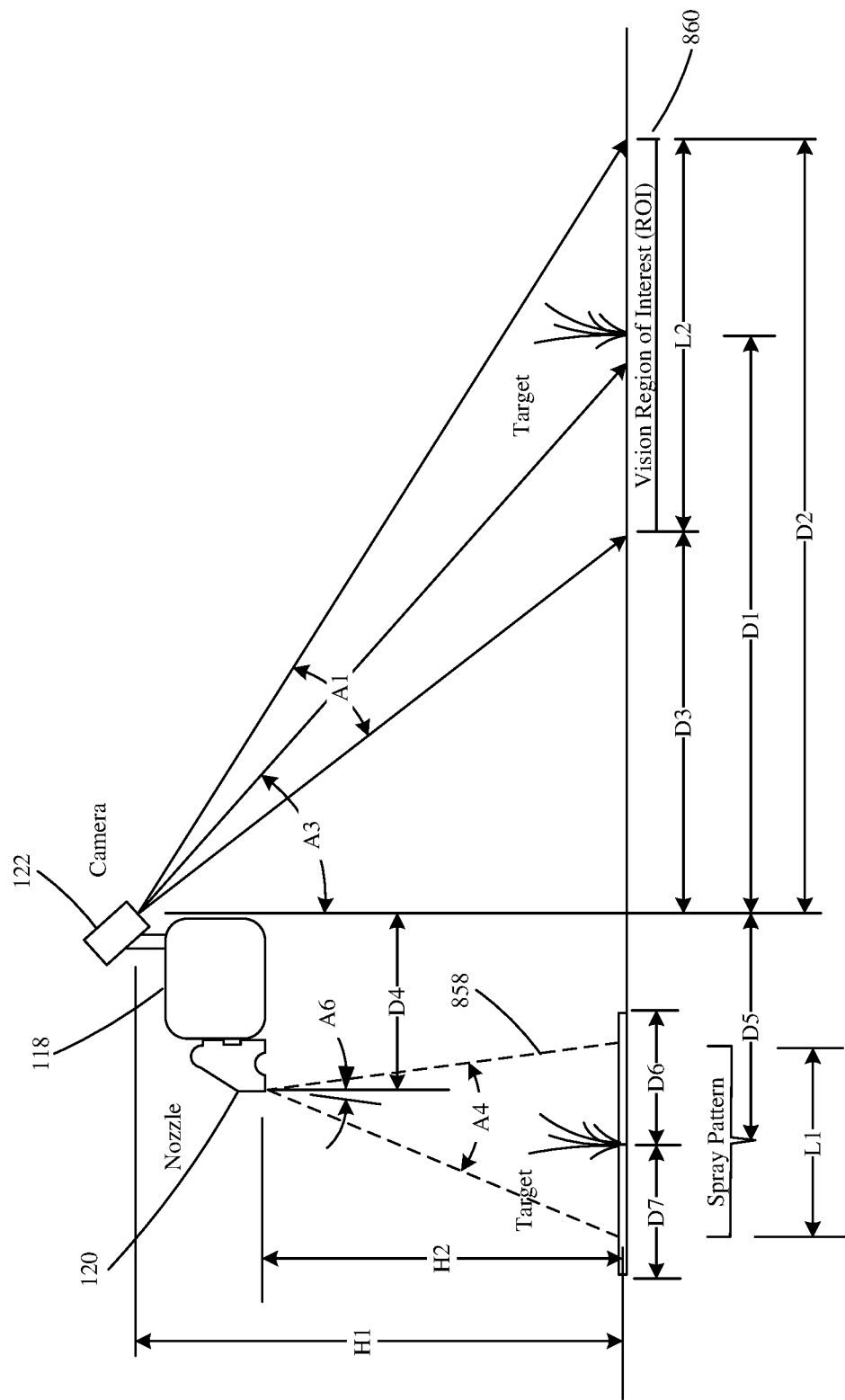
FIG. 34 is a partial pictorial illustration defining nozzle spray pattern and camera region of interest dimension information.
Figure 35:
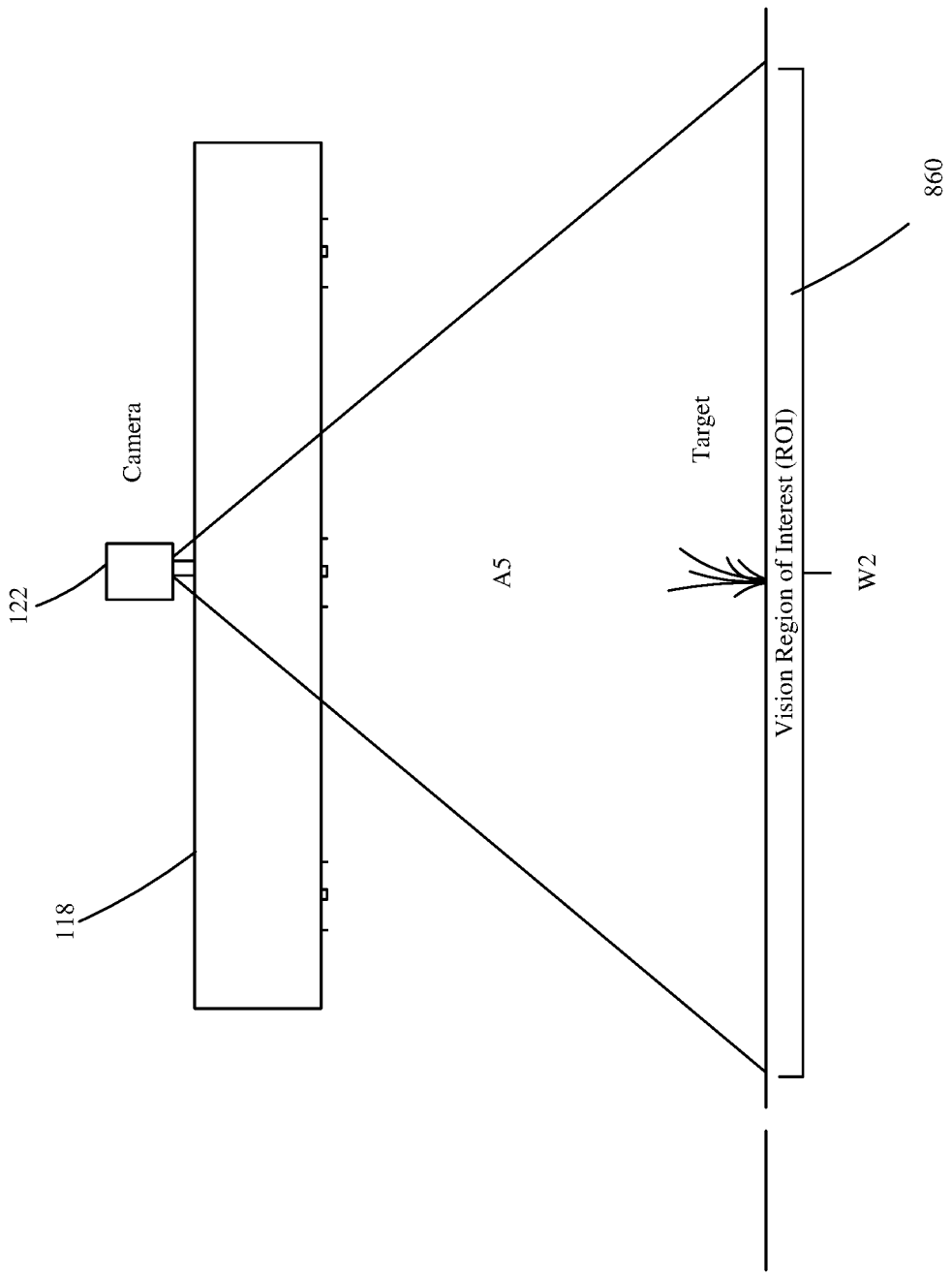
FIG. 35 is a partial pictorial illustration defining camera region of interest dimension information.

FIGS. 32-35 show one example of the various machine dimensions, machine dynamics, and variable definitions that can be used by nozzle activation control system 246 (shown in FIG. 10) in determining when to turn a set of nozzles on, how long to leave the set of nozzles on, and when to turn them off, in order to apply material to a particular target (e.g., a weed). FIG. 32 shows one example of machine 100 with a longitudinal axis 852 and a vertical axis 854 that extends vertically through a connection point between boom 118 and machine 100. Boom 118 also has a longitudinal axis 856. Axes 852, 856 and 854 represent the x, y, and z axes in the coordinate system shown in FIG. 32. FIG. 33 shows a portion of boom 118 with a nozzle body 120 that is spraying a material across a spray pattern represented at 858. FIG. 33 also shows an image sensor 122 mounted on boom 118. FIG. 34 is a side view showing a portion of boom 118, spray nozzle body 120 and image sensor 122, shown in FIG. 33, except taken from a side view. FIG. 34 also shows the spray pattern 858, from the side view, and identifies the region of interest 860 for image sensor 122, on the ground. FIG. 35 is a view of a portion of boom 118, which is opposite that shown in FIG. 33. Therefore, FIG. 35 shows a different view of the region of interest 860 of image sensor 122. The variables identified in FIGS. 32-35 are defined as set out in Table 1 below (in which the image sensors are referred to as cameras).

TABLE 1

Figure 36:
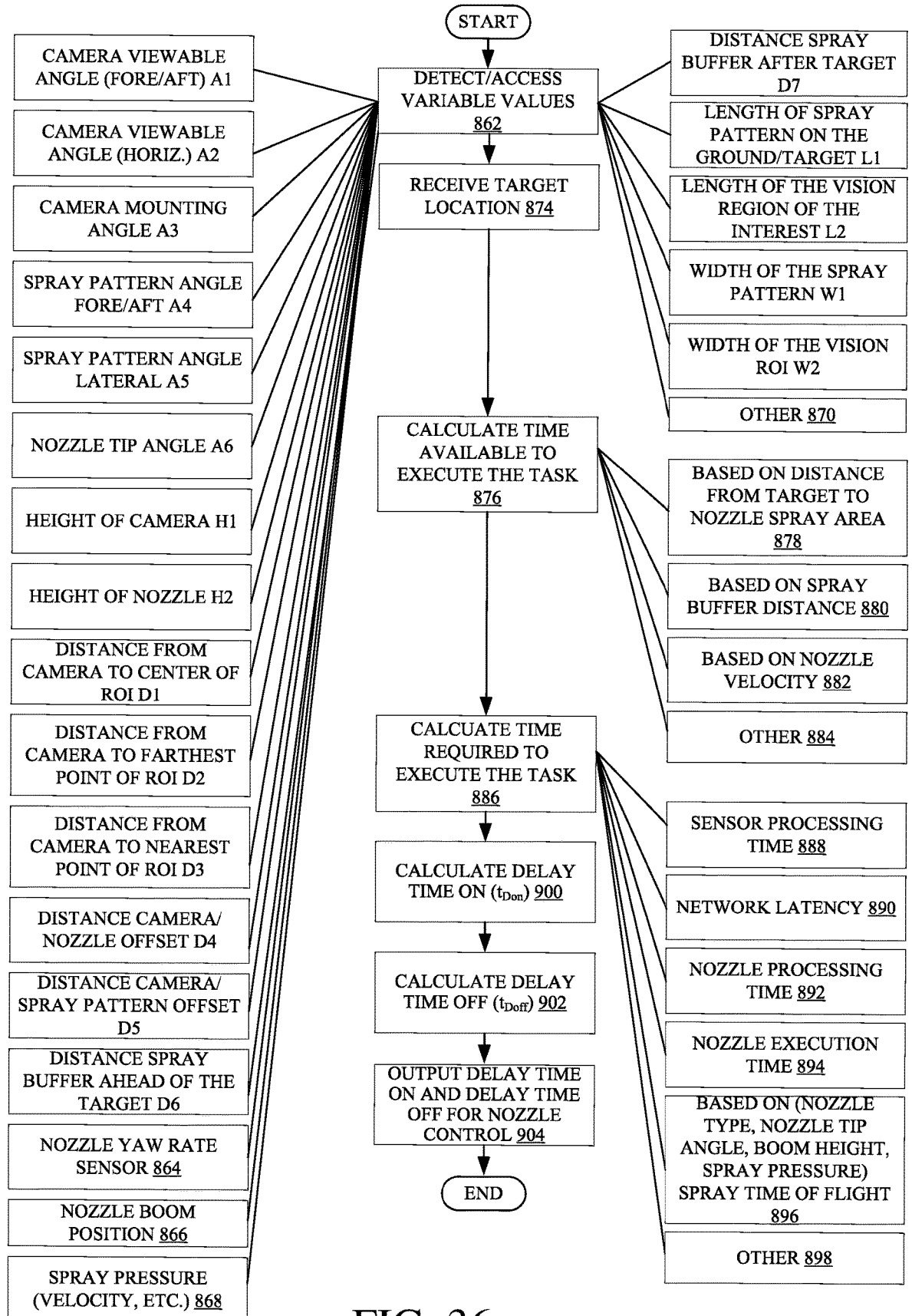
FIG. 36 is a flow diagram illustrating one example of the operation of the agricultural machine in identifying hold on and hold off times used to control nozzles in applying material to an agricultural field.

A1 - Camera Viewable Angle Fore/Aft
A2 - Camera Viewable Angle Horizontal
A3 - Camera Mounting Angle
A4 - Spray Pattern Angle Fore/Aft
A5 - Spray Pattern Angle Lateral
A6 - Nozzle Tip Angle
H1 - Height of Camera TABLE 1-continued H2 - Height of Nozzle
D1 - Distance from Camera to Center of ROI
D2 - Distance from Camera to Farthest point of ROI
D3 - Distance from Camera to Nearest point of ROI
D4 - Distance Camera/Nozzle Offset
D5 - Distance Camera/Spray Pattern Offset
D6 - Distance Spray Buffer ahead of the target
D7 - Distance Spray Buffer after the target
L1 - Length of Spray Pattern on the Ground/Target
L2 - Length of the Vision Region of Interest
W1 - Width of the Spray Pattern
W2 - Width of the Vision Region of Interest FIG. 36 is a flow diagram illustrating one example of the operation of nozzle activation control system 246 (shown in FIG. 10) in determining when a specific nozzle is to be turned on, and when it is to be turned off, given the target location 872 of a target (e.g., a weed). Variable value sensors 404 first sense or access the machine dynamics and variable values shown in FIGS. 32-35. Dimension/dynamics sensors and input mechanisms 412 may sense or access previously stored machine dimensions and dynamics. Sensors and mechanisms 412 may also sense inputs of the machine dimensions and dynamics as well. The inputs may be downloaded or operator inputs. Real-time sensors 414 sense variable values in real-time, as machine 100 is operating. Detecting or accessing the variable values used in determining the nozzle actuation timing is indicated by block 862 in the flow diagram of FIG. 36.

The variables can include the values identified in Table 1 above, and also indicated in FIG. 36. The values can also include inputs from a nozzle yaw rate sensor 864 that senses the yaw rate of the nozzle to be activated, as defined in FIG. 32. The yaw is defined as rotation about axis 854, as illustrated in FIG. 32. The variables may also include the nozzle and boom position which indicates the height of the boom above the ground, and the orientation of the nozzle, given that boom position. The variables may also include the spray pressure (or velocity, or both, etc.) of the material being sprayed from the nozzle, as indicated by block 868. The variable values may include a wide variety of other variables as well, as indicated by block 870.

Nozzle activation control system 246 also receives the target (e.g., weed) location 872, from weed locator 388 in target identification processor 242 as indicated by block 874 in the flow diagram of FIG. 36. Delay time on generator 406 then generates the delay time which will be time elapsed prior to activating the identified nozzle. The time that the machine will delay before turning on the specified nozzle is referred to as DelayTimeOn and is indicated by Equation 43 below.

$$\text{Delay Time On} = t_{D_{on}} = \text{Time Available to Execute Task} - \text{Time Required to Execute Task} \quad \text{Eq. 43}$$

It can be seen that the DelayTimeOn value is dependent upon the time required to execute the task (the time needed to activate the nozzle and have the material travel from the output of the nozzle to the target) and the time available to execute the task (the time between a current time and when the nozzle will reach the weed location and need to be activated). Thus, task execution time generator 420 first generates the time available to execute the task as illustrated in Equation 44 below.

$$\text{Time Available to Execute Task} = t(Aexe) = \frac{\text{Distance}[D1 + D5] - \text{Spray Buffer Distance}(D6)}{\text{Nozzle Velocity}} \quad \text{Eq. 44}$$

Nozzle velocity determination component 418 determines the nozzle velocity as indicated by Equation 45.

$$\text{Nozzle Velocity} = v_N = f[\text{position on the boom, yaw rate}] \quad \text{Eq. 45}$$

The time required to execute the task, in turn, depends on the processing time for the image sensor 122, any network latency (e.g., CAN latency) in transmitting messages, the nozzle processing time (the amount of time for the nozzle body controller to process the command that it receives), the nozzle execution time (the amount of time between when the nozzle body valve is energized and when it actually opens), and the spray time of flight. The time required to execute the task is represented by Equation 46 below.

$$\text{Time Required to Execute Task} = t(\text{Rexe}) = \Sigma(\text{Camera Processing Time, CAN Latency, Nozzle Processing Time, Nozzle Execution Time, Spray Time of Flight}) \quad \text{Eq. 46}$$

The spray time of flight is calculated by spray time of flight generator 422. The spray time of flight is the time required for the material to travel from the outlet end of the nozzle to the target and depends upon the type of nozzle, the angle of the nozzle tip, the boom height, and the spray pressure. This is indicated by Equation 47 below.

$$\text{Spray Time of Flight} = t_{SF} = f(\text{Nozzle Type}(A4,A5), \text{Nozzle Tip Angle }(A6), \text{Boom Height }(H2), \text{Spray Pressure}) \quad \text{Eq. 47}$$

DelayTimeOn generator 406 uses these values and determines the DelayTimeOn as indicated by Equation 43.

DelayTimeOff generator 408 generates an output indicative of the amount of time (from a current time) until the nozzle body is to be turned off. DelayTimeOff generator 408 calculates the DelayTimeOff as indicated below in Equation 48.

$$\text{Delay Time Off} = t_{Doff} = t_{Don} + \frac{\text{Distance}[D6 + D7]}{\text{Nozzle Velocity}} \quad \text{Eq. 48}$$

Calculating the DelayTimeOff is indicated by block 902 in the flow diagram of FIG. 36. Output generator 409 then generates an output indicative of the DelayTimeOn and the DelayTimeOff and sends the output to the spray body nozzle controller to control the identified nozzle accordingly. Outputting the DelayTimeOn and DelayTimeOff for nozzle control is indicated by block 904 in the flow diagram of FIG. 36.

Figure 37:
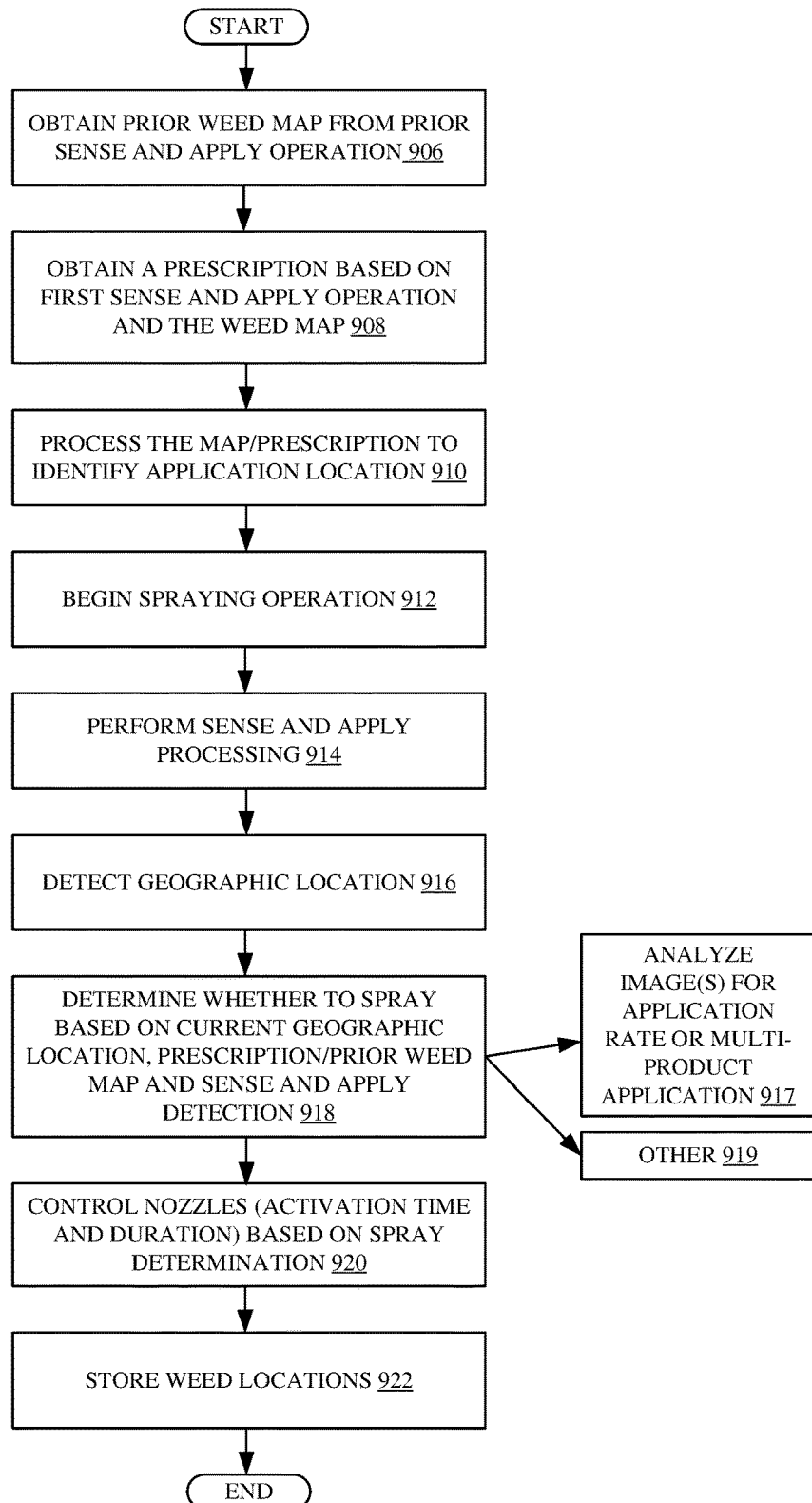
FIG. 37 is a flow diagram illustrating one example of the operation of the agricultural machine in performing a double knock operation.

FIG. 37 is a flow diagram showing one example of the operation of double knock processing system 165 (shown in FIG. 9) and multi-product controller 179 (shown in FIG. 1C). Double knock processing system 165 first receives or accesses a prior weed map from a prior operation (such as a prior sense and apply or other material application operation). Obtaining the prior weed map is indicated by block 906 in the flow diagram of FIG. 37.

Double knock processing system 165 may also receive or obtain a prescription (the particular material to be applied, the application rate or dosage, etc.) indicating how the material is to be applied. This is indicated by block 908 in the flow diagram of FIG. 37. The prescription may include the weed location information from the weed map or the weed map and the prescription may be separate. They are discussed herein as separate, but this is just one example.

Based upon the prior weed map and the prescription, prior weed locator 398 identifies the locations where weeds were previously sprayed, from the prior weed map. Substance/dosage identifier 400 identifies the prescription for treating those weeds, based upon the prescription. It will be noted that, in one example, the prescription may be pre-defined. In another example, the prescription may be varied. Processing the map and prescription to identify the weed application locations, and the dosage/application rate to apply is indicated by block 910 in the flow diagram of FIG. 37. This processing can be performed prior to beginning the spraying operation, or during the spraying operation.

It will be noted that, in one example in which machine 100 carries multiple different materials that can be applied to identified targets, the prescription may indicate additional information. For example, if a weed was treated by a first material during a first pass in the field, but the weed is still vibrant (e.g., green) during the second pass, then this may mean that the weed is resistant to the first material that was applied at a first rate during the first pass. Therefore, the prescription may indicate that the weed should be treated, on the current pass, with a higher application rate of the first material or that the weed should be treated with a second material. Multi-product controller 179 thus processes the prescription to identify how the weed is to be treated.

At some point, though, machine 100 begins the spraying operation. This is indicated by block 912. Agricultural machine 100 performs the sense and apply processing as described above with respect to FIGS. 1-36. This is indicated by block 914. Double knock processing system 165 receives a geographic position of machine 100 from geographic position sensor 202. This is indicated by block 916. Location comparison system 394 compares the current location of agricultural machine 100 with the weed locations identified by prior weed locator 398. Based upon the comparison of where machine 100 currently is, as well as its heading and speed, and based upon the prior weed locations, spray decision system 396 determines whether to activate any nozzles to perform a double knock application or a multi-product application. This is indicated by block 918 in the flow diagram of FIG. 37.

As one example, the captured images are analyzed to identify weeds as discussed above. If a weed is identified at the same location as in the prior weed map, this means that the weed that was treated during the prior pass is still green and vibrant, which can indicate a resistance to the material applied to it on the first pass. Thus, multi-product controller 179 can generate an output indicating that the weed should be treated with a different material or at a different application rate. In another example, an image of the weed taken during the first pass can be stored along with the prior weed map, and that image can be compared to the current image to determine whether the weed is dying (meaning it is not resistant to the material applied during the first pass) or whether the weed is still vibrant (meaning that it may be resistant). Multi product controller 179 then generates an output to treat the weed with a different material or at a different rate or in another way. Analyzing the image(s) for application rate or multi-product application is indicated by block 917 in FIG. 37. Determining whether to spray can be done in other ways as well, as indicated by block 919.

If spray decision system 396 outputs a decision that a spray operation is to be performed, or if other elements in target identification system 158 generate an output identifying a target to be sprayed, then those outputs are provided to the nozzle identification system and nozzle activation control system 246 so that the nozzle bodies can be controlled based on the spray determinations or decisions that are made. Controlling the nozzles is indicated by block 920 in the flow diagram of FIG. 37.

The weed locations that are sprayed can be stored for later access as well. This is indicated by block 922.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. the UI display can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, they can be actuated using a point and click device (such as a track ball or mouse). The mechanisms can be actuated using hardware buttons, switches, a joystick or keyboard, thumb switches or thumb pads, etc. They can also be actuated using a virtual keyboard or other virtual actuators. In addition, where the screen on which the mechanisms are displayed is a touch sensitive screen, they can be actuated using touch gestures. Also, where the device that displays them has speech recognition components, the mechanisms can be actuated using speech commands.

A number of data stores have also been discussed. It will be noted the data store discussed herein can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 38:
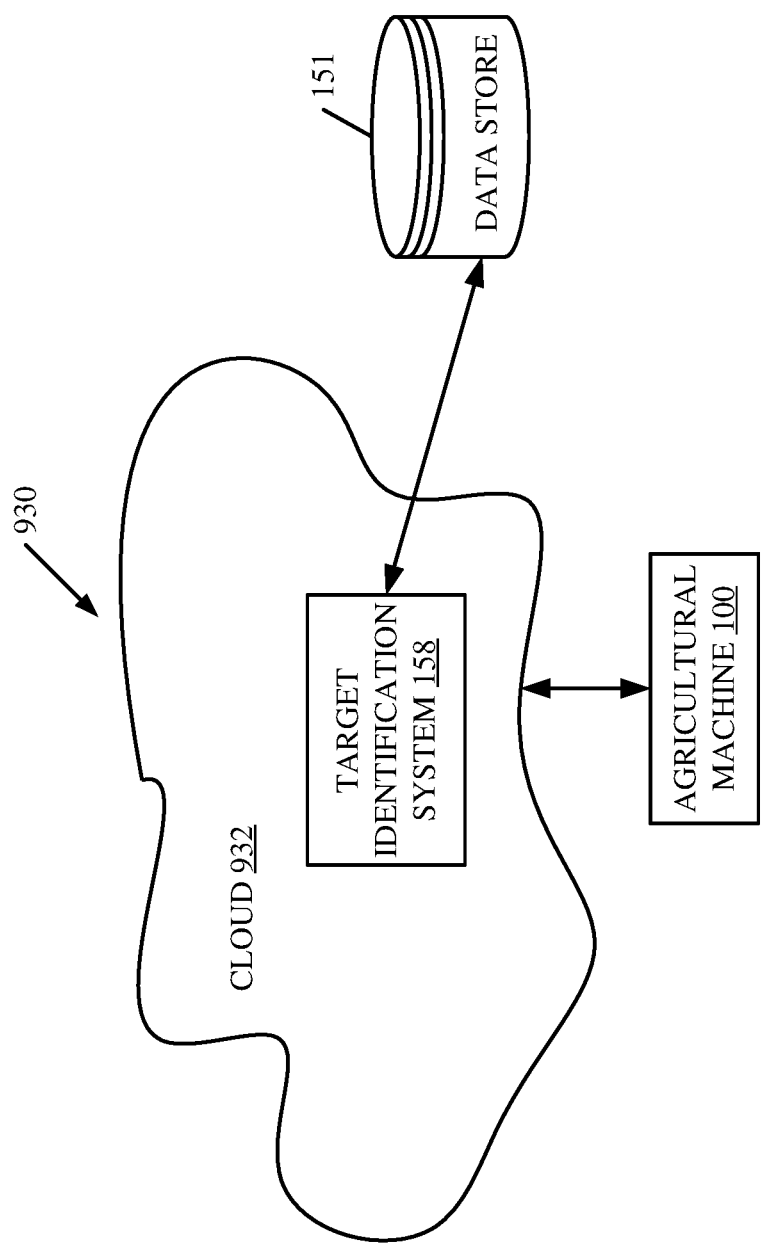
FIG. 38 is a block diagram showing one example of the agricultural machine illustrated in FIG. 1, deployed in a remote server environment.

FIG. 38 is a block diagram of machine 100, shown in FIG. 1, except that it communicates with elements in a remote server architecture 930. In one example, remote server architecture 930 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 38, some items are similar to those shown in previous FIGS. and they are similarly numbered. FIG. 38 specifically shows that target identification system 158 and data store 151 can be located at a remote server location 932. Therefore, machine 100 accesses those systems through remote server location 932.

It is also contemplated that some elements of previous FIGS. an be disposed at remote server location 932 while others are not. By way of example, data store 151 can be disposed at a location separate from location 932, and accessed through the remote server at location 932. Regardless of where they are located, they can be accessed directly by machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine 100 comes close to the fuel truck for fueling, the system automatically collects the information from the machine 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine 100 until the machine 100 enters a covered location. The machine 100, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 39:
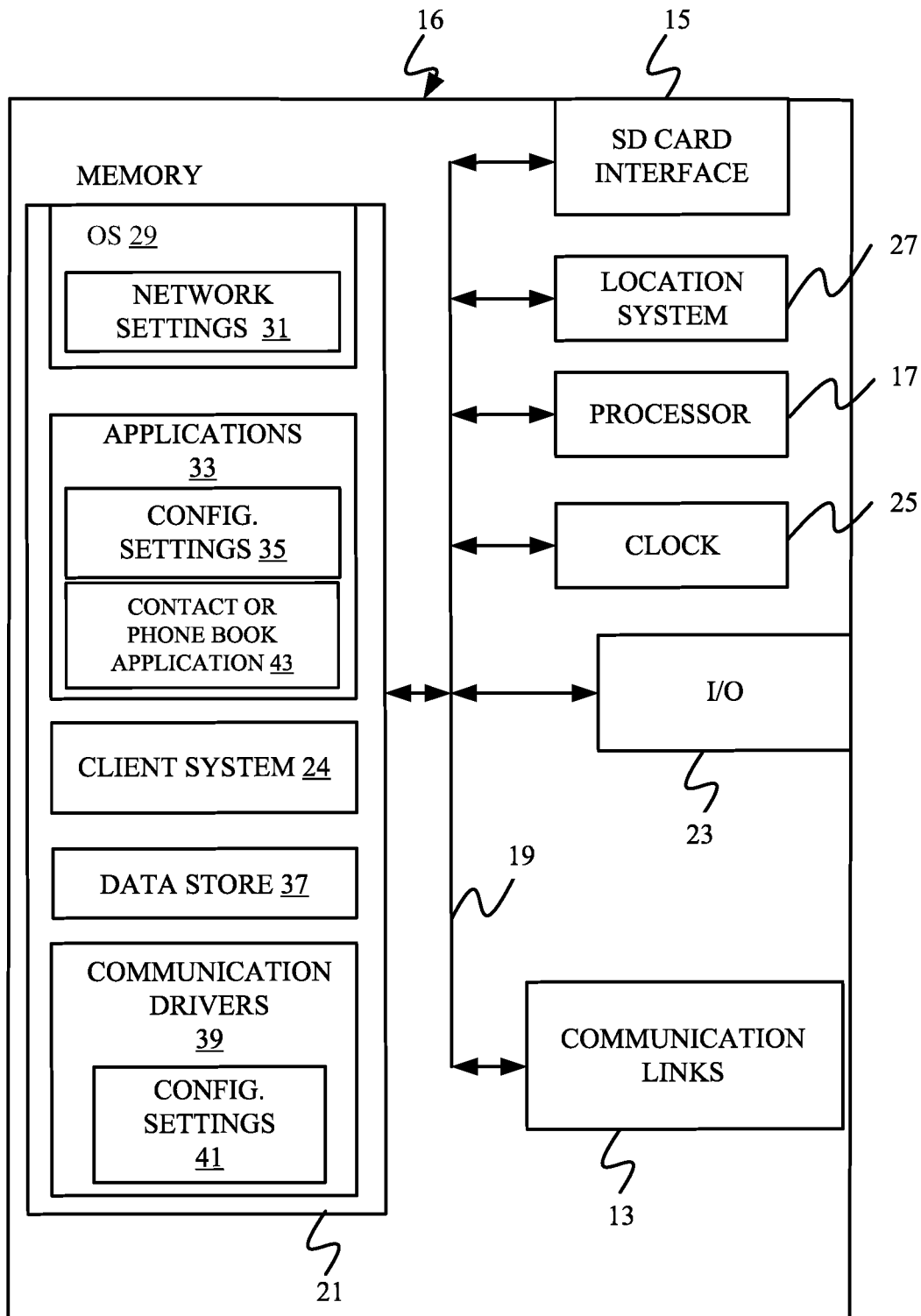
FIGS. 39, 40, and 41 show examples of mobile devices that can be used in the agricultural machine and architectures illustrated in previous figures.
Figure 40:
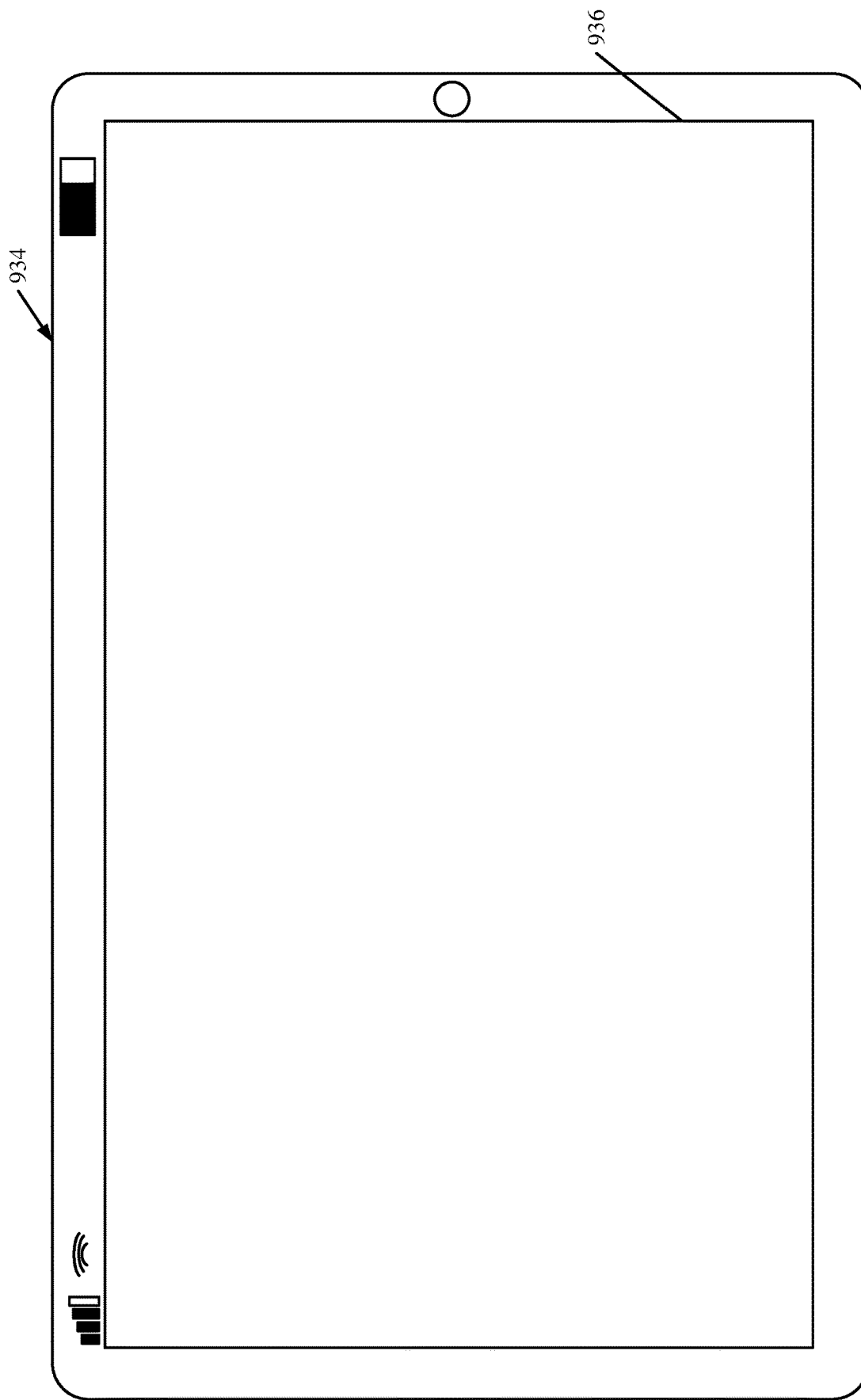
Figure 41:
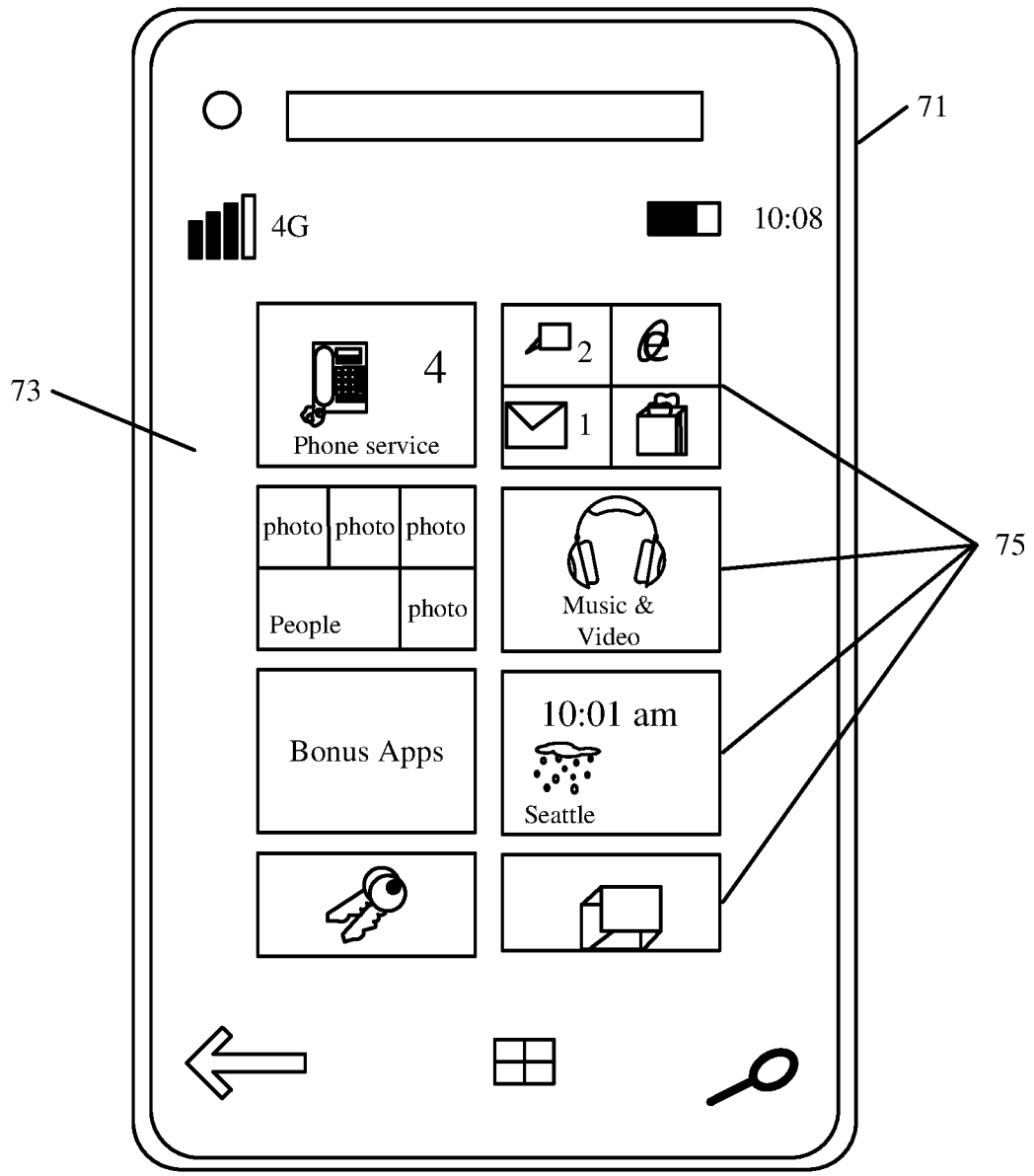

FIG. 39 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 100 for use in generating, processing, or displaying the material application data. FIGS. 40-41 are examples of handheld or mobile devices.

FIG. 39 provides a general block diagram of the components of a client device 16 that can run some components shown in previous FIGS., that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 40 shows one example in which device 16 is a tablet computer 934. In FIG. 40, computer 934 is shown with user interface display screen 936. Screen 936 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 934 can also illustratively receive voice inputs as well.

FIG. 41 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 42:
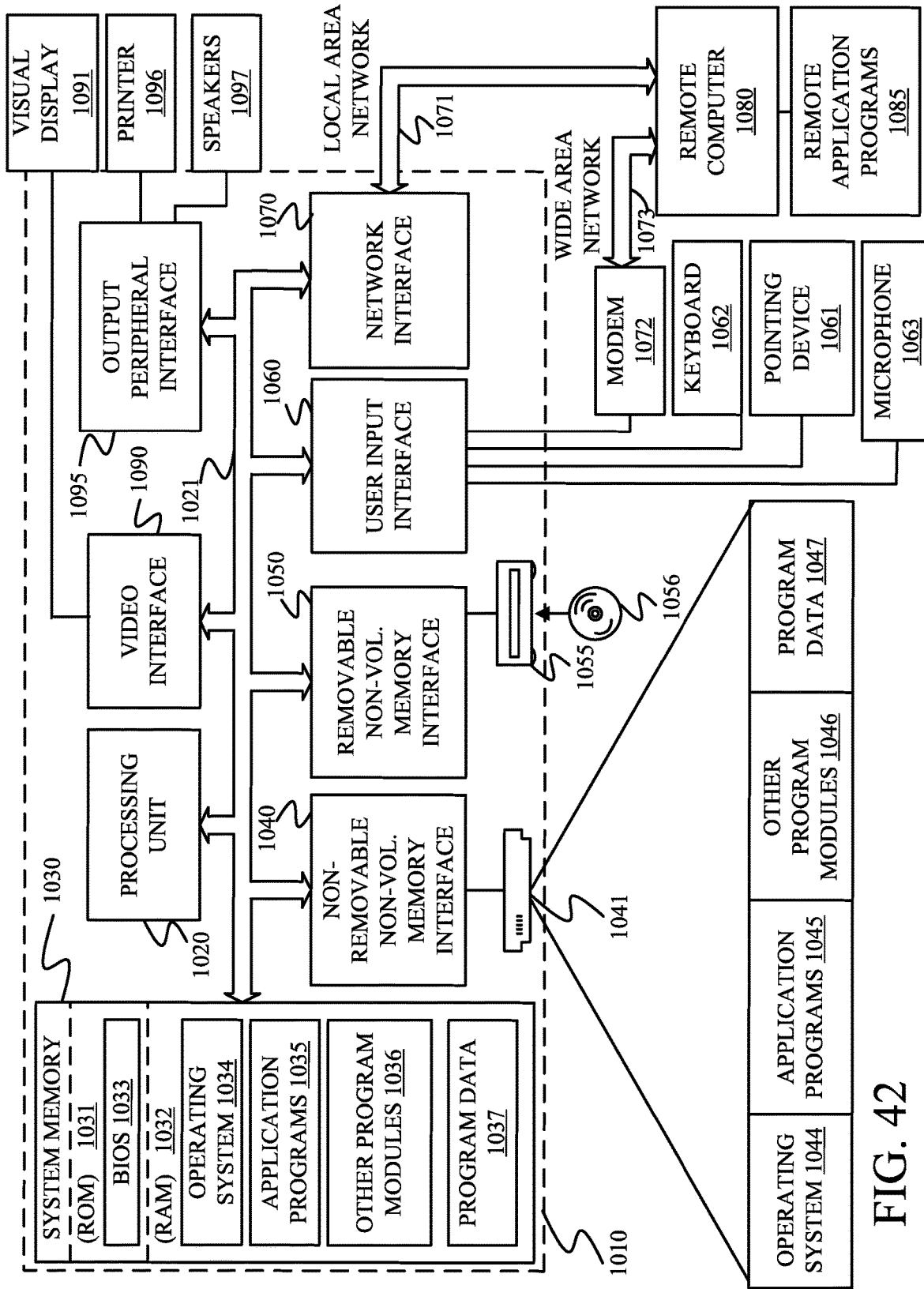
FIG. 42 is a block diagram showing one example of a computing environment that can be used on the agricultural machine and in architectures illustrated in previous figures.

FIG. 42 is one example of a computing environment in which elements of previous FIGS., or parts of them, (for example) can be deployed. With reference to FIG. 42, an example system for implementing some embodiments includes a computing device in the form of a computer 1010 programmed to operate as described above. Components of computer 1010 may include, but are not limited to, a processing unit 1020 (which can comprise processors from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. Memory and programs described with respect to previous FIGS. can be deployed in corresponding portions of FIG. 42.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random access memory (RAM) 832. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 42 illustrates operating system 1034, application programs 1035, other program modules 1036, and program data 1037.

The computer 1010 may also include other removable/non-removable volatile/nonvolatile computer storage media.

By way of example only, FIG. 42 illustrates a hard disk drive 1041 that reads from or writes to non-removable, nonvolatile magnetic media, an optical disk drive 1055, and non-volatile optical disk 1056. The hard disk drive 1041 is typically connected to the system bus 1021 through a non-removable memory interface such as interface 1040, and optical disk drive 1055 are typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 42, provide storage of computer readable instructions, data structures, program modules and other data for the computer 1010. In FIG. 42, for example, hard disk drive 1041 is illustrated as storing operating system 1044, application programs 1045, other program modules 1046, and program data 1047. Note that these components can either be the same as or different from operating system 834, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a controller area network—CAN, local area network—LAN, or wide area network WAN) to one or more remote computers, such as a remote computer 1080.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 42 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Example 1 is an agricultural machine that travels across a field in a direction of travel, comprising:
a material reservoir;
a controllable valve;
a pump that pumps material from the material reservoir to the controllable valve;
a plurality of optical sensor that each capture an image, of a plurality of captured images, of a portion of the field ahead of the controllable valve in the direction of travel;
a processing module that receives the plurality of captured images and includes a target identification system that identifies a target in at least one image of the plurality of captured images; and
a valve controller that generates a valve control signal to control the controllable valve to apply the material to the target.

Example 2 is the agricultural machine of any or all previous examples, the target identification system including:
an image remapping system that identifies a location of the target on the field based on a location of the target in the at least one image.

Example 3 is the agricultural machine of any or all previous examples wherein the agricultural machine comprises a longitudinal axis and further comprising:
a boom mounted transverse to the longitudinal axis of the agricultural machine, the plurality of optical sensors and the controllable valve being mounted on the boom; and
a boom position detector that detects a boom position variable indicative of a height of the boom relative to the field.

Example 4 is the agricultural machine of any or all previous examples and further comprising:
a plurality of controllable valves mounted on the boom, each valve having a corresponding nozzle, each nozzle directing the material from the corresponding valve to an application area on the field.

Example 5 is the agricultural machine of any or all previous examples, the target identification system including:
a nozzle identification system that identifies which of the plurality of controllable valves has an application area corresponding to the location of the target on the field.

Example 6 is the agricultural machine of any or all previous examples, the target identification system including:
a nozzle activation control system that identifies a timing defining when the identified controllable valve is to be activated and deactivated.

Example 7 is the agricultural machine of any or all previous examples, the nozzle activation control system including:
a set of variable value sensors that obtains at least one of dimension values indicative of machine dimensions, machine dynamics sensors that obtain machine dynamics information, and real time sensors that sense runtime variables.

Example 8 is the agricultural machine of any or all previous examples, the nozzle activation control system including:
a delay time on generator that generates a first delay time before the identified controllable valve is to be activated based on the dimension values, machine dynamics, and run time variables; and
a delay time off generator that generates a second delay time before the identified controllable valve is to be deactivated, the valve controller generating the valve control signal to control the identified controllable valve based on the first delay time and the second delay time.

Example 9 is the agricultural machine of any or all previous examples wherein each of the plurality of optical sensors has a corresponding field of view, and wherein the target identification system is configured to identify the target in a region of interest in a field of view of one of the plurality of optical sensors.

Example 10 is the agricultural machine of any or all previous examples wherein the image remapping system is configured to remap the region of interest to a region of interest on the ground based on the boom position variable.

Example 11 is the agricultural machine of any or all previous examples, the image remapping system including:
a mapping coefficient identifier that identifies mapping coefficients based on the boom position variable; and
a region of interest identifier configured to apply the identified mapping coefficients to the at least one image to identify a portion of the at least one image corresponding to the region of interest.

Example 12 is the agricultural machine of any or all previous examples, the target identification system including:
a target locator that identifies a location of the target on the ground based on the identified mapping coefficients.

Example 13 is the agricultural machine of any or all previous examples and further including:
a plurality of image processing modules mounted to the boom, each image processing module receiving images from a different set of optical sensors in the plurality of optical sensors, and wherein the plurality of controllable valves include a plurality of different sets of controllable valves, each of the controllable valves applying material to a different treatment area, each optical sensor capturing an image of targets for treatment by one of the plurality of different sets of controllable valves.

Example 14 is the agricultural machine of any or all previous examples wherein the plurality of image processing modules are configured to perform a sequence identification process to identify a sequential configuration of the image processing modules relative to one another, each image processing module being further configured to access configuration data to identify, as connected optical sensors, the set of optical sensors from which the image processing module receives images, and which set of the plurality of different sets of controllable valves correspond to the connected optical sensors.

Example 15 is a method of controlling an agricultural machine that travels across a field in a direction of travel, including:
sensing an image of a portion of the field ahead of a controllable valve in the direction of travel, the controllable valve mounted on a boom carried by the agricultural machine and being controllable to apply material to the field, the material being pumped by a pump from a material reservoir to the controllable valve;
identifying a target in the image;
detecting a boom position variable indicative of a height of the boom relative to the field; and
generating a valve control signal to control the controllable valve to apply the material to the target.

Example 16 is the method of any or all previous examples wherein the agricultural machine includes a plurality of controllable valves mounted on the boom, each valve having a corresponding nozzle, each nozzle directing the material from the corresponding valve to an application area on the field and a plurality of optical sensors mounted on the boom, each optical sensor having a field of view on the field wherein identifying a target includes:
identifying which of the plurality of controllable valves has an application area corresponding to the location of the target on the field.

Example 17 is the method of any or all previous examples wherein generating a valve control signal includes:
identifying a timing defining when the identified controllable valve is to be activated and deactivated.

Example 18 is the method of any or all previous examples wherein identifying a timing includes:
obtaining dimension values indicative of machine dimensions, machine dynamics sensors that obtain machine dynamics information, and real time sensors that sense runtime variables;
generating a first delay time before the identified controllable valve is to be activated based on the dimension values, machine dynamics, and run time variables; and
generating a second delay time before the identified controllable valve is to be deactivated, wherein generating the valve control signals comprises generating the valve control signal to control the identified controllable valve based on the first delay time and the second delay time.

Example 19 is an agricultural machine that travels across a field in a direction of travel, comprising:
a material reservoir;
a boom mounted transverse to a longitudinal axis of the agricultural machine;
a plurality of controllable valves mounted to the boom;
a pump that pumps material from the material reservoir to the plurality of controllable valves;
a plurality of optical sensors that each capture a separate image of a different portion of the field, ahead of the controllable valves, in the direction of travel;
a target identification system that identifies targets in the separate images; and
a valve controller that generates valve control signals to control the controllable valves to apply the material to the targets.

Example 20 is the agricultural machine of any or all previous examples and further including:
a boom position detector that detects a boom position variable indicative of a height of the boom relative to the field and wherein the target identification system comprises an image remapping system that identifies a location of the target on the field based on a location of the target in the image and based on the boom position variable.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine that travels across a field during a pass, comprising:
a material reservoir;
a plurality of controllable valves;
a pump that pumps material from the material reservoir to the controllable valve;
a plurality of optical sensors that each capture an image, of a plurality of captured images, of a portion of the field ahead of the controllable valve relative to a direction of travel of the agricultural machine;
a processing module that receives the plurality of captured images and includes:
a target identification system that identifies a target in at least one image of the plurality of captured images, the target identification system configured to identify, as the agricultural machine travels across the field during the pass, a controllable valve of the plurality of controllable valves that has an application area corresponding to the target, the target identification system including:
    a nozzle activation control system that identifies a timing defining when the identified controllable valve is to be activated and deactivated, the nozzle activation control system including a set of variable value sensors that obtains (i) dimension values indicative of machine dimensions, or (ii) machine dynamics information, or (iii) runtime variables, or any combination of (i) dimension values indicative of machine dimensions, (ii) machine dynamics information, and (iii) runtime variables; and
    a valve controller that generates a valve control signal to control the identified controllable valve to apply the material to the target as the agricultural machine travels across the field during the pass.

2. The agricultural machine of claim 1, the target identification system including:
    an image remapping system that identifies a location of the target on the field based on a location of the target in the at least one image.

3. The agricultural machine of claim 2 wherein the agricultural machine comprises a longitudinal axis and further comprising:
    a boom mounted transverse to the longitudinal axis of the agricultural machine, the plurality of optical sensors and the controllable valve being mounted on the boom; and
    a boom position detector that detects a boom position variable indicative of a height of the boom relative to the field.

4. The agricultural machine of claim 3, wherein the plurality of controllable valves are mounted on the boom, each controllable valve having a corresponding nozzle, each nozzle directing the material from the corresponding valve to an application area on the field.

5. The agricultural machine of claim 1, the nozzle activation control system including:
    a delay time on generator that generates a first delay time before the identified controllable valve is to be activated based on the at least one of dimension values, machine dynamics information, and runtime variables; and
    a delay time off generator that generates a second delay time before the identified controllable valve is to be deactivated, the valve controller generating the valve control signal to control the identified controllable valve based on the first delay time and the second delay time.

6. The agricultural machine of claim 3 wherein each optical sensor of the plurality of optical sensors has a corresponding field of view, and wherein the target identification system is configured to identify the target in a region of interest in a field of view of one of the plurality of optical sensors.

7. The agricultural machine of claim 6 wherein the image remapping system is configured to remap the region of interest to a region of interest on the ground based on the boom position variable.

8. The agricultural machine of claim 7, the image remapping system including:
    a mapping coefficient identifier that identifies mapping coefficients based on the boom position variable; and
    a region of interest identifier configured to apply the identified mapping coefficients to the at least one image to identify a portion of the at least one image corresponding to the region of interest.

9. The agricultural machine of claim 8, the target identification system including:
    a target locator that identifies a location of the target on the ground based on the identified mapping coefficients.

10. The agricultural machine of claim 4 wherein the processing module includes:
    a plurality of image processing modules mounted to the boom, each image processing module receiving images from a different set of optical sensors in the plurality of optical sensors, and wherein the plurality of controllable valves include a plurality of different sets of controllable valves, each of the controllable valves applying material to a different treatment area, each optical sensor capturing an image of targets for treatment by one of the plurality of different sets of controllable valves.

11. The agricultural machine of claim 10 wherein the plurality of image processing modules are configured to perform a sequence identification process to identify a sequential configuration of the image processing modules relative to one another, each image processing module being further configured to access configuration data to identify, as connected optical sensors, the set of optical sensors from which the image processing module receives images, and which set of the plurality of different sets of controllable valves correspond to the connected optical sensors.

12. A method of controlling an agricultural machine that travels across a field during a pass, including:
    sensing an image of a portion of the field ahead of a plurality of controllable valves relative to a direction of travel of the agricultural machine, the plurality of controllable valves mounted on a boom carried by the agricultural machine and being controllable to apply material to the field, the material being pumped by a pump from a material reservoir to the controllable valve;
    identifying a target in the image;
    detecting a boom position variable indicative of a height of the boom relative to the field;
    identifying, as the agricultural machine travels across the field during the pass, a controllable valve of the plurality of controllable valves that has an application area corresponding to the target;
    identifying a timing defining when the identified controllable valve is to be activated and deactivated, wherein identifying the timing includes obtaining (i) dimension values indicative of machine dimensions, or (ii) machine dynamics information, or (iii) runtime variables, or any combination of (i) dimension values indicative of machine dimensions, (ii) machine dynamics information, and (iii) runtime variables; and
    generating a valve control signal to control the identified controllable valve to apply the material to the target as the agricultural machine travels across the field during the pass.

13. The method of claim 12 wherein each controllable valve of the plurality of controllable valves has a corresponding nozzle, each nozzle directing the material from the corresponding valve to an application area on the field and a plurality of optical sensors mounted on the boom, each optical sensor having a field of view on the field wherein identifying a target includes identifying a location of the target on the field based on a location of the target in the image, and wherein identifying, as the agricultural machine travels across the field during the pass, the controllable valve of the plurality of controllable valves that has an application area corresponding to the target comprises identifying, as the agricultural machine travels across the field during the pass, the controllable valve of the plurality of controllable valves that has an application area corresponding to the location of the target on the field.

14. The method of claim 12 wherein identifying the timing further includes:
   generating a first delay time before the identified controllable valve is to be activated based on the dimension values, machine dynamics information, and run time variables; and
   generating a second delay time before the identified controllable valve is to be deactivated, wherein generating the valve control signals comprises generating the valve control signal to control the identified controllable valve based on the first delay time and the second delay time.

15. An agricultural machine that travels across a field during a pass, comprising:
   a material reservoir;
   a boom mounted transverse to a longitudinal axis of the agricultural machine;
   a plurality of controllable valves mounted to the boom;
   a pump that pumps material from the material reservoir to the plurality of controllable valves;
   a plurality of optical sensors that each capture a separate image of a different portion of the field, ahead of the controllable valves, relative to a direction of travel of the agricultural machine;
   a target identification system that identifies a target in one of the separate images and identifies, as the agricultural machine travels across the field during the pass, a controllable valve of the plurality of controllable valves that has an application area corresponding to the target, the target identification system including:
      a nozzle activation control system that identifies a timing defining when the identified controllable valve is to be activated and deactivated, the nozzle activation control system including: a set of variable value sensors that obtains (i) dimension values indicative of machine dimensions, or (ii) machine dynamics information, or (iii) runtime variable, or any combination of (i) dimension values indicative of machine dimensions (ii) machine dynamics information, and (iii) runtime variables; and
      a valve controller that generates valve control signals to control the identified controllable valves to apply the material to the target as the agricultural machine travels across the field during the pass.

16. The agricultural machine of claim 15 and further including:
   a boom position detector that detects a boom position variable indicative of a height of the boom relative to the field and wherein the target identification system comprises an image remapping system that identifies a location of the target on the field based on a location of the target in the image and based on the boom position variable.

17. The agricultural machine of claim 15, the nozzle activation system including:
   a delay time on generator that generates a first delay time before the identified controllable valve is to be activated based on the at least one of dimension values, machine dynamics information, and runtime variables; and
   a delay time off generator that generates a second delay time before the identified controllable valve is to be deactivated, the valve controller generating the valve control signal to control the identified controllable valve based on the first delay time and the second delay time.

18. The agricultural machine of claim 15, wherein each optical sensor of the plurality of optical sensors has a corresponding field of view, the agricultural machine further comprising:
   a boom position detector that defects a boom position variable indicative of a height of the boom relative to the field; and
   wherein the target identification system is configured to identify the target in a region of interest in a field of view of one of the plurality of optical sensors, the target identification system including:
      an image remapping system configured to remap the region of interest on the ground based on the boom position variable and including:
         a mapping coefficient identifier that identifies mapping coefficients based on the boom position variable: and
         a region of interest identifier configured to apply the identified mapping coefficients to the one separate image of the separate images to identify a portion of the one separate image of the separate images corresponding to the region of interest.

19. The agricultural machine of claim 15 and further comprising a plurality of image processing modules mounted to the boom, each image processing module receiving images from a different set of optical sensors in the plurality of optical sensors, and wherein the plurality of controllable valves include a plurality of different sets of controllable valves, each of the controllable valves applying material to a different treatment area, each optical sensor capturing an image of targets for treatment by one of the plurality of different sets of controllable valves,
   wherein the plurality of image processing modules are configured to perform a sequence identification process to identify a sequential configuration of the image processing modules relative to one another, each image processing module being further configured to access configuration data to identify, as connected optical sensors, the set of optical sensors from which the image processing module receives images, and which set of the plurality of different sets of controllable valves correspond to the connected optical sensors.

* * * * *